US012580394B2

(12) United States Patent
Hamblin et al.

(10) Patent No.: US 12,580,394 B2
(45) Date of Patent: Mar. 17, 2026

(54) MULTIPLEXED BATTERY MANAGEMENT SYSTEM

(71) Applicant: Sion Power Corporation, Tucson, AZ (US)

(72) Inventors: Glenn Alan Hamblin, Tucson, AZ (US); Yuriy V. Mikhaylik, Tucson, AZ (US); Chariclea Scordilis-Kelley, Tucson, AZ (US); Mark Niedzwiecki, Tucson, AZ (US); Scott Stewart, Vail, AZ (US); John Hughes, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 649 days.

(21) Appl. No.: 17/463,467

(22) Filed: Aug. 31, 2021

(65) Prior Publication Data

US 2022/0069593 A1 Mar. 3, 2022

Related U.S. Application Data

(60) Provisional application No. 63/073,383, filed on Sep. 1, 2020.

(51) Int. Cl.
H02J 7/00 (2006.01)
B60L 58/22 (2019.01)
(Continued)

(52) U.S. Cl.
CPC ......... H02J 7/0025 (2020.01); H01M 10/441 (2013.01); H02J 7/0013 (2013.01);
(Continued)

(58) Field of Classification Search
CPC .. H02J 7/0025; H02J 7/0019; H02J 7/007182; H02J 7/0013; H02J 7/0016; B60L 58/22; H01M 10/441
(Continued)

(56) References Cited

U.S. PATENT DOCUMENTS 5,506,068 A 4/1996 Dan et al.
5,543,245 A * 8/1996 Andrieu ............... G01R 31/379
320/124
(Continued)

FOREIGN PATENT DOCUMENTS

BR 102016009787 A2 11/2017
CN 101292380 A 10/2008
(Continued)

OTHER PUBLICATIONS

Louli et al., Exploring the Impact of Mechanical Pressure on the Performance of Anode-Free Lithium Metal Cells. J Electrochem Soc. Apr. 18, 2019;166:A1291-9.
(Continued)

*Primary Examiner* — John T Trischler
(74) *Attorney, Agent, or Firm* — Wolf, Greenfield & Sacks, P.C.

(57) ABSTRACT

Electrochemical cell and battery management systems comprise at least one battery comprising two or more strings of cells, each string of cells comprising two or more cells. The system includes a multiplexing switch apparatus connected to each string of cells and a controller. the controller is used to control various aspects of the charge and/or discharge of the electrochemical cell and/or battery.

17 Claims, 28 Drawing Sheets

(51) Int. Cl.
*H01M 10/44* (2006.01)
*H01M 10/48* (2006.01)
*H01M 10/42* (2006.01)

(52) U.S. Cl.
CPC ......... *H02J 7/007182* (2020.01); *B60L 58/22* (2019.02); *H01M 2010/4271* (2013.01); *H01M 10/482* (2013.01); *H02J 7/0016* (2013.01); *H02J 7/0019* (2013.01); *H02J 7/0063* (2013.01)

(58) Field of Classification Search
USPC ........................................................ 320/118
See application file for complete search history.

(56) References Cited

U.S. PATENT DOCUMENTS

| | | | | |
|---|---|---|---|---|
| 5,648,187 A | | 7/1997 | Skotheim | |
| 5,764,030 A | * | 6/1998 | Gaza | H02J 7/00041 |
| | | | | 320/120 |
| 5,808,371 A | * | 9/1998 | Kon'i | B60G 17/0195 |
| | | | | 307/10.6 |
| 5,818,201 A | | 10/1998 | Stockstad et al. | |
| 5,914,606 A | | 6/1999 | Becker-Irvin | |
| 5,919,587 A | | 7/1999 | Mukherjee et al. | |
| 5,961,672 A | | 10/1999 | Skotheim et al. | |
| 5,998,966 A | * | 12/1999 | Gaza | H02J 7/0013 |
| | | | | 320/120 |
| 6,002,237 A | * | 12/1999 | Gaza | H02J 7/0049 |
| | | | | 320/120 |
| 6,137,265 A | | 10/2000 | Cummings et al. | |
| 6,238,821 B1 | | 5/2001 | Mukherjee et al. | |
| 6,329,789 B1 | | 12/2001 | Gavrilov et al. | |
| 6,377,030 B1 | | 4/2002 | Asao et al. | |
| 6,605,375 B2 | * | 8/2003 | Ovshinsky | H01M 8/043 |
| | | | | 429/218.2 |
| 6,653,819 B2 | | 11/2003 | Nagata et al. | |
| 6,733,924 B1 | | 5/2004 | Skotheim et al. | |
| 6,746,804 B2 | | 6/2004 | Gan et al. | |
| 6,797,428 B1 | | 9/2004 | Skotheim et al. | |
| 6,936,381 B2 | | 8/2005 | Skotheim et al. | |
| 7,193,392 B2 | * | 3/2007 | King | B60L 58/18 |
| | | | | 320/118 |
| 7,245,108 B2 | * | 7/2007 | Chertok | B60L 58/18 |
| | | | | 320/132 |
| 7,247,408 B2 | | 7/2007 | Skotheim et al. | |
| 7,250,745 B2 | * | 7/2007 | Yasukouchi | H02M 3/1588 |
| | | | | 323/284 |
| 7,378,818 B2 | * | 5/2008 | Fowler | H01M 10/441 |
| | | | | 320/108 |
| 7,400,113 B2 | * | 7/2008 | Osborne | H02J 7/0018 |
| | | | | 320/118 |
| 7,494,729 B2 | | 2/2009 | Odaohhara | |
| 7,579,112 B2 | | 8/2009 | Chiang et al. | |
| 7,579,842 B2 | * | 8/2009 | Hunter | H02J 7/0047 |
| | | | | 324/426 |
| 7,646,170 B2 | * | 1/2010 | Gan | H01M 10/441 |
| | | | | 320/132 |
| 7,659,692 B2 | * | 2/2010 | Sainomoto | H02J 7/0016 |
| | | | | 320/112 |
| 7,688,075 B2 | | 3/2010 | Kelley et al. | |
| 7,719,134 B2 | * | 5/2010 | Hashimoto | H02J 7/00308 |
| | | | | 361/86 |
| 7,728,555 B2 | * | 6/2010 | Seo | G01R 31/3828 |
| | | | | 324/426 |
| 7,771,870 B2 | | 8/2010 | Affinito et al. | |
| 7,785,730 B2 | | 8/2010 | Affinito et al. | |
| 7,790,315 B2 | * | 9/2010 | Mukherjee | H01M 4/60 |
| | | | | 429/213 |
| 7,830,168 B2 | * | 11/2010 | Newman | H02M 1/36 |
| | | | | 326/32 |
| 7,939,198 B2 | | 5/2011 | Mukherjee et al. | |
| 7,952,385 B2 | * | 5/2011 | Newman | H02M 1/36 |
| | | | | 326/32 |
| 7,988,746 B2 | * | 8/2011 | Chiang | H01M 10/0436 |
| | | | | 204/554 |
| 8,063,609 B2 | * | 11/2011 | Salasoo | H01M 10/44 |
| | | | | 320/128 |
| 8,076,024 B2 | | 12/2011 | Affinito et al. | |
| 8,084,102 B2 | | 12/2011 | Affinito | |
| 8,087,309 B2 | | 1/2012 | Kelley et al. | |
| 8,105,717 B2 | | 1/2012 | Skotheim et al. | |
| 8,168,326 B2 | * | 5/2012 | Chiang | H01G 11/26 |
| | | | | 429/304 |
| 8,197,971 B2 | | 6/2012 | Skotheim et al. | |
| 8,198,862 B2 | * | 6/2012 | Zhang | B60L 58/22 |
| | | | | 320/118 |
| 8,203,309 B2 | * | 6/2012 | Maegawa | H02J 7/342 |
| | | | | 320/128 |
| 8,206,468 B2 | * | 6/2012 | Chiang | G02F 1/1524 |
| | | | | 204/554 |
| 8,206,469 B2 | * | 6/2012 | Chiang | H01M 10/0525 |
| | | | | 204/554 |
| 8,241,789 B2 | * | 8/2012 | Chiang | G02F 1/1524 |
| | | | | 429/231.95 |
| 8,242,745 B2 | * | 8/2012 | Zhang | B60L 58/22 |
| | | | | 320/120 |
| 8,264,205 B2 | | 9/2012 | Kopera | |
| 8,288,992 B2 | | 10/2012 | Kramer et al. | |
| 8,330,419 B2 | | 12/2012 | Kim et al. | |
| 8,338,034 B2 | | 12/2012 | Affinito et al. | |
| 8,405,349 B2 | * | 3/2013 | Kikinis | H02J 7/0016 |
| | | | | 320/117 |
| 8,405,351 B2 | | 3/2013 | Chaturvedi et al. | |
| 8,415,054 B2 | | 4/2013 | Skotheim et al. | |
| 8,427,106 B2 | * | 4/2013 | Kim | H01M 10/482 |
| | | | | 320/120 |
| 8,508,191 B2 | | 8/2013 | Kim et al. | |
| 8,518,578 B2 | * | 8/2013 | Swan | H01M 10/02 |
| | | | | 429/162 |
| 8,519,670 B2 | * | 8/2013 | Castelaz | H02J 7/0019 |
| | | | | 320/118 |
| 8,547,065 B2 | * | 10/2013 | Trigiani | H02J 7/0014 |
| | | | | 320/118 |
| 8,564,247 B2 | * | 10/2013 | Hintz | H02J 7/0016 |
| | | | | 320/121 |
| 8,580,430 B2 | * | 11/2013 | Chiang | H01M 10/0436 |
| | | | | 429/231.95 |
| 8,586,238 B2 | * | 11/2013 | Chiang | H01G 11/56 |
| | | | | 429/324 |
| 8,603,680 B2 | | 12/2013 | Affinito et al. | |
| 8,617,748 B2 | | 12/2013 | Mikhaylik et al. | |
| 8,623,557 B2 | | 1/2014 | Skotheim et al. | |
| 8,723,480 B2 | * | 5/2014 | Lim | H02J 7/0019 |
| | | | | 320/118 |
| 8,728,661 B2 | | 5/2014 | Skotheim et al. | |
| 8,753,771 B2 | | 6/2014 | Skotheim et al. | |
| 8,760,118 B2 | * | 6/2014 | Christensen | H01M 10/482 |
| | | | | 320/121 |
| 8,798,832 B2 | * | 8/2014 | Kawahara | B60L 58/26 |
| | | | | 701/32.7 |
| 8,810,201 B2 | * | 8/2014 | Yun | B60L 58/21 |
| | | | | 320/122 |
| 8,823,323 B2 | * | 9/2014 | Troxel | H01M 10/482 |
| | | | | 320/118 |
| 8,871,387 B2 | | 10/2014 | Wang et al. | |
| 8,884,585 B2 | * | 11/2014 | Troxel | H01M 10/4207 |
| | | | | 320/132 |
| 8,928,286 B2 | | 1/2015 | Amiruddin et al. | |
| 8,936,870 B2 | | 1/2015 | Affinito et al. | |
| 8,942,075 B2 | * | 1/2015 | Yoda | G11B 27/36 |
| | | | | 369/243 |
| 8,968,928 B2 | | 3/2015 | Wang et al. | |
| 9,000,727 B2 | * | 4/2015 | Castelaz | H02J 7/345 |
| | | | | 320/118 |
| 9,005,311 B2 | | 4/2015 | Safont et al. | |
| 9,005,809 B2 | | 4/2015 | Wilkening et al. | |
| 9,030,167 B2 | * | 5/2015 | Yamaguchi | H01M 10/441 |
| | | | | 320/117 |
| 9,034,421 B2 | | 5/2015 | Mikhaylik et al. | |

(56) References Cited

U.S. PATENT DOCUMENTS

| | | | | |
|---|---|---|---|---|
| 9,035,496 B2* | 5/2015 | Kang | H02J 1/10 | |
| | | | 320/120 | |
| 9,040,197 B2 | 5/2015 | Affinito et al. | | |
| 9,040,201 B2 | 5/2015 | Affinito et al. | | |
| 9,065,149 B2 | 6/2015 | Skotheim et al. | | |
| 9,077,041 B2 | 7/2015 | Burnside et al. | | |
| 9,077,184 B2* | 7/2015 | Fujita | H01M 10/48 | |
| 9,088,164 B2* | 7/2015 | Shim | H02J 7/0019 | |
| 9,105,938 B2 | 8/2015 | Scordilis-Kelley et al. | | |
| 9,130,379 B2* | 9/2015 | Sakabe | B60L 58/22 | |
| 9,197,081 B2* | 11/2015 | Finberg | H02J 7/0016 | |
| 9,214,678 B2 | 12/2015 | Mikhaylik | | |
| 9,306,252 B2* | 4/2016 | Kristofek | H01M 10/48 | |
| 9,325,190 B2* | 4/2016 | Suzuki | H02J 7/0016 | |
| 9,397,342 B2 | 7/2016 | Skotheim et al. | | |
| 9,419,274 B2 | 8/2016 | Wilkening et al. | | |
| 9,490,478 B2 | 11/2016 | Mikhaylik et al. | | |
| 9,527,402 B2* | 12/2016 | Wyatt | B60L 58/20 | |
| 9,531,009 B2 | 12/2016 | Kumaresan et al. | | |
| 9,537,132 B2* | 1/2017 | Butzmann | H02J 7/0019 | |
| 9,537,326 B2* | 1/2017 | Troxel | H01M 10/488 | |
| 9,548,492 B2 | 1/2017 | Affinito et al. | | |
| 9,559,348 B2 | 1/2017 | Kumaresan et al. | | |
| 9,564,763 B2* | 2/2017 | Finberg | H02J 7/0016 | |
| 9,564,767 B2* | 2/2017 | Takahashi | H01G 11/10 | |
| 9,577,243 B2 | 2/2017 | Schmidt et al. | | |
| 9,577,267 B2 | 2/2017 | Scordilis-Kelley et al. | | |
| 9,577,289 B2* | 2/2017 | Liao | H01M 50/414 | |
| 9,583,757 B2 | 2/2017 | Park et al. | | |
| 9,638,729 B2* | 5/2017 | Maekawa | H01M 50/569 | |
| 9,653,735 B2 | 5/2017 | Skotheim et al. | | |
| 9,653,750 B2 | 5/2017 | Laramie et al. | | |
| 9,685,799 B2* | 6/2017 | Kaji | H02J 3/241 | |
| 9,696,383 B2* | 7/2017 | Kikuchi | G01R 31/382 | |
| 9,711,784 B2 | 7/2017 | Kelley et al. | | |
| 9,728,768 B2 | 8/2017 | Mikhaylik et al. | | |
| 9,735,411 B2 | 8/2017 | Viner et al. | | |
| 9,742,218 B2 | 8/2017 | Tochigi et al. | | |
| 9,755,268 B2 | 9/2017 | Fleischmann et al. | | |
| 9,780,404 B2 | 10/2017 | Scordilis-Kelley et al. | | |
| 9,806,328 B2* | 10/2017 | Park | H01M 4/0471 | |
| 9,812,732 B2 | 11/2017 | Jiang et al. | | |
| 9,819,201 B2* | 11/2017 | Suzuki | H01M 10/441 | |
| 9,825,328 B2 | 11/2017 | Du et al. | | |
| 9,853,287 B2 | 12/2017 | Mikhaylik et al. | | |
| 9,876,367 B2* | 1/2018 | Trigiani | H02J 7/00306 | |
| 9,899,846 B2* | 2/2018 | Carver | H02J 7/0024 | |
| 9,914,368 B1 | 3/2018 | Marcicki et al. | | |
| 9,947,963 B2 | 4/2018 | Du et al. | | |
| 9,966,780 B2* | 5/2018 | Sherstyuk | H01M 10/425 | |
| 9,994,959 B2 | 6/2018 | Laramie et al. | | |
| 9,994,960 B2 | 6/2018 | Laramie et al. | | |
| 9,997,765 B2* | 6/2018 | Park | H01M 4/366 | |
| 10,020,479 B2 | 7/2018 | Mikhaylik et al. | | |
| 10,020,485 B2* | 7/2018 | Wyatt | B60L 58/20 | |
| 10,020,512 B2 | 7/2018 | Gronwald et al. | | |
| 10,050,308 B2 | 8/2018 | Liao et al. | | |
| 10,062,892 B2* | 8/2018 | Wyatt | B60L 58/20 | |
| 10,069,135 B2 | 9/2018 | Fleischmann et al. | | |
| 10,069,146 B2 | 9/2018 | Skotheim et al. | | |
| 10,088,529 B2 | 10/2018 | Joe | | |
| 10,099,562 B2* | 10/2018 | Jin | B60L 58/26 | |
| 10,122,043 B2 | 11/2018 | Du et al. | | |
| 10,148,105 B2* | 12/2018 | Lei | H02J 7/0063 | |
| 10,230,246 B2* | 3/2019 | Troxel | H01M 10/482 | |
| 10,236,695 B2* | 3/2019 | Weyen | H02J 7/0019 | |
| 10,243,202 B2 | 3/2019 | Fleischmann et al. | | |
| 10,253,744 B2* | 4/2019 | Garrard | H02M 3/33515 | |
| 10,259,337 B2* | 4/2019 | Alser | H02P 27/06 | |
| 10,279,700 B2* | 5/2019 | Takebayashi | B60L 58/13 | |
| 10,298,034 B2* | 5/2019 | Lei | H02J 9/06 | |
| 10,312,545 B2 | 6/2019 | Scordilis-Kelley et al. | | |
| 10,319,988 B2 | 6/2019 | Kelley et al. | | |
| 10,320,027 B2 | 6/2019 | Scordilis-Kelley et al. | | |
| 10,320,031 B2 | 6/2019 | Mikhaylik et al. | | |
| 10,320,204 B2* | 6/2019 | Ishikawa | H01M 10/425 | |
| 10,333,134 B2 | 6/2019 | Mikhaylik et al. | | |
| 10,333,149 B2 | 6/2019 | Affinito et al. | | |
| 10,388,943 B2 | 8/2019 | Bonhomme et al. | | |
| 10,388,987 B2 | 8/2019 | Du et al. | | |
| 10,411,499 B2* | 9/2019 | Hall | H02J 7/35 | |
| 10,431,808 B2* | 10/2019 | Park | H01M 4/661 | |
| 10,436,850 B2 | 10/2019 | Hatano et al. | | |
| 10,439,192 B2* | 10/2019 | Wyatt | B60R 16/033 | |
| 10,449,870 B2* | 10/2019 | Chang | B60L 50/60 | |
| 10,461,333 B2* | 10/2019 | Mikhaylik | H01M 4/628 | |
| 10,461,372 B2 | 10/2019 | Laramie et al. | | |
| 10,468,721 B2* | 11/2019 | Liao | H01M 50/414 | |
| 10,490,796 B2 | 11/2019 | Laramie et al. | | |
| 10,505,234 B2 | 12/2019 | Zhu et al. | | |
| 10,516,155 B2* | 12/2019 | Park | H01M 4/621 | |
| 10,535,902 B2* | 1/2020 | Laramie | B05D 1/12 | |
| 10,541,448 B2* | 1/2020 | Mikhaylik | C07D 295/194 | |
| 10,553,893 B2* | 2/2020 | Laramie | H01M 50/451 | |
| 10,557,893 B2 | 2/2020 | Fukushima et al. | | |
| 10,573,869 B2* | 2/2020 | Mikhaylik | H01M 4/62 | |
| 10,574,063 B2 | 2/2020 | Hellgren et al. | | |
| 10,591,979 B2 | 3/2020 | Kacker et al. | | |
| 10,608,278 B2 | 3/2020 | Liao et al. | | |
| 10,629,947 B2 | 4/2020 | Affinito et al. | | |
| 10,629,954 B2* | 4/2020 | Mikhaylik | H01M 10/0565 | |
| 10,677,850 B2* | 6/2020 | Goto | G01R 31/382 | |
| 10,720,648 B2 | 7/2020 | Quero-Mieres et al. | | |
| 10,790,678 B2* | 9/2020 | Zheng | H02J 7/0014 | |
| 10,833,513 B2* | 11/2020 | Coenen | H02J 7/0018 | |
| 10,833,523 B2* | 11/2020 | Hikosaka | H02J 7/02 | |
| 10,847,833 B2* | 11/2020 | Bunte | H01M 10/052 | |
| 10,862,105 B2* | 12/2020 | Gronwald | H01M 50/426 | |
| 10,868,306 B2* | 12/2020 | Mudalige | H01M 4/131 | |
| 10,868,344 B2 | 12/2020 | Masias et al. | | |
| 10,879,527 B2* | 12/2020 | Laramie | H01M 50/449 | |
| 10,897,152 B2* | 1/2021 | Takahashi | H02J 7/0069 | |
| 10,910,847 B2* | 2/2021 | Grasshoff | H02J 7/54 | |
| 10,919,403 B2* | 2/2021 | Ge | H02J 7/0024 | |
| 10,944,094 B2* | 3/2021 | Liao | H01M 10/4235 | |
| 10,946,766 B2* | 3/2021 | Hamada | B60L 7/10 | |
| 10,964,928 B2* | 3/2021 | Ashrafzadeh | H01M 10/486 | |
| 10,965,130 B2 | 3/2021 | Mikhaylik et al. | | |
| 10,981,455 B2* | 4/2021 | Otsuki | B60L 50/40 | |
| 10,985,361 B2* | 4/2021 | Bonhomme | H01M 4/622 | |
| 10,985,563 B2* | 4/2021 | Kuznetsov | H02J 7/1423 | |
| 10,991,925 B2* | 4/2021 | Wang | C07F 9/005 | |
| 10,992,172 B2* | 4/2021 | Li | H02J 7/0013 | |
| 11,024,923 B2* | 6/2021 | Liao | H01M 50/457 | |
| 11,028,973 B2 | 6/2021 | Xiong et al. | | |
| 11,038,214 B2 | 6/2021 | Rahimian et al. | | |
| 11,040,624 B2* | 6/2021 | Jin | G01R 31/36 | |
| 11,041,248 B2* | 6/2021 | Laramie | H01M 50/446 | |
| 11,046,186 B1* | 6/2021 | Appelbaum | H02J 7/0013 | |
| 11,056,728 B2 | 7/2021 | Mikhaylik et al. | | |
| 11,063,444 B2* | 7/2021 | Statman | H01M 10/425 | |
| 11,075,535 B2* | 7/2021 | Kwak | H02J 7/007192 | |
| 11,088,395 B2* | 8/2021 | Mikhaylik | H01M 10/0568 | |
| 11,108,076 B2* | 8/2021 | Scordilis-Kelley | H01M 4/136 | |
| 11,108,077 B2* | 8/2021 | Scordilis-Kelley | H01M 4/136 | |
| 11,108,251 B2* | 8/2021 | Kirleis | B60L 3/0046 | |
| 11,121,397 B2* | 9/2021 | Scordilis-Kelley | | |
| | | | H01M 10/058 | |
| 11,128,158 B2* | 9/2021 | Mulawski | H02J 7/0047 | |
| 11,165,122 B2* | 11/2021 | Laramie | H01M 50/417 | |
| 11,171,507 B2 | 11/2021 | Tihonski et al. | | |
| 11,177,467 B2* | 11/2021 | Park | H01M 4/667 | |
| 11,183,690 B2* | 11/2021 | Wang | H01M 4/405 | |
| 11,205,910 B2 | 12/2021 | Walter | | |
| 11,228,055 B2* | 1/2022 | Liao | H01M 4/505 | |
| 11,230,205 B2* | 1/2022 | Ohmori | B60L 58/22 | |
| 11,233,243 B2* | 1/2022 | Affinito | H01M 4/134 | |
| 11,239,504 B2* | 1/2022 | Laramie | H01M 50/446 | |
| 11,245,103 B2* | 2/2022 | Mikhaylik | H01M 4/13 | |
| 11,251,501 B2* | 2/2022 | Schneider | H01M 4/62 | |
| 11,289,918 B2* | 3/2022 | Troxel | H01M 10/482 | |
| 11,316,204 B2* | 4/2022 | Mikhaylik | H01M 10/0525 | |
| 11,322,804 B2* | 5/2022 | Laramie | H01M 10/4235 | |
| 11,367,892 B2* | 6/2022 | Laramie | H01M 50/434 | |

(56) References Cited

U.S. PATENT DOCUMENTS

| | | | | |
|---|---|---|---|---|
| 11,404,876 | B2* | 8/2022 | Kuznetsov | H02J 3/32 |
| 11,418,035 | B2* | 8/2022 | Kuznetsov | H02J 3/381 |
| 11,424,492 | B2 | 8/2022 | Mikhaylik et al. | |
| 11,437,686 | B2* | 9/2022 | Wyatt | B60L 7/16 |
| 11,456,459 | B2* | 9/2022 | Affinito | H01M 10/052 |
| 11,489,348 | B2* | 11/2022 | Mikhaylik | H02J 7/0019 |
| 11,502,334 | B2* | 11/2022 | Liao | H01M 50/414 |
| 11,515,712 | B2* | 11/2022 | Lee | H02J 7/0063 |
| 11,531,068 | B2* | 12/2022 | Zhang | H01M 10/425 |
| 11,543,086 | B2* | 1/2023 | Xiong | F21V 23/023 |
| 11,557,753 | B2* | 1/2023 | Kovalev | H01M 4/628 |
| 11,569,531 | B2* | 1/2023 | Mikhaylik | H01M 10/0568 |
| 11,575,124 | B2* | 2/2023 | Affinito | H01M 4/366 |
| 11,581,530 | B2* | 2/2023 | Laramie | H01M 10/0525 |
| 11,616,219 | B2* | 3/2023 | Park | H01M 4/667 |
| | | | | 156/60 |
| 11,616,382 | B2* | 3/2023 | Hale | H02J 7/00711 |
| | | | | 320/141 |
| 11,637,353 | B2* | 4/2023 | Laramie | H01M 50/581 |
| | | | | 429/62 |
| 11,658,352 | B2 | 5/2023 | Mikhaylik et al. | |
| 11,664,527 | B2* | 5/2023 | Liao | H01M 4/505 |
| | | | | 429/122 |
| 11,695,165 | B2* | 7/2023 | Kim | H02J 7/0019 |
| | | | | 320/136 |
| 11,710,814 | B2* | 7/2023 | Park | H01M 4/661 |
| | | | | 156/60 |
| 11,710,847 | B2* | 7/2023 | Laramie | H01M 50/426 |
| | | | | 429/145 |
| 11,728,528 | B2* | 8/2023 | Laramie | H01M 10/443 |
| | | | | 429/50 |
| 11,728,661 | B2* | 8/2023 | Kirleis | B60L 58/22 |
| | | | | 320/121 |
| 11,735,761 | B2* | 8/2023 | Scordilis-Kelley | |
| | | | | H01M 4/1395 |
| | | | | 429/231.95 |
| 11,742,477 | B2* | 8/2023 | Laramie | H01M 4/139 |
| | | | | 429/126 |
| 11,742,680 | B2* | 8/2023 | Elidrissi | A61M 5/1723 |
| | | | | 320/100 |
| 11,750,014 | B2* | 9/2023 | Burkell | H02J 7/0013 |
| | | | | 307/19 |
| 11,784,297 | B2* | 10/2023 | Liao | H01M 10/0567 |
| | | | | 429/126 |
| 11,784,298 | B2* | 10/2023 | Bonhomme | H01M 4/1395 |
| | | | | 429/188 |
| 11,811,045 | B2* | 11/2023 | Park | H01M 4/622 |
| 11,837,710 | B2* | 12/2023 | Bonhomme | H01M 4/0435 |
| 11,848,440 | B2 | 12/2023 | Frieberg et al. | |
| 11,894,545 | B2* | 2/2024 | Gronwald | H01M 50/403 |
| 11,906,597 | B2* | 2/2024 | Ashrafzadeh | H01M 10/425 |
| 11,990,589 | B2 | 5/2024 | Mikhaylik et al. | |
| 12,005,810 | B2* | 6/2024 | Jin | B60L 50/60 |
| 12,034,327 | B2* | 7/2024 | Takahashi | H01M 10/441 |
| 12,068,626 | B2* | 8/2024 | Elidrissi | H02J 7/00034 |
| 12,074,289 | B2* | 8/2024 | Mikhaylik | C07C 327/36 |
| 12,374,913 | B2 | 7/2025 | Mikhaylik et al. | |
| 12,424,863 | B2* | 9/2025 | Elidrissi | H02J 7/0049 |
| 2002/0012846 | A1* | 1/2002 | Skotheim | H01M 50/46 |
| | | | | 429/231.95 |
| 2002/0055040 | A1* | 5/2002 | Mukherjee | H01M 4/131 |
| | | | | 429/223 |
| 2002/0119351 | A1 | 8/2002 | Ovshinsky et al. | |
| 2002/0167296 | A1* | 11/2002 | Nagata | H02J 7/007192 |
| | | | | 320/155 |
| 2003/0099884 | A1* | 5/2003 | Chiang | H01G 11/28 |
| | | | | 429/231.95 |
| 2003/0124434 | A1* | 7/2003 | Gan | H01M 10/0525 |
| | | | | 429/332 |
| 2004/0135544 | A1* | 7/2004 | King | B60L 58/18 |
| | | | | 320/116 |
| 2004/0135545 | A1* | 7/2004 | Fowler | H01M 10/441 |
| | | | | 320/118 |
| 2004/0135546 | A1* | 7/2004 | Chertok | B60L 58/18 |
| | | | | 320/118 |
| 2004/0164706 | A1* | 8/2004 | Osborne | H02J 7/0018 |
| | | | | 320/116 |
| 2005/0008935 | A1* | 1/2005 | Skotheim | H01M 4/38 |
| | | | | 429/322 |
| 2005/0077879 | A1* | 4/2005 | Near | H02J 7/0018 |
| | | | | 320/166 |
| 2005/0116686 | A1* | 6/2005 | Odaohhara | H02J 7/0013 |
| | | | | 320/116 |
| 2005/0196672 | A1 | 9/2005 | Mukherjee et al. | |
| 2005/0285579 | A1* | 12/2005 | Yasukouchi | H02M 3/1588 |
| | | | | 323/282 |
| 2006/0115579 | A1 | 6/2006 | Mukherjee et al. | |
| 2006/0193095 | A1 | 8/2006 | Hunter et al. | |
| 2006/0222954 | A1* | 10/2006 | Skotheim | H01M 4/0421 |
| | | | | 429/246 |
| 2006/0238203 | A1* | 10/2006 | Kelley | G01R 31/389 |
| | | | | 324/433 |
| 2007/0092798 | A1* | 4/2007 | Spitler | H01M 4/505 |
| | | | | 429/231.1 |
| 2007/0108940 | A1* | 5/2007 | Sainomoto | H02J 7/0048 |
| | | | | 320/112 |
| 2007/0111089 | A1 | 5/2007 | Swan | |
| 2007/0139015 | A1 | 6/2007 | Seo et al. | |
| 2007/0221265 | A1 | 9/2007 | Affinito et al. | |
| 2007/0224502 | A1* | 9/2007 | Affinito | H01M 4/62 |
| | | | | 429/50 |
| 2007/0262751 | A1* | 11/2007 | Gan | H01M 10/44 |
| | | | | 320/136 |
| 2008/0014501 | A1* | 1/2008 | Skotheim | H01M 4/5815 |
| | | | | 429/213 |
| 2008/0057397 | A1* | 3/2008 | Skotheim | H01M 4/134 |
| | | | | 429/231.95 |
| 2008/0187663 | A1* | 8/2008 | Affinito | C23C 14/12 |
| | | | | 427/255.28 |
| 2008/0191663 | A1* | 8/2008 | Fowler | H02J 7/0018 |
| | | | | 320/118 |
| 2008/0213672 | A1* | 9/2008 | Skotheim | H01M 4/628 |
| | | | | 429/231.95 |
| 2008/0309163 | A1* | 12/2008 | Hashimoto | H02J 7/00308 |
| | | | | 361/86 |
| 2008/0318128 | A1 | 12/2008 | Simoneau et al. | |
| 2009/0035646 | A1 | 2/2009 | Mikhaylik et al. | |
| 2009/0055110 | A1 | 2/2009 | Kelley et al. | |
| 2009/0087722 | A1* | 4/2009 | Sakabe | B60L 3/0046 |
| | | | | 429/61 |
| 2009/0146610 | A1 | 6/2009 | Trigiani | |
| 2009/0167242 | A1* | 7/2009 | Naganuma | H02J 7/0025 |
| | | | | 320/118 |
| 2009/0200986 | A1* | 8/2009 | Kopera | H01M 10/486 |
| | | | | 320/134 |
| 2009/0291353 | A1* | 11/2009 | Affinito | H01M 50/46 |
| | | | | 429/50 |
| 2010/0003603 | A1* | 1/2010 | Chiang | H01M 10/0525 |
| | | | | 429/231.95 |
| 2010/0019718 | A1 | 1/2010 | Salasoo et al. | |
| 2010/0019727 | A1* | 1/2010 | Karden | G01R 31/382 |
| | | | | 320/134 |
| 2010/0035128 | A1 | 2/2010 | Scordilis-Kelley et al. | |
| 2010/0104948 | A1* | 4/2010 | Skotheim | H01M 4/38 |
| | | | | 429/204 |
| 2010/0129699 | A1* | 5/2010 | Mikhaylik | H01M 4/1395 |
| | | | | 429/231.95 |
| 2010/0134070 | A1* | 6/2010 | Yun | B60L 58/16 |
| | | | | 320/118 |
| 2010/0164430 | A1* | 7/2010 | Lu | H01M 16/00 |
| | | | | 320/152 |
| 2010/0201339 | A1* | 8/2010 | Newman | H02M 1/36 |
| | | | | 323/311 |
| 2010/0237828 | A1* | 9/2010 | Maegawa | H02J 7/0018 |
| | | | | 320/118 |
| 2010/0237830 | A1 | 9/2010 | Castelaz et al. | |
| 2010/0239914 | A1 | 9/2010 | Mikhaylik et al. | |
| 2010/0244781 | A1* | 9/2010 | Kramer | H02J 7/0016 |
| | | | | 320/162 |

(56) References Cited

U.S. PATENT DOCUMENTS

| | | | |
|---|---|---|---|
| 2010/0261043 A1* | 10/2010 | Kim | H02J 7/0024 429/61 |
| 2010/0285339 A1 | 11/2010 | Chaturvedi et al. | |
| 2010/0291442 A1* | 11/2010 | Wang | H01M 10/052 429/231.95 |
| 2010/0294049 A1* | 11/2010 | Kelley | H01J 37/20 73/864.91 |
| 2010/0327807 A1* | 12/2010 | Kikinis | H02J 7/0016 320/116 |
| 2010/0327811 A1* | 12/2010 | Affinito | H01M 4/382 320/128 |
| 2011/0005065 A1* | 1/2011 | Chiang | H01M 10/052 29/623.1 |
| 2011/0006738 A1 | 1/2011 | Mikhaylik et al. | |
| 2011/0008531 A1* | 1/2011 | Mikhaylik | H01M 4/62 427/77 |
| 2011/0014524 A1 | 1/2011 | Skotheim et al. | |
| 2011/0025258 A1* | 2/2011 | Kim | H01M 10/425 320/128 |
| 2011/0043951 A1* | 2/2011 | Newman | H02M 1/36 361/18 |
| 2011/0045346 A1* | 2/2011 | Chiang | H01G 11/56 429/231.95 |
| 2011/0057617 A1* | 3/2011 | Finberg | H02J 7/0016 320/122 |
| 2011/0059361 A1* | 3/2011 | Wilkening | H01M 4/602 429/236 |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0080139 A1* | 4/2011 | Troxel | H01M 10/441 320/136 |
| 2011/0084663 A1* | 4/2011 | Troxel | H01M 10/425 320/118 |
| 2011/0089897 A1* | 4/2011 | Zhang | B60L 58/22 320/116 |
| 2011/0095725 A1* | 4/2011 | Troxel | H01M 10/488 429/61 |
| 2011/0140650 A1* | 6/2011 | Zhang | H02J 7/00308 320/118 |
| 2011/0151324 A1* | 6/2011 | Chiang | H01G 11/28 29/623.1 |
| 2011/0159376 A1 | 6/2011 | Skotheim et al. | |
| 2011/0165471 A9 | 7/2011 | Skotheim et al. | |
| 2011/0177398 A1 | 7/2011 | Affinito et al. | |
| 2011/0206992 A1 | 8/2011 | Campbell et al. | |
| 2011/0256450 A1 | 10/2011 | Campbell et al. | |
| 2011/0278170 A1* | 11/2011 | Chiang | H01G 11/26 204/483 |
| 2011/0285352 A1* | 11/2011 | Lim | H02J 7/0019 320/118 |
| 2011/0313613 A1* | 12/2011 | Kawahara | B60L 50/61 320/134 |
| 2012/0043940 A1* | 2/2012 | Affinito | H01M 4/366 429/231.95 |
| 2012/0048729 A1 | 3/2012 | Mikhaylik et al. | |
| 2012/0052339 A1 | 3/2012 | Mikhaylik et al. | |
| 2012/0052397 A1* | 3/2012 | Mikhaylik | H01M 50/46 429/231.95 |
| 2012/0056590 A1 | 3/2012 | Amiruddin et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2012/0148904 A1* | 6/2012 | Swan | H01M 4/73 429/211 |
| 2012/0194139 A1 | 8/2012 | Sasaki et al. | |
| 2012/0228939 A1 | 9/2012 | Kaga et al. | |
| 2012/0251896 A1* | 10/2012 | Chiang | H01M 10/052 429/207 |
| 2012/0261997 A1* | 10/2012 | Kang | H02J 1/10 307/80 |
| 2012/0276449 A1* | 11/2012 | Skotheim | H01M 10/052 429/212 |
| 2012/0282530 A1* | 11/2012 | Chiang | H01M 10/0525 429/231.95 |
| 2012/0306275 A1 | 12/2012 | Christensen et al. | |
| 2012/0313439 A1* | 12/2012 | Yamaguchi | H02J 7/0016 307/71 |
| 2012/0319493 A1* | 12/2012 | Kim | H01M 10/4207 307/80 |
| 2012/0319653 A1* | 12/2012 | Kumar | H02J 7/0049 320/118 |
| 2013/0017441 A1* | 1/2013 | Affinito | H01M 50/46 429/211 |
| 2013/0026993 A1* | 1/2013 | Hintz | H02J 7/0016 320/119 |
| 2013/0095380 A1* | 4/2013 | Affinito | H01M 10/0565 429/231.95 |
| 2013/0119934 A1* | 5/2013 | Suzuki | B60L 3/0046 320/135 |
| 2013/0143096 A1* | 6/2013 | Affinito | H01M 4/382 429/231.95 |
| 2013/0164635 A1* | 6/2013 | Schmidt | H01M 4/133 252/502 |
| 2013/0207616 A1 | 8/2013 | Shim | |
| 2013/0216915 A1* | 8/2013 | Affinito | H01M 4/366 429/231.95 |
| 2013/0221918 A1 | 8/2013 | Hill et al. | |
| 2013/0224601 A1* | 8/2013 | Burnside | H01M 4/13 429/233 |
| 2013/0252103 A1* | 9/2013 | Mikhaylik | H01M 4/661 216/18 |
| 2013/0258830 A1 | 10/2013 | Yoda | |
| 2013/0280605 A1* | 10/2013 | Affinito | H01M 4/382 429/211 |
| 2013/0285613 A1* | 10/2013 | Fujita | H01M 10/48 320/126 |
| 2013/0300369 A1* | 11/2013 | Butzmann | H02J 7/0018 429/50 |
| 2013/0316072 A1 | 11/2013 | Scordilis-Kelley et al. | |
| 2013/0330577 A1 | 12/2013 | Kristofek et al. | |
| 2014/0028098 A1* | 1/2014 | Trigiani | H02J 7/00302 307/38 |
| 2014/0045075 A1* | 2/2014 | Skotheim | H01M 4/134 429/317 |
| 2014/0062411 A1 | 3/2014 | Mikhaylik et al. | |
| 2014/0072873 A1* | 3/2014 | Wang | H01M 4/621 429/217 |
| 2014/0079994 A1* | 3/2014 | Affinito | H01M 4/13 429/246 |
| 2014/0084870 A1* | 3/2014 | Castelaz | H02J 7/0019 320/118 |
| 2014/0123477 A1* | 5/2014 | Safont Sempere | H01M 4/1395 29/623.5 |
| 2014/0127419 A1* | 5/2014 | Fleischmann | H01M 4/628 427/508 |
| 2014/0127577 A1* | 5/2014 | Fleischmann | H01M 4/628 429/215 |
| 2014/0136132 A1 | 5/2014 | Maekawa et al. | |
| 2014/0170475 A1* | 6/2014 | Park | H01M 4/0471 429/188 |
| 2014/0170478 A1* | 6/2014 | Liao | H01M 10/0567 429/207 |
| 2014/0184162 A1 | 7/2014 | Takahashi et al. | |
| 2014/0193713 A1* | 7/2014 | Kumaresan | H01M 4/664 429/234 |
| 2014/0193723 A1* | 7/2014 | Kumaresan | H01M 12/08 429/231.95 |
| 2014/0205912 A1* | 7/2014 | Skotheim | H01M 10/0525 429/313 |
| 2014/0255780 A1* | 9/2014 | Mikhaylik | H01M 6/14 429/231.95 |
| 2014/0272565 A1 | 9/2014 | Gronwald et al. | |
| 2014/0272594 A1 | 9/2014 | Safont et al. | |
| 2014/0272595 A1 | 9/2014 | Cristadoro et al. | |
| 2014/0272597 A1* | 9/2014 | Mikhaylik | H01M 10/058 156/278 |

(56) References Cited

U.S. PATENT DOCUMENTS

| | | | | |
|---|---|---|---|---|
| 2014/0295290 A1* | 10/2014 | Park | H01M 4/134 |
| | | | 156/60 |
| 2014/0354291 A1* | 12/2014 | Kikuchi | H01M 10/441 |
| | | | 324/434 |
| 2014/0376270 A1 | 12/2014 | Kern et al. | |
| 2015/0010804 A1* | 1/2015 | Laramie | H01M 4/1395 |
| | | | 429/144 |
| 2015/0044517 A1* | 2/2015 | Mikhaylik | H01M 4/382 |
| | | | 429/49 |
| 2015/0048796 A1 | 2/2015 | Sherstyuk et al. | |
| 2015/0050527 A1* | 2/2015 | Jiang | H01M 10/486 |
| | | | 429/9 |
| 2015/0086837 A1* | 3/2015 | Laramie | H01M 4/622 |
| | | | 204/290.03 |
| 2015/0155550 A1* | 6/2015 | Wilkening | H01M 4/0402 |
| | | | 429/212 |
| 2015/0162586 A1 | 6/2015 | Fleischmann et al. | |
| 2015/0171455 A1 | 6/2015 | Mills | |
| 2015/0180037 A1* | 6/2015 | Gronwald | C08F 12/30 |
| | | | 429/209 |
| 2015/0180084 A1* | 6/2015 | Scordilis-Kelley | |
| | | | H01M 10/058 |
| | | | 429/231.95 |
| 2015/0188194 A1 | 7/2015 | Mikhaylik et al. | |
| 2015/0202984 A1* | 7/2015 | Wyatt | B60L 7/16 |
| | | | 320/109 |
| 2015/0236320 A1* | 8/2015 | Laramie | H01M 50/46 |
| | | | 429/144 |
| 2015/0236322 A1 | 8/2015 | Laramie et al. | |
| 2015/0270710 A1 | 9/2015 | Carver et al. | |
| 2015/0280277 A1* | 10/2015 | Fleischmann | H01M 4/382 |
| | | | 429/126 |
| 2015/0287986 A1 | 10/2015 | Affinito et al. | |
| 2015/0287998 A1* | 10/2015 | Scordilis-Kelley | H01M 4/626 |
| | | | 429/231.95 |
| 2015/0318539 A1* | 11/2015 | Kelley | H01M 10/0525 |
| | | | 264/105 |
| 2015/0318552 A1* | 11/2015 | Skotheim | H01M 4/0426 |
| | | | 429/215 |
| 2015/0349310 A1* | 12/2015 | Viner | C08G 75/00 |
| | | | 429/126 |
| 2015/0349581 A1* | 12/2015 | Tochigi | H02J 7/0069 |
| | | | 320/148 |
| 2016/0043579 A1* | 2/2016 | Finberg | H02J 7/0016 |
| | | | 320/116 |
| 2016/0072132 A1 | 3/2016 | Liao et al. | |
| 2016/0079779 A1* | 3/2016 | Troxel | H01M 10/482 |
| | | | 320/118 |
| 2016/0107526 A1* | 4/2016 | Jin | B60L 7/10 |
| | | | 307/10.1 |
| 2016/0118638 A1 | 4/2016 | Gronwald et al. | |
| 2016/0118651 A1 | 4/2016 | Kovalev et al. | |
| 2016/0181674 A1* | 6/2016 | Kristofek | H01M 10/482 |
| | | | 429/62 |
| 2016/0197497 A1* | 7/2016 | Suzuki | H02J 7/0063 |
| | | | 320/112 |
| 2016/0252583 A1* | 9/2016 | Joe | G01R 31/3842 |
| | | | 702/63 |
| 2016/0276843 A1 | 9/2016 | Chang et al. | |
| 2016/0291683 A1* | 10/2016 | Kacker | H02J 7/0025 |
| 2016/0298590 A1* | 10/2016 | Garrard | F02P 3/08 |
| 2016/0301080 A1* | 10/2016 | Skotheim | H01M 4/136 |
| 2016/0344067 A1 | 11/2016 | Laramie et al. | |
| 2016/0352114 A1 | 12/2016 | Kaji et al. | |
| 2017/0018815 A1 | 1/2017 | Laramie et al. | |
| 2017/0047590 A1 | 2/2017 | Mikhaylik et al. | |
| 2017/0047619 A1* | 2/2017 | Zhu | H01M 50/157 |
| 2017/0104350 A1* | 4/2017 | Luerkens | H01M 10/4207 |
| 2017/0120772 A1* | 5/2017 | Alser | H02J 7/0019 |
| 2017/0141385 A1 | 5/2017 | Scordilis-Kelley et al. | |
| 2017/0141402 A1 | 5/2017 | Affinito et al. | |
| 2017/0141442 A1* | 5/2017 | Mikhaylik | H01M 10/058 |
| 2017/0149086 A1* | 5/2017 | Du | H01M 50/497 |
| 2017/0149089 A1* | 5/2017 | Liao | H01M 4/131 |
| 2017/0149253 A1* | 5/2017 | Takahashi | H01G 11/06 |
| 2017/0162851 A1* | 6/2017 | Wyatt | B60L 58/20 |
| 2017/0163060 A1* | 6/2017 | Zheng | H02J 7/0019 |
| 2017/0200975 A1* | 7/2017 | Liao | H01M 4/505 |
| 2017/0201102 A1* | 7/2017 | Hikosaka | H02J 7/02 |
| 2017/0250390 A1 | 8/2017 | Laramie et al. | |
| 2017/0261560 A1 | 9/2017 | Goto | |
| 2017/0264123 A1* | 9/2017 | Mulawski | H02J 7/0014 |
| 2017/0288208 A1* | 10/2017 | Kelley | H01M 4/043 |
| 2017/0338475 A1 | 11/2017 | Laramie et al. | |
| 2017/0341520 A1* | 11/2017 | Chang | B60L 58/24 |
| 2017/0352863 A1* | 12/2017 | Mikhaylik | H01M 4/13 |
| 2017/0371000 A1* | 12/2017 | Fukushima | H02J 7/0013 |
| 2017/0373321 A1* | 12/2017 | Skotheim | H01M 4/625 |
| 2018/0006303 A1 | 1/2018 | Mikhaylik et al. | |
| 2018/0006478 A1* | 1/2018 | Lei | H02J 7/0045 |
| 2018/0006490 A1* | 1/2018 | Lei | H02J 9/06 |
| 2018/0034100 A1* | 2/2018 | Du | H01M 50/497 |
| 2018/0040873 A1* | 2/2018 | Park | H01M 4/0471 |
| 2018/0048018 A1* | 2/2018 | Scordilis-Kelley | |
| | | | H01M 10/052 |
| 2018/0062154 A1* | 3/2018 | Park | H01M 4/1395 |
| 2018/0134173 A1 | 5/2018 | Takebayashi et al. | |
| 2018/0138486 A1 | 5/2018 | Wyatt et al. | |
| 2018/0138542 A1 | 5/2018 | Bunte et al. | |
| 2018/0145519 A1* | 5/2018 | Trigiani | H02J 7/00306 |
| 2018/0183261 A1 | 6/2018 | Kwak et al. | |
| 2018/0198114 A1* | 7/2018 | Bonhomme | H01M 4/134 |
| 2018/0198162 A1* | 7/2018 | Du | H01M 50/434 |
| 2018/0219211 A1* | 8/2018 | Park | H01M 4/667 |
| 2018/0219391 A1* | 8/2018 | Ishikawa | B60L 58/19 |
| 2018/0230610 A1 | 8/2018 | Laramie et al. | |
| 2018/0241236 A1* | 8/2018 | Vasefi | H01M 10/425 |
| 2018/0254516 A1 | 9/2018 | Han et al. | |
| 2018/0261820 A1 | 9/2018 | Liao et al. | |
| 2018/0269520 A1 | 9/2018 | Scordilis-Kelley et al. | |
| 2018/0277850 A1 | 9/2018 | Quero-Mieres et al. | |
| 2018/0287122 A1 | 10/2018 | Mikhaylik et al. | |
| 2018/0292465 A1 | 10/2018 | Osara et al. | |
| 2018/0301697 A1 | 10/2018 | Affinito et al. | |
| 2018/0323639 A1* | 11/2018 | Hall | H02J 7/00041 |
| 2018/0337406 A1 | 11/2018 | Mudalige et al. | |
| 2018/0342766 A1* | 11/2018 | Du | H01M 10/0525 |
| 2018/0351148 A1 | 12/2018 | Schneider et al. | |
| 2018/0351158 A1 | 12/2018 | Liao et al. | |
| 2018/0358651 A1 | 12/2018 | Liao et al. | |
| 2018/0358819 A1* | 12/2018 | Hellgren | B60L 58/22 |
| 2018/0366712 A1* | 12/2018 | Wyatt | H01M 10/06 |
| 2018/0366959 A1* | 12/2018 | Coenen | H02J 7/0016 |
| 2018/0375155 A1 | 12/2018 | Liao et al. | |
| 2018/0375348 A1* | 12/2018 | Weyen | H02J 7/0036 |
| 2019/0006609 A1 | 1/2019 | Jones et al. | |
| 2019/0036336 A1 | 1/2019 | Kuznetsov | |
| 2019/0047421 A1* | 2/2019 | Jin | B60L 7/10 |
| 2019/0074558 A1* | 3/2019 | Masias | H01M 10/4264 |
| 2019/0088958 A1 | 3/2019 | Viner et al. | |
| 2019/0137573 A1* | 5/2019 | Hatano | H02J 7/007184 |
| 2019/0148701 A1* | 5/2019 | Ashrafzadeh | H02J 7/0048 |
| | | | 429/158 |
| 2019/0199106 A1 | 6/2019 | Grasshoff | |
| 2019/0207394 A1* | 7/2019 | Troxel | H01M 10/441 |
| 2019/0210474 A1 | 7/2019 | Otsuki et al. | |
| 2019/0229323 A1 | 7/2019 | Mikhaylik et al. | |
| 2019/0267632 A1 | 8/2019 | Affinito et al. | |
| 2019/0267669 A1 | 8/2019 | Mikhaylik et al. | |
| 2019/0344682 A1* | 11/2019 | Ge | B60L 53/14 |
| 2019/0348672 A1 | 11/2019 | Wang et al. | |
| 2019/0372088 A1* | 12/2019 | Bonhomme | H01M 10/4235 |
| 2019/0386334 A1* | 12/2019 | Scordilis-Kelley | |
| | | | H01M 10/052 |
| 2020/0035978 A1* | 1/2020 | Wyatt | B60L 7/16 |
| 2020/0044460 A1* | 2/2020 | Mikhaylik | H01M 10/486 |
| 2020/0052503 A1* | 2/2020 | Statman | H02J 7/0048 |
| 2020/0086761 A1* | 3/2020 | Hamada | B60L 58/19 |
| 2020/0091547 A1* | 3/2020 | Scordilis-Kelley | H01M 4/136 |
| 2020/0099108 A1 | 3/2020 | Laramie et al. | |
| 2020/0106139 A1* | 4/2020 | Zhu | H01M 50/609 |
| 2020/0119324 A1* | 4/2020 | Laramie | H01M 50/489 |

(56) References Cited

U.S. PATENT DOCUMENTS

| | | | |
|---|---|---|---|
| 2020/0185764 A1* | 6/2020 | Liao | H01M 10/48 |
| 2020/0194822 A1* | 6/2020 | Laramie | H01M 10/052 |
| 2020/0212422 A1* | 7/2020 | Park | H01M 4/366 |
| 2020/0220146 A1 | 7/2020 | Laramie et al. | |
| 2020/0220149 A1 | 7/2020 | Laramie | |
| 2020/0220197 A1 | 7/2020 | Laramie et al. | |
| 2020/0220205 A1* | 7/2020 | Affinito | H01M 4/366 |
| 2020/0227785 A1* | 7/2020 | Mikhaylik | H01M 10/0568 |
| 2020/0235441 A1* | 7/2020 | Rahimian | H01M 10/425 |
| 2020/0235606 A1* | 7/2020 | Li | H02J 9/062 |
| 2020/0243824 A1 | 7/2020 | Wang et al. | |
| 2020/0259341 A1 | 8/2020 | Mikhaylik et al. | |
| 2020/0271279 A1* | 8/2020 | Xiong | H05B 45/10 |
| 2020/0274371 A1* | 8/2020 | Kirleis | B64D 27/24 |
| 2020/0313225 A1* | 10/2020 | Scordilis-Kelley | H01M 4/136 |
| | | | 429/231.95 |
| 2020/0343736 A1* | 10/2020 | Walter | H02J 7/04 |
| 2020/0350631 A1* | 11/2020 | Mikhaylik | H01M 4/136 |
| 2020/0350779 A1* | 11/2020 | Tikhonski | H02J 9/068 |
| 2020/0361337 A1* | 11/2020 | Ohmori | H02J 7/02 |
| 2020/0373764 A1* | 11/2020 | Lee | H02J 7/0063 |
| 2021/0006078 A1* | 1/2021 | Zheng | H02J 7/0014 |
| 2021/0075217 A1* | 3/2021 | Kuznetsov | H02K 7/025 |
| 2021/0119277 A1* | 4/2021 | Kim | H02J 7/0019 |
| 2021/0135192 A1* | 5/2021 | Gronwald | H01M 4/139 |
| 2021/0135205 A1* | 5/2021 | Laramie | H01M 50/431 |
| 2021/0135294 A1 | 5/2021 | Mikhaylik et al. | |
| 2021/0135297 A1 | 5/2021 | Mikhaylik et al. | |
| 2021/0151834 A1* | 5/2021 | Ashrafzadeh | H02J 7/0048 |
| 2021/0170881 A9* | 6/2021 | Jin | G01R 31/36 |
| 2021/0194264 A1* | 6/2021 | Hale | H01M 10/44 |
| 2021/0218243 A1* | 7/2021 | Hamblin | H01M 50/581 |
| 2021/0226456 A1* | 7/2021 | Takahashi | H01G 11/10 |
| 2021/0239762 A1 | 8/2021 | Zhang et al. | |
| 2021/0242445 A1* | 8/2021 | Bonhomme | H01M 4/661 |
| 2021/0249651 A1* | 8/2021 | Laramie | H01M 4/0419 |
| 2021/0265610 A1* | 8/2021 | Liao | C25B 11/095 |
| 2021/0281092 A1* | 9/2021 | Elidrissi | H02J 7/0049 |
| 2021/0281093 A1 | 9/2021 | Elidrissi et al. | |
| 2021/0293390 A1* | 9/2021 | Xiong | H05K 1/14 |
| 2021/0309111 A1* | 10/2021 | Jin | G01R 31/382 |
| 2021/0328274 A1 | 10/2021 | Mikhaylik et al. | |
| 2021/0376610 A1* | 12/2021 | Kuznetsov | H02J 7/0068 |
| 2021/0391731 A1* | 12/2021 | Kirleis | H01M 10/465 |
| 2021/0408550 A1* | 12/2021 | Liao | H01M 4/5825 |
| 2021/0408598 A1* | 12/2021 | Mikhaylik | H01M 4/405 |
| 2022/0029191 A1* | 1/2022 | Scordilis-Kelley | |
| | | | H01M 10/0468 |
| 2022/0069274 A1* | 3/2022 | Park | H01M 4/134 |
| 2022/0069593 A1* | 3/2022 | Hamblin | H02J 7/0013 |
| 2022/0109215 A1* | 4/2022 | Laramie | H01M 50/451 |
| 2022/0140620 A1* | 5/2022 | Kang | H02J 7/007182 |
| | | | 320/118 |
| 2022/0173372 A1* | 6/2022 | Park | H01M 4/622 |
| 2022/0173373 A1* | 6/2022 | Park | H01M 4/0404 |
| 2022/0173374 A1* | 6/2022 | Bonhomme | H01M 4/0404 |
| 2022/0190396 A1* | 6/2022 | Laramie | H01M 4/366 |
| 2022/0209284 A1* | 6/2022 | Liao | H01M 10/48 |
| 2022/0255188 A1* | 8/2022 | Schneider | H01M 4/382 |
| 2022/0271537 A1 | 8/2022 | Mikhaylik et al. | |
| 2022/0278354 A1* | 9/2022 | Laramie | H01M 50/451 |
| 2022/0278429 A1* | 9/2022 | Laramie | H01M 50/581 |
| 2022/0285951 A1* | 9/2022 | Yoon | B60L 58/22 |
| 2022/0285957 A1 | 9/2022 | Lim et al. | |
| 2022/0320493 A1* | 10/2022 | Frieberg | H01M 10/0562 |
| 2022/0336872 A1 | 10/2022 | Mikhaylik et al. | |
| 2022/0359882 A1* | 11/2022 | Affinito | H01M 4/628 |
| 2022/0407127 A1 | 12/2022 | Mikhaylik et al. | |
| 2023/0010942 A1* | 1/2023 | Burkell | H02J 7/0013 |
| 2023/0043269 A1 | 2/2023 | Wang et al. | |
| 2023/0106718 A1 | 4/2023 | Mikhaylik et al. | |
| 2023/0120877 A1* | 4/2023 | Mikhaylik | H01M 10/058 |
| | | | 429/491 |
| 2023/0207908 A1* | 6/2023 | Laramie | H01M 50/581 |
| | | | 429/50 |
| 2023/0268763 A1* | 8/2023 | Li | H02J 7/342 |
| | | | 320/116 |
| 2023/0318345 A1* | 10/2023 | Morita | B60L 1/00 |
| | | | 320/163 |
| 2023/0344247 A1* | 10/2023 | Sessions | H02J 7/007182 |
| 2023/0344255 A1* | 10/2023 | Elidrissi | A61M 5/142 |
| 2023/0356627 A1* | 11/2023 | Burkell | H02J 7/0068 |
| 2024/0010142 A1* | 1/2024 | Morita | B60L 58/20 |
| 2024/0113320 A1* | 4/2024 | Scordilis-Kelley | H01M 4/133 |
| 2024/0142538 A1* | 5/2024 | Ashrafzadeh | H02M 7/1557 |
| 2024/0170633 A1* | 5/2024 | Liao | H01M 4/0407 |
| 2024/0204539 A1* | 6/2024 | Qiu | H02J 7/0014 |
| 2024/0266621 A1* | 8/2024 | Mikhaylik | H02J 7/0019 |
| 2024/0266639 A1* | 8/2024 | Niedzwiecki | H01M 10/653 |
| 2024/0291292 A1* | 8/2024 | Mikhaylik | H02J 7/0019 |
| 2024/0372388 A1* | 11/2024 | Elidrissi | H02J 7/0048 |

FOREIGN PATENT DOCUMENTS

| | | |
|---|---|---|
| CN | 100541969 C | 9/2009 |
| CN | 103825060 A | 5/2014 |
| CN | 104838560 A | 8/2015 |
| CN | 105262155 A | 1/2016 |
| CN | 105984356 A | 10/2016 |
| CN | 205960703 U | 2/2017 |
| CN | 205960712 U | 2/2017 |
| CN | 107534189 A | 1/2018 |
| CN | 107852002 A | 3/2018 |
| CN | 108075511 A | 5/2018 |
| CN | 108110815 A | 6/2018 |
| CN | 110311451 A | 10/2019 |
| CN | 111251940 A | 6/2020 |
| CN | 115207334 A | 10/2022 |
| DE | 10 2014 212122 A1 | 1/2016 |
| DE | 102018217382 A1 * | 4/2020 |
| EP | 0 981 194 A2 | 2/2000 |
| EP | 1 280 252 A2 | 1/2003 |
| EP | 2 631 663 A1 | 8/2013 |
| GB | 2569140 A | 6/2019 |
| JP | H07-65867 A | 3/1995 |
| JP | H09-283184 A | 10/1997 |
| JP | H10-123225 A | 5/1998 |
| JP | 2000-106219 A | 4/2000 |
| JP | 2002-042896 A | 2/2002 |
| JP | 2003-031267 A | 1/2003 |
| JP | 2009-181907 A | 8/2009 |
| JP | 2011-182623 A | 9/2011 |
| JP | 2012-156025 A | 8/2012 |
| JP | 2013-207844 A | 10/2013 |
| JP | 2014-171369 A | 9/2014 |
| JP | 2015-122151 A | 7/2015 |
| JP | 2015-176829 A | 10/2015 |
| JP | 2017-139841 A | 8/2017 |
| JP | 2017-225350 A | 12/2017 |
| JP | 2018-081807 A | 5/2018 |
| JP | 2019-161781 A | 9/2019 |
| JP | 2019-187027 | 10/2019 |
| JP | 2020061004 A * | 4/2020 |
| KR | 20000012125 A | 2/2000 |
| KR | 100277654 B1 | 1/2001 |
| KR | 20030046747 A | 1/2003 |
| KR | 2010-0098550 A | 9/2010 |
| KR | 2015-0028775 A | 3/2015 |
| KR | 20150043265 A | 4/2015 |
| KR | 101522858 B1 | 5/2015 |
| KR | 20200091466 A | 7/2020 |
| RU | 2683235 C1 | 3/2019 |
| RU | 2736777 C1 | 11/2020 |
| WO | WO 2012/167019 A1 | 12/2012 |
| WO | WO 2015/075508 A1 | 5/2015 |
| WO | WO 2015/193041 A1 | 12/2015 |
| WO | WO 2016/100262 A1 | 6/2016 |
| WO | WO 2019/150836 | 8/2019 |
| WO | WO 2020/028485 A1 | 2/2020 |

(56)                    References Cited

FOREIGN PATENT DOCUMENTS

WO        WO 2021/086377  A1        5/2021
WO        WO 2022/051308  A1        3/2022

OTHER PUBLICATIONS

Louli et al., Optimizing Cycling Conditions for Anode-Free Lithium
Metal Cells. J Electrochem Soc. Feb. 5, 2021;168:020515. 15 pages.
International Search Report and Written Opinion for International
Application No. PCT/US2021/048557 mailed Dec. 20, 2021.
International Preliminary Report on Patentability for International
Application No. PCT/US2021/048557 dated Mar. 21, 2023.
Liu et al., Dynamic spatial progression of isolated lithium during
battery operations. Nature. Dec. 2021;600(7890):659-663. doi: 10.1038/
s41586-021-04168-w. Epub Dec. 22, 2021.
Office Action for JP Application No. 2023-513650 dated Aug. 12,
2025.
Office Action for KR Application No. 10-2023-7010937 dated Feb.
9, 2026.

\* cited by examiner

Input/
Output Bus
321IO

Cell Multiplexing Switches 326A1

Cell Balance Switches and Resistors 326A2

Cell 321C

Cell 321B

Cell 321A

360A Sensor

Cell Block Microcontroller 327A

Battery Management Microcontroller Interface 328A

Begin

430A
Selectively discharge strings of cells in battery
using multiplexing switch apparatus End

400A

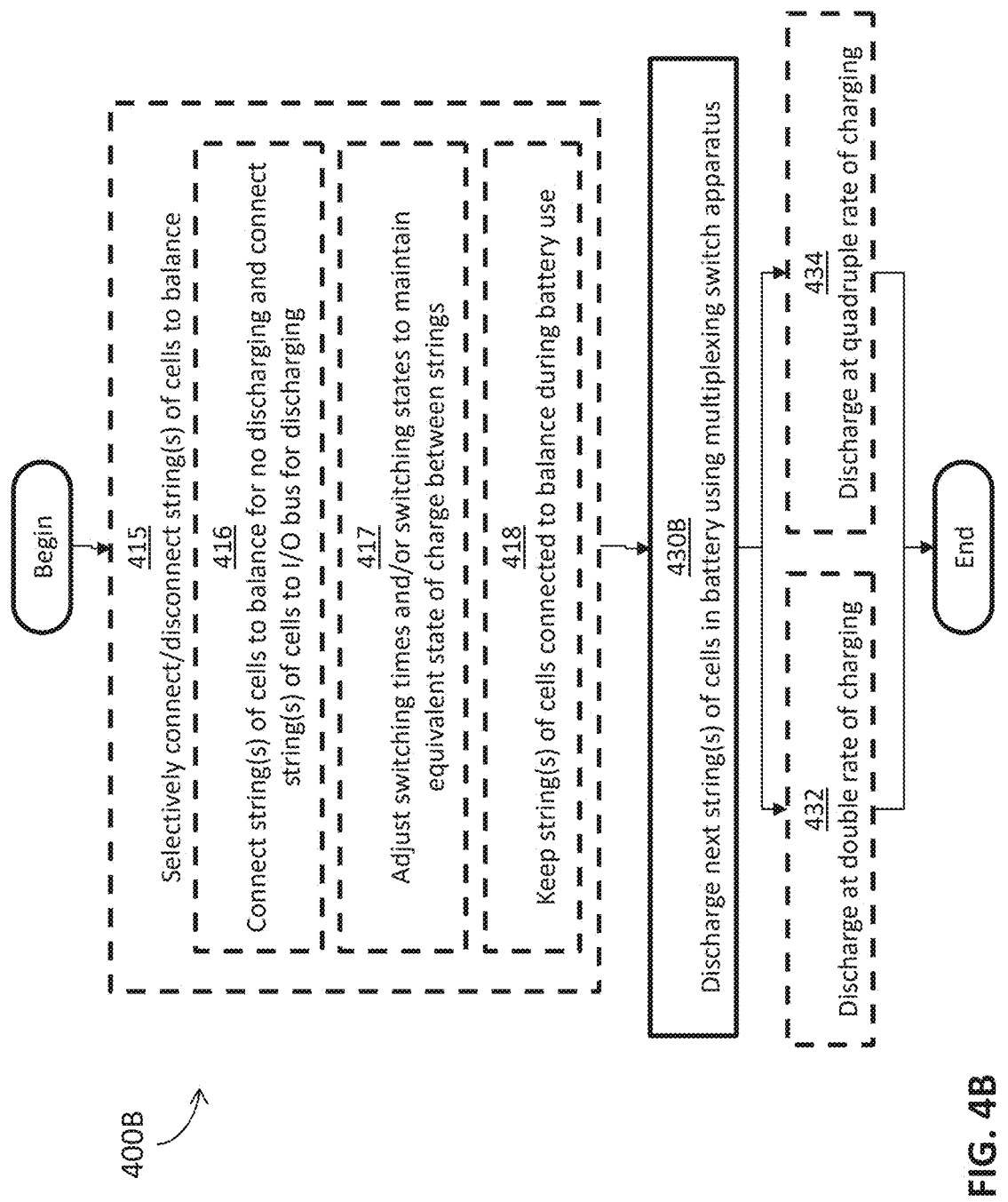

Begin

415
Selectively connect/disconnect string(s) of cells to balance

416
Connect string(s) of cells to balance for no discharging and connect string(s) of cells to I/O bus for discharging 417
Adjust switching times and/or switching states to maintain equivalent state of charge between strings 418
Keep string(s) of cells connected to balance during battery use 430B
Discharge next string(s) of cells in battery using multiplexing switch apparatus 432
Discharge at double rate of charging 434
Discharge at quadruple rate of charging End

Begin

430C
Selectively discharge sets of cells in battery based on criterion using multiplexing switch apparatus End

400C

500

Begin

530
Control switch(es) to discharge sets of cells in battery sequentially using integrated switching control system End

600A

630A
Control switch(es) to discharge sets of cells in battery based on criterion using integrated switching control system Begin End

MULTIPLEXED BATTERY MANAGEMENT SYSTEM

RELATED APPLICATIONS

This application claims priority under 35 U.S.C. § 119(e) to U.S. Provisional Application No. 63/073,383, filed Sep. 1, 2020, and entitled "Multiplexed Charge Discharge String Battery Management System," which is incorporated herein by reference in its entirety for all purposes.

TECHNICAL FIELD

Charge/discharge management of electrochemical cells, and related systems, are generally described.

BACKGROUND

Conventionally, batteries have failed to compete successfully with established power sources such as combustion engines in various industries, such as vehicles. One reason for this failure has been that battery users have been dissatisfied with the longevity and performance that batteries have conventionally provided.

SUMMARY

Some embodiments of the invention are directed to a battery management system comprising: at least one battery comprising two or more strings of cells, each string of cells comprising two or more cells; a multiplexing switch apparatus connected to each string of cells; and at least one controller configured to use the multiplexing switch apparatus to transition between discharging of a first string of cells and discharging of a second string of cells while keeping a voltage difference between the first string and the second string below a threshold voltage difference.

Some other embodiments are directed to a battery management system comprising: at least one battery comprising two or more strings of cells, each string of cells comprising two or more cells; a multiplexing switch apparatus connected to each string of cells; and at least one controller configured to use the multiplexing switch apparatus to transition between discharging of a first string of cells and discharging of a second string of cells while keeping an overall output voltage of the battery within a window.

Further embodiments are directed to a battery management system comprising: at least one battery comprising two or more strings of cells, each string of cells comprising two or more cells; a multiplexing switch apparatus connected to each string of cells; and at least one controller configured to use the multiplexing switch apparatus to transition between discharging of a first string of cells and discharging of a second string of cells while keeping an in-rush current resulting from the transition below a threshold current.

Some other embodiments are directed to a battery management system comprising: at least one battery comprising two or more strings of cells, each string of cells comprising two or more cells; a multiplexing switch apparatus connected to each string of cells; and at least one controller configured to use the multiplexing switch apparatus to control a duration of pulse discharge of at least one string of the strings of cells based on at least one criterion.

Further embodiments are directed to a battery pack comprising: at least one battery comprising two or more strings of cells, each string of cells comprising two or more cells; and an integrated switching control system comprising at least one switch connected to each string of cells, wherein the integrated switching control system is configured to control the at least one switch to discharge a first string having a first voltage at a time of measurement while discharging the first string and not a second string, and then to discharge the second string having a second voltage that is closest to the first voltage at the time of measurement.

Some other embodiments are directed to a battery management method comprising: using a multiplexing switch apparatus, which is connected to two or more strings of cells of at least one battery, to transition between discharging of a first string of cells and discharging of a second string of cells while keeping a voltage difference between the first string and the second string below a threshold voltage difference, wherein each string of cells comprises two or more cells.

Further embodiments are directed to a battery management method comprising: using a multiplexing switch apparatus, which is connected to two or more strings of cells of at least one battery, to transition between discharging of a first string of cells and discharging of a second string of cells while keeping an overall output voltage of the battery within a window, wherein each string of cells comprises two or more cells.

Some other embodiments are directed to a battery management method comprising: using a multiplexing switch apparatus, which is connected to two or more strings of cells of at least one battery, to transition between discharging of a first string of cells and discharging of a second string of cells while keeping an in-rush current resulting from the transition below a threshold current, wherein each string of cells comprises two or more cells.

Some embodiments of the invention are directed to a battery management system comprising: at least one battery comprising two or more strings of cells, each string of cells comprising two or more cells; a multiplexing switch apparatus connected to each string of cells; and at least one controller configured to use the multiplexing switch apparatus to selectively discharge the strings of cells.

Some other embodiments are directed to a battery pack comprising: at least one battery comprising two or more strings of cells, each string of cells comprising two or more cells; and an integrated switching control system comprising at least one switch connected to each string of cells, wherein the integrated switching control system is configured to control the at least one switch to discharge the strings of cells.

Further embodiments are directed to a battery management method. The method may comprise using a multiplexing switch apparatus, which is connected to two or more strings of cells of at least one battery, to selectively discharge each string of cells, wherein each string of cells comprises two or more cells.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 4B is a flow chart depicting an additional representative process for discharging strings of cells of a battery, according to some embodiments.

DETAILED DESCRIPTION

Figure 1A:
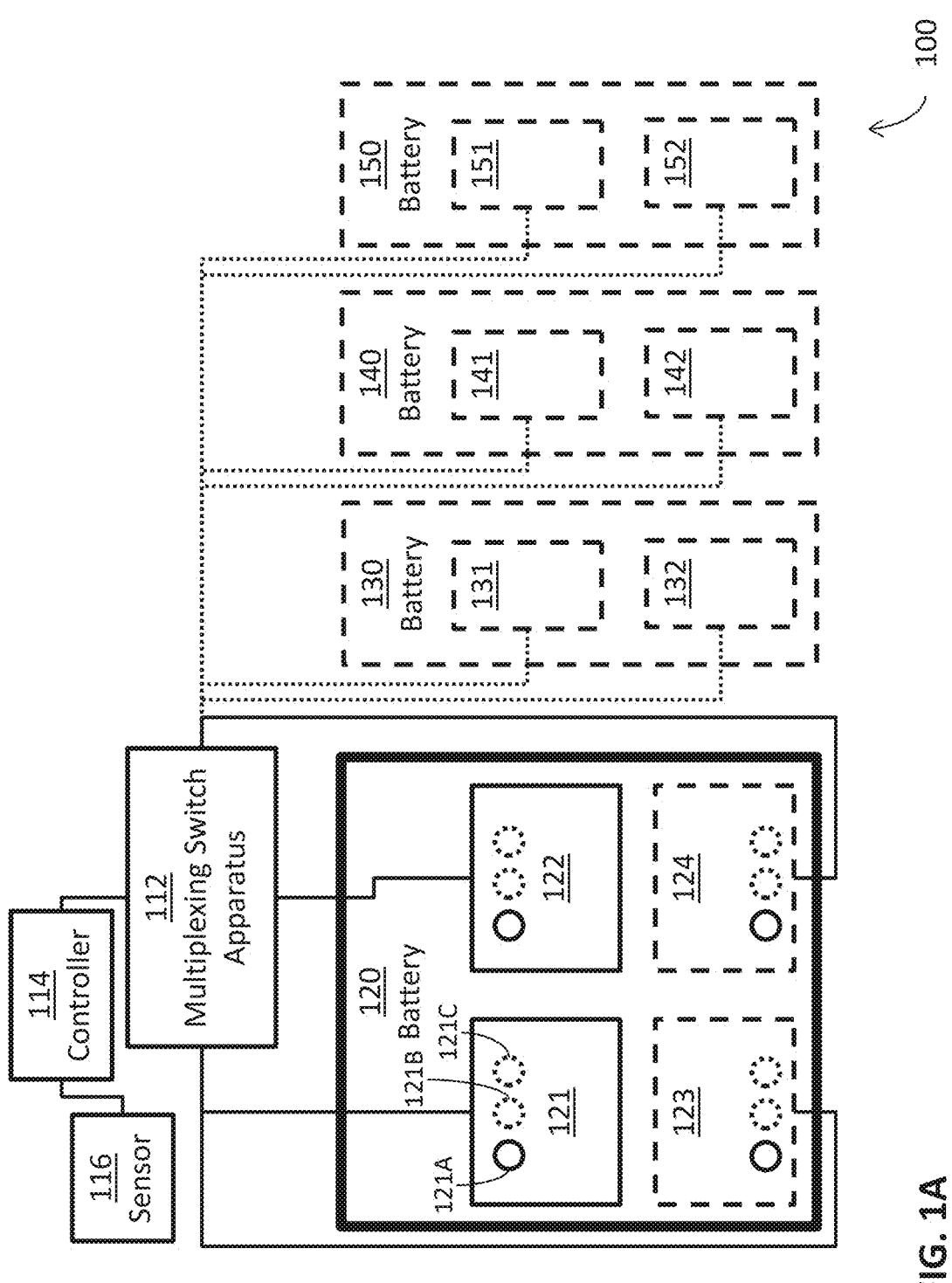
FIG. 1A is a block diagram illustrating a representative battery management system, according to some embodiments.

The inventors have recognized and appreciated that conventional techniques for management and operation of rechargeable electrochemical cells have resulted in the previously poor longevity and performance of cells (and batteries in which they may be included). For example, cells have suffered a short cycle life (e.g., a low number of complete charge and discharge cycles before capacity falls below 80% of original capacity, as cells typically do at some point after sufficient usage), particularly where charge and discharge rates are similar, or where the charge rate is higher than the discharge rate. For example, many users of cells in batteries have desired the batteries to have nearly identical charge and discharge rates (e.g., 4 hours to charge and 4 hours to discharge), and battery manufacturers have provided batteries and battery management systems that provide such nearly identical rates. Many users have also desired batteries to charge at higher rates than they discharge (e.g., 30 minutes to charge and 4 hours to discharge) for various reasons, such as to reduce inconvenience of waiting for charging to use the batteries.

The term "complete charge cycle" is used herein to generally refer to a period of time during which about 100% of a cell's re-charge capacity is charged, and the term "complete discharge cycle" is used to generally refer to a period of time during which about 100% of the cell's discharge capacity (which may be different from its re-charge capacity) is discharged. On the other hand, the term "charging step" is used herein to generally refer to a continuous period of time during which charging is performed without discharging, and the term "discharging step" is used herein to generally refer to a continuous period during which discharging is performed without charging.

The term "charge cycle" is used to generally refer to a period of time during which the cell is charged, and it need not be a complete charge cycle. The term "discharge cycle" is used to generally refer to a period of time during which the cell is discharged, and it need not be a complete discharge cycle. The term "previous discharge cycle" is used to generally refer to a period of time during which the cell has been or is being discharged. For example, this "previous" discharge cycle may have been completed or may still be in progress—it need not refer to the most recent completed discharging steps that sum to about 100% of the cell's discharge capacity. If no complete discharge cycle has been performed, the previous discharge cycle may refer to any previously completed discharging steps.

The term "capacity" is used to generally refer to an amount of electrical charge a cell or cells can deliver at a given or rated voltage and is often measured in amp-hours (such as milliamp-hours or mAh). In some embodiments, capacity may be the mAh a cell or cells can hold at a given point in time (which may change over multiple charge or discharge cycles), it may be the mAh remaining in a cell or cells at a given point in time, or it may be the mAh a cell or cells need to fully re-charge.

The inventors have recognized and appreciated that the cycle life of cells (and batteries including the cells), and consequently the longevity and performance of the cells (and batteries), may be greatly improved by employing higher ratios of discharge rate to charge rate. Furthermore, the inventors have recognized and appreciated that these ratios may be employed even in high voltage (e.g., 60 volts and higher) applications by providing a battery management system that controls strings of cells or modules within the batteries to provide such ratios. For example, some embodiments are directed to a battery management system that multiplexes strings of cells such that the strings can be charged all at once or with multiple at a time and discharged individually or in smaller sets. This may result in actual ratios of discharge rate to charge rate for the cells that improve their cycle life, while providing whatever output rates that are desired or required for particular loads and applications. Furthermore, the inventors have recognized and appreciated that discharging some but not all of the strings at once with homogeneous current distribution may also improve their cycle life.

For example, with a battery having 4 strings of cells, 1 string could be discharged at a time at 0.5 amps for 3 hours each, and then all 4 strings could be charged at 0.5 amps for 12 hours-such a configuration would provide an actual ratio of discharge rate to charge rate of 4:1, while the ratio from the user's perspective would be 1:1 because the strings are discharged individually for 3 hours each (totaling 12 hours of discharge time). The inventors have recognized and appreciated that such a battery management system may actually improve the cycle life of batteries while still providing users what they desire or need from the batteries. In some embodiments, the functionality of providing this duo of benefits may be hidden from users and may be integrated into strings, cell blocks, and/or batteries themselves. In some embodiments, a given string may include at least 15 cells.

The inventors have recognized and appreciated that even high voltage applications may be possible by using such a battery management system with strings of cells or modules. For example, by connecting individual cells or modules of cells in series as strings, the total voltage of a given string and/or that applied to a load can be far higher than the 4.1 volts that might otherwise be available from an individual cell. For example, the inventors have recognized and appreciated that some applications require voltages of 60 volts, 80 volts, 110 volts, 220 volts, 300 volts, 400 volts, or even 800-2000 volts, and such a battery management system with strings of cells or modules may provide any or all of these and other voltages.

The inventors have recognized and appreciated that many applications require uninterrupted power and nearly constant voltage, such as electric vehicles. For example, an electric vehicle may not be able to provide the acceleration or performance needed without uninterrupted power and nearly constant voltage. In such applications, when one string or cell is being discharged, the inventors have recognized and appreciated that transitioning to the next string or cell should not be performed simply by ending discharge of that first string and thereafter starting discharge of a second string, as that would create an interruption in power delivery and drastic voltage fluctuations. Rather, the second string should start discharging before the first string stops discharging to avoid this total interruption.

The inventors have recognized and appreciated that voltage fluctuations could be further reduced or avoided by carefully selecting the string(s) to discharge. The first string (the string away from which the system is transitioning) will typically have different voltage than the second string (e.g., the first string may have lower voltage in many cases due to greater usage, but the first string may also have higher voltage). This change in voltage transitioning between the first string and second string leads to an in-rush current. The inventors have recognized and appreciated the importance of minimizing such an in-rush current, as the circuitry and electronic components of many battery management systems are not designed to sustain high current without burning up. The inventors have recognized and appreciated that carefully selecting the string(s) to discharge to minimize the voltage delta is the most desirable way of minimizing such in-rush current. Other ways to handle such an in-rush current include using a pre-charge circuit or similar components.

However, such additional components add cost, complexity, volume, and weight to a battery system, which may be either prohibitive or greatly disadvantageous in various applications, such as in an electric vehicle. The inventors have recognized and appreciated that such disadvantages can be avoided using embodiments discussed herein to carefully select string(s) for discharging that minimize voltage fluctuation and resulting in-rush current.

The inventors have recognized and appreciated that the cycle life of batteries may be further improved by monitoring the cycles of the cells and various properties (such as the duration of a connection between a load and a cell or cells currently connected to the load, or a more complex function considering multiple parameters) and selecting which cells to discharge when based on this monitoring, especially compared to conventional techniques, which relied on much simpler selection processes like "round robin" or considering a number of prior discharge cycles.

FIG. 1A depicts a representative battery management system 100. In some embodiments, representative system 100 may include a multiplexing switch apparatus (e.g., 112), a controller (e.g., 114), one or more sensors (e.g., 116), and one or more batteries (e.g., 120, 130, 140, 150, and so on). It should be appreciated that although only a single multiplexing switch apparatus 112, controller 114, sensor 116, and only four batteries 120-150 are shown in FIG. 1A, any suitable number of these components may be used. Any of numerous different modes of implementation may be employed. Furthermore, although a label in the singular is used herein to reference a multiplexing switch apparatus, it should be appreciated that the components used for the multiplexing and switching described herein may be distributed across any suitable number of devices (e.g., switches).

According to some embodiments, the battery or batteries may include at least one lithium-metal battery. Additionally, the battery or batteries (e.g., 120-150) may respectively include one or more cell sets (e.g., 121-124, 131-132, 141-142, 151-152, and so on), referred to also as sets of cells. In some embodiments, one or more cell sets or sets of cells may form strings of cells or cell strings, as discussed herein (in some embodiments, 121-124 may be referred to as strings). For example, strings of cells may comprise modules of cells or individual cells connected in series. In some embodiments, the cells of a module may be connected to each other in parallel within the module, while modules may be connected to each other in series. Alternatively or additionally, the cells of a module may be connected to each other in series within the module. Alternatively or additionally, modules may be connected to each other in parallel.

In some embodiments, two or more strings or sets of cells are included in each battery, such as 121-122 and so on. Additionally, each string or set of cells (e.g., 121) may include one or more cells or modules of cells (e.g., 121A-121C). According to some embodiments, the cell(s) may include at least one lithium-metal electrode active material. In some embodiments, each module or each set of cells may have a single cell. Alternatively, each module or each set of cells may include multiple cells and may form a cell "block," or multiple modules or sets of cells may together form a cell block. Additionally, each cell (either in a battery, all the batteries in a battery pack, or in a set of cells) or set of cells may utilize the same electrochemistry. That is to say, in some embodiments, each cell may make use of the same anode active material and the same cathode active material.

In some embodiments, a multiplexing switch apparatus (e.g., 112) may include an array of switches, such as those further described in relation to FIGS. 1B, 3A, and 3B below.

Additionally, the multiplexing switch apparatus may be connected to each string or set of cells and/or to each module or cell individually. In some embodiments, the controller, such as 114, may use the multiplexing switch apparatus to selectively discharge the strings, cells, or sets of cells. For example, in some embodiments the controller may use the multiplexing switch apparatus to selectively pulse discharge modules one at a time, sequentially moving through all modules within a battery.

In some embodiments, the discharging may be based on at least one criterion. For example, the criterion may include a sequence in which to discharge the strings, cells, or sets of cells, such as a predefined numbering or order associated with the strings or sets of cells (e.g., starting with a first string or set, switching through each string or set to the last string or set, and then starting over with the first string or set), and/or an order based on the string(s), cell(s), or set(s) of cells with the next highest voltage or some other measure indicating the next strongest. The inventors have recognized and appreciated that using a sequence, especially a predefined numbering, may reduce the complexity of the operations performed by the system (e.g., a controller that is not a microprocessor) and may be usable by a wider array of systems.

In some embodiments, a controller, such as 114, may include at least one cell string controller (e.g., a cell string microcontroller) that monitors and manages at least one of the strings of cells. Additionally, the controller may include at least one battery management controller (e.g., a battery management microcontroller) configured to monitor and manage at least one parameter of at least one of the batteries. For example, a cell string microcontroller may monitor all the strings of the battery management system and control multiplexing between (and charging and discharging of) the strings in some embodiments. Additionally, a battery management microcontroller may monitor a single string and multiple battery management microcontrollers may communicate with a single cell string microcontroller, in some embodiments.

In some embodiments, the cell string microcontroller may include its own separate high voltage controller to connect and disconnect strings. Alternatively, individual battery management microcontrollers may include an integrated switch for their respective entire string that can turn string on or off via a command from the cell string microcontroller. In some embodiments, each battery management microcontroller may include at least one CAN bus and/or serial bus.

In some embodiments, the positions and roles of the battery management microcontroller(s) and cell string microcontroller may be interchanged. For example, a cell string microcontroller may determine the required state of a given string by monitoring its voltage and current, as well as by monitoring communication from a battery management microcontroller. In some embodiments, switching waveforms generated by the cell string microcontroller may ensure that overlap and dead band requirements for the switching is appropriate for the application of the battery management system (e.g., load requirements—the battery management system may include the switch multiplexing required to connect the cell strings in the series, parallel, or serial/parallel topology required to meet the voltage and current requirements of the application). Additionally, battery management microcontroller may monitor and control the charging and discharging of the strings and cells to ensure the safe operation of all components. The battery management microcontroller may also communicate with the end user as well as internal production, calibration, and test equipment.

In some embodiments, the controller, such as 114, may use the multiplexing switch apparatus to transition between discharging of a first string of cells (e.g., 121) and discharging of a second string of cells (e.g., any of 122-124) while keeping a voltage difference between the first string and the second string below a threshold voltage difference. For example, the threshold voltage difference may be such that an in-rush current resulting from the transition is at most 15 amperes. In some embodiments, the threshold voltage difference may be such that the in-rush current resulting from the transition is at most 10 amperes or at most 8 amperes. In accordance with some embodiments, keeping the voltage difference between the strings below such a threshold can reduce voltage fluctuation, leading to improved or ensured performance for the load (e.g., of an electric vehicle) without relying on a pre-charge circuit or similar component and their associated cost, complexity, volume, and weight.

In some embodiments, the threshold voltage difference may be at most 8% of a maximum total voltage of the first string or the second string. In some embodiments, the threshold voltage difference may be at most 5% of the maximum total voltage of the first string or the second string. In some embodiments, the maximum total voltage of a string may be the maximum voltage for which the string is rated and/or that the string can have, which may be its voltage at full charge. In accordance with some embodiments, using such voltage difference thresholds can reduce voltage fluctuation, leading to improved or ensured performance for the load (e.g., of an electric vehicle) without relying on a pre-charge circuit or similar component and their associated cost, complexity, volume, and weight.

In some embodiments, the controller, such as 114, may use the multiplexing switch apparatus to transition between discharging of the first string of cells and discharging of the second string of cells while keeping an overall output voltage of the battery within a window. For example, the window may be plus or minus 10% of the output voltage demanded by the load, such as 60 volts. In accordance with some embodiments, keeping the overall output voltage within such a window can reduce voltage fluctuation, leading to improved or ensured performance (e.g., of an electric vehicle) without relying on a pre-charge circuit or similar component and their associated cost, complexity, volume, and weight.

In some embodiments, the controller, such as 114, may use the multiplexing switch apparatus to transition between discharging of the first string of cells and discharging of the second string of cells while keeping an in-rush current resulting from the transition below a threshold current. For example, the threshold current may be at most 15 amperes. In some embodiments, the threshold current may be at most 10 amperes.

In some embodiments, the threshold voltage difference is such that an in-rush current resulting from the transition may be at most 15 amperes. In some embodiments, the threshold voltage difference is such that an in-rush current resulting from the transition may be at most 10 amperes.

In accordance with some embodiments, keeping the in-rush current resulting from the transition below a threshold current can reduce voltage fluctuation, leading to improved or ensured performance (e.g., of an electric vehicle) without relying on a pre-charge circuit or similar component and their associated cost, complexity, volume, and weight.

In some embodiments, the controller may determine which string of cells to transition to from the first string based on a comparison between respective voltages of the two or more strings of cells. For example, the controller may transition to a string of cells having a lowest voltage difference, of the strings of cells being considered or available, from the first string, at a time of measurement while discharging solely the first string. In some embodiments, the controller may transition to a string of cells having the highest voltage of the strings of cells at the time of measurement. In some embodiments, the controller may transition to a string of cells having the lowest voltage of the strings of cells at the time of measurement. The inventors have recognized and appreciated that transitioning to the nearest voltage string may provide the best chance of the lowest delta in many situations, while being more computationally expensive, whereas transitioning to the highest or lowest voltage string may be a less computationally expensive but less accurate alternative.

In some embodiments, the controller may transition between discharging of the first string and discharging of the second string when a voltage of the first string decreases to a threshold voltage. For example, the threshold voltage may be such that an in-rush current resulting from the transition may be at most 15 amperes or 10 amperes, or such that the voltage difference between the first string and the second string may be at most 8% or 5% of a maximum total voltage of the first string or the second string. In accordance with some embodiments, transitioning to another string when the currently discharging string decreases to a threshold voltage can reduce voltage fluctuation, leading to improved or ensured performance (e.g., of an electric vehicle) without relying on a pre-charge circuit or similar component and their associated cost, complexity, volume, and weight.

In some embodiments, the controller may temporally overlap the discharge of the first string and the second string, similar to the overlap discussed herein regarding cell sets. In some embodiments, the controller may continue to provide power from the strings of cells during switching between different strings, similar to the continued provision of power discussed herein regarding cell sets. The inventors have recognized and appreciated that this temporal overlap of discharging and continuation of power may maintain the power requirements of the load even during transition between different strings of cells, which may further improve the cycle life of the cells compared to conventional techniques. Accordingly, multiple strings may discharge simultaneously during such an overlap. Additionally, such an overlap may provide smoother transition of voltage than has been possible with conventional techniques.

In some embodiments, the controller may use the multiplexing switch apparatus to control a duration of pulse discharge of at least one of the strings of cells based on at least one criterion. For example, a criterion may comprise a demand of a load (e.g., a power demand of the load), or a voltage difference between the at least one string of the strings of cells and at least one other string of the strings of cells.

In some embodiments, the criterion may comprise the demand of the load, and the controller may use the multiplexing switch apparatus to control the duration of the pulse discharge to be longer when the demand of the load decreases and to be shorter when the demand of the load increases. For example, if the power demand of the load is low (e.g., less than 50% of rated power), the pulse discharge may be controlled to run for 1 minute, whereas if the power demand is high (e.g., 90% or more of rated power), the pulse discharge may be controlled to be less than a second, or numerous strings may be discharged simultaneously in extremely high demand cases (such as an electric vehicle starting). In accordance with some embodiments, making pulse discharge duration inversely proportional to load demand can reduce voltage fluctuation, leading to improved or ensured performance (e.g., of an electric vehicle) without relying on a pre-charge circuit or similar component and their associated cost, complexity, volume, and weight.

In some embodiments, the controller, such as 114, may use the multiplexing switch apparatus to discharge a first string (e.g., 121) having a first voltage at a time of measurement while discharging the first string, and not discharge the second string yet, and then to discharge the second string as well, which may have a second voltage that is closest to the first voltage (at the same time of measurement, or at another time within 1 minute of the previous time) out of other strings being considered or available. In accordance with some embodiments, transitioning to the closest voltage string can reduce voltage fluctuation, leading to improved or ensured performance (e.g., of an electric vehicle) without relying on a pre-charge circuit or similar component and their associated cost, complexity, volume, and weight.

In some embodiments, a criterion may be context-sensitive, such as by considering any one or more of the following: a duration of a connection between a load and a set of cells currently connected to the load (which may be at least 0.01 seconds in some embodiments), a delivered discharge capacity at the connection, and the value of a function having one or more parameters. In certain embodiments, the criterion may not include a number of prior discharge cycles of the set of cells.

In some embodiments, the function may have parameters such as any one or more of the following: a capacity accumulated over several connections between the load and the set of cells, the delivered discharge capacity at the connection, a current of the set of cells, a voltage of the set of cells and/or of at least one other set of cells, a cutoff discharge voltage of the set of cells, a power of the set of cells, an energy of the set of cells, a number of charge or discharge cycles of the set of cells, an impedance of the set of cells, a rate of voltage fading of the set of cells during the connection, a temperature of the set of cells, and a pressure of the set of cells (e.g., the pressure on the cell(s) from their physical enclosure, which may indicate cell capacity and is discussed further below). According to some embodiments, the delivered discharge capacity at a single connection may be in the range from 0.01% of nominal capacity to 100% (e.g., 95%) of set nominal capacity.

In some embodiments, a sensor (e.g., 116) may measure the criterion and/or any of the parameters of the function. For example, the sensor may include a current sensor that measures the current in amperes of a given set of cells. It should be appreciated that the criterion may be plural or singular and may relate to the currently discharging set of cells and/or may determine the next set of cells.

In some embodiments, the controller (e.g., 114) may include one or more processors, which may be of whatever complexity is suitable for the application. For example, evaluating the function of the criterion in some embodiments may rely on a microprocessor forming part or all of the controller. Alternatively or additionally, the controller may include an analog circuit and/or a less complex logic device than a processor or microprocessor.

In some embodiments, the controller may use the multiplexing switch apparatus to selectively discharge and charge the cells or sets of cells at different, programmable rates. For example, the controller may use the multiplexing switch apparatus to selectively discharge the strings, cells, or sets of cells at a first rate at least 2 times higher than a second rate of charging the sets of cells (i.e., discharging twice as fast as charging). Alternatively or additionally, the first rate of discharging may be at least 4 times higher than the second rate of charging the sets of cells (i.e., discharging four times as fast as charging). The inventors have recognized and appreciated that such ratios of discharge rate to charge rate may improve the performance and cycle life of the cells. According to some embodiments, the controller may temporally overlap the discharge of the sets of cells. For example, before a given cell or set of cells ceases discharging, another cell or set of cells may begin discharging. In some embodiments, the controller may continue to provide power from the sets of cells during switching between different sets. The inventors have recognized and appreciated that this temporal overlap of discharging and continuation of power may maintain the power requirements of the load even during transition between different cells or sets of cells, which may further improve the cycle life of the cell(s) compared to conventional techniques. Accordingly, multiple cells may discharge simultaneously during such an overlap. Additionally, such an overlap may provide smoother transition of voltage than has been possible with conventional techniques.

In some embodiments, the load may be at least one component of a vehicle. The vehicle may be any suitable vehicle, adapted for travel on land, sea, and/or air. For example, the vehicle may be an automobile, truck, motorcycle, boat, helicopter, airplane, and/or any other suitable type of vehicle.

In some embodiments, the electrochemical cells and batteries (e.g., rechargeable batteries) described in this disclosure can be used to provide power to an electric vehicle or otherwise be incorporated into an electric vehicle. As a non-limiting example, stacks of electrochemical cells and/or batteries described in this disclosure (e.g., comprising lithium metal and/or lithium alloy electrochemical cells, phase change materials, and/or multiplexing switch apparatuses) can, in certain embodiments, be used to provide power to a drive train of an electric vehicle. The vehicle may be any suitable vehicle, adapted for travel on land, sea, and/or air. For example, the vehicle may be an automobile, truck, motorcycle, boat, helicopter, airplane, and/or any other suitable type of vehicle.

Alternatively or additionally, the controller may use the multiplexing switch apparatus (e.g., 112) to connect the sets of cells to a load in a topology employed or required by the load.

In some embodiments, the controller may use the multiplexing switch apparatus (e.g., 112) to isolate a single set of cells for discharging while other sets of cells are not discharging. Alternatively or additionally, a single cell may be isolated at a time. For example, the controller may use the multiplexing switch apparatus to isolate a single set of cells or a single cell for discharging while the other cells or sets of cells are not discharging. For a given cycle, each cell may be discharged once before any cell is discharged twice, according to some embodiments (e.g., where sequential discharging is used, but not limited to such embodiments).

As for charging, in some embodiments the controller may use the multiplexing switch apparatus to charge the sets of cells, and/or cells within a set, in parallel. For example, all the cells in the cell block, battery, or batteries may be charged in parallel at a rate one-fourth of the rate of discharge.

Figure 1B:
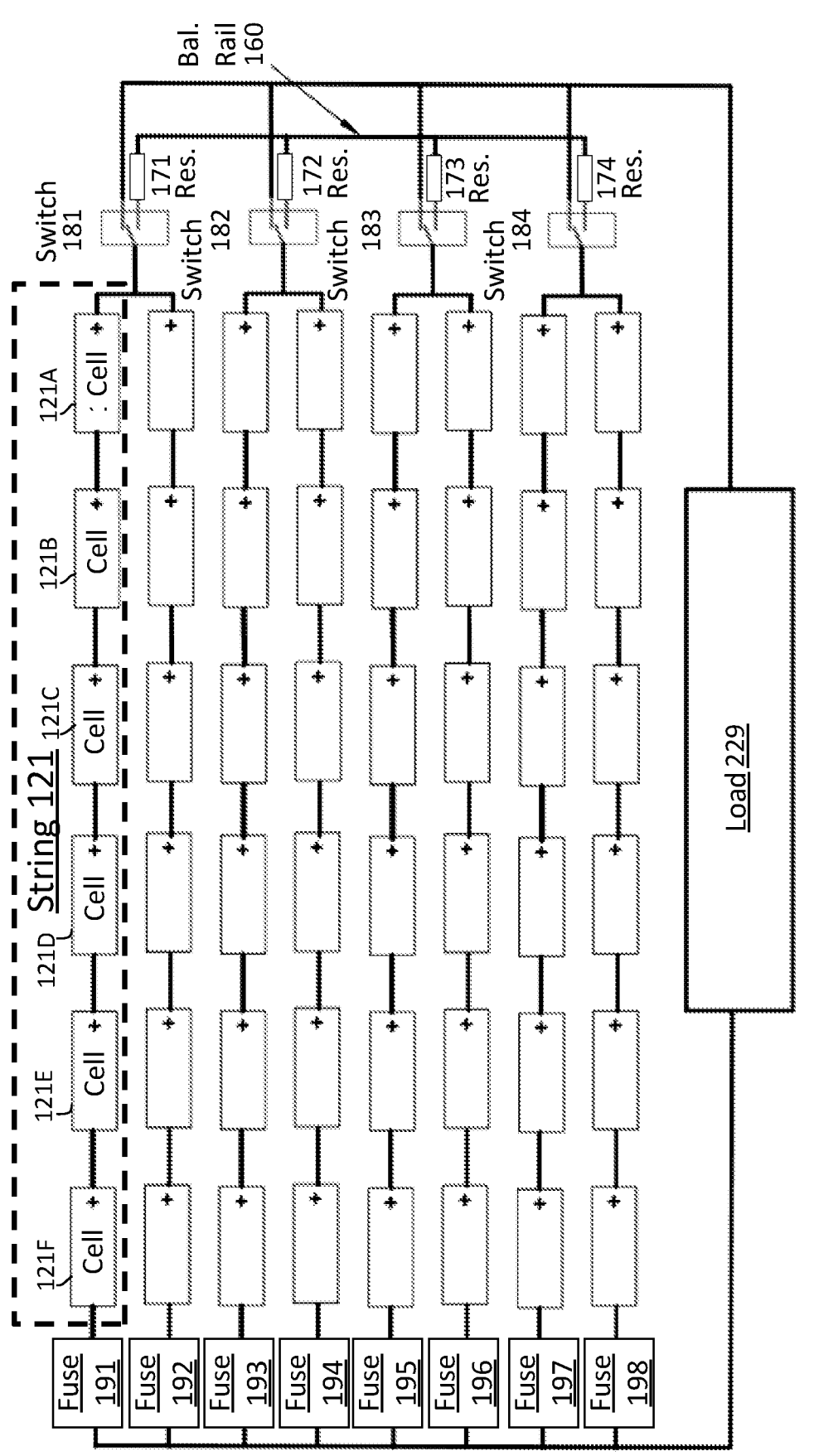
FIG. 1B is a block diagram illustrating a representative battery management system with cell strings, according to some embodiments.

FIG. 1B depicts a representative battery management system with cell strings. In some embodiments, a battery management system may include a collection of strings (e.g., 121) of cells or modules (e.g., 121A-F) with cells within them. For example, each string of cells may include two or more cells, either arranged separately or grouped together in modules. In some embodiments, the two or more strings of cells may include a multiple of four strings of cells, such as 8 strings, 12 strings, 16 strings, and so on.

In some embodiments, a representative battery management system may include an array of switches (e.g., 181-184) disposed between one or more strings, an input/output bus connected to a load (e.g., 229), and a balance such as a balance rail (e.g., 160), and the switches may be connected to each of these. For example, a switch (e.g., 181) may be connected permanently to a string (e.g., 121) and be switchably connected to an input/output bus and a balance (e.g., 160). In some embodiments, the switch array may connect or isolate cell strings from the battery pack input/output bus, it may connect cell strings to or disconnect cell strings from a balance resistor that may share the balance rail with other strings.

In some embodiments, a balance rail may include resistors (e.g., 171-174) disposed between the switches and the main balance rail. In some embodiments, the switches may be part of a multiplexing switch apparatus (e.g., 112 shown in FIG. 1A). Additionally, the balance rail may be connected to the multiplexing switch apparatus. In some embodiments, a balance rail may not be included or needed, such as in the system shown in FIG. 6B.

In some embodiments, a representative battery management system may include fuses (e.g., 191-198), for example on the ends of strings opposite the switches.

In some embodiments, a representative battery management system may include at least one controller (e.g., 114 shown in FIG. 1A) that may use a multiplexing switch apparatus (e.g., 112 shown in FIG. 1A) to selectively discharge the strings of cells. Additionally, the controller may use the multiplexing switch apparatus to selectively connect or disconnect the strings of cells to the balance rail.

In some embodiments, at least one of the strings of cells may have a nominal voltage of at least 60 volts, which may classify it as "high voltage." Alternatively or additionally, at least one of the strings may have a nominal voltage of between 200 volts and 2000 volts.

In some embodiments, a controller (e.g., 114 shown in FIG. 1A) may use the multiplexing switch apparatus (e.g., 112 shown in FIG. 1A) to maintain an equivalent state of charge between the strings of cells by adjusting switching times and/or switching states. In some embodiments, the controller may use the multiplexing switch apparatus to keep at least one of the strings of cells connected to the balance rail during use of the at least one battery. In some embodiments, all strings of cells may be disconnected when the battery management system is shipped or in storage.

FIGS. 1C-1G depict a representative battery management system during a representative charge sequence. In some embodiments, a battery management system may include a collection of sets or strings (e.g., 121) of cells or modules with cells within them, as described herein. In some embodiments, a representative battery management system may include an array of switches (e.g., 181-184) disposed between one or more strings and a balance such as a balance rail (e.g., 160), and the switches may be connected to each of these, as described herein. In some embodiments, a balance rail may include resistors (e.g., 171-174) disposed between the switches and the main balance rail. In some embodiments, the switches may be part of a multiplexing switch apparatus (e.g., 112 shown in FIG. 1A). Additionally, the balance rail may be connected to the multiplexing switch apparatus.

Figure 1C:
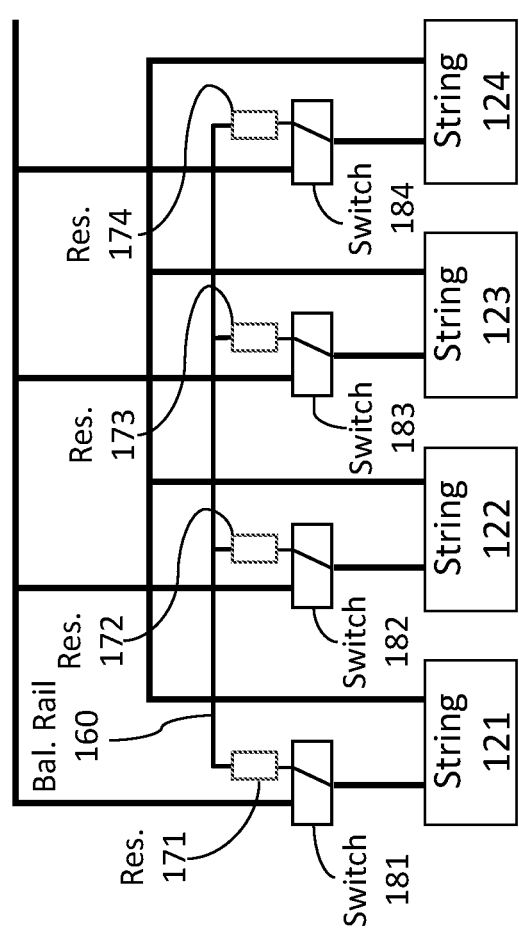
FIGS. 1C-1G are block diagrams illustrating a representative battery management system during a representative charge sequence, according to some embodiments.
Figure 1D:
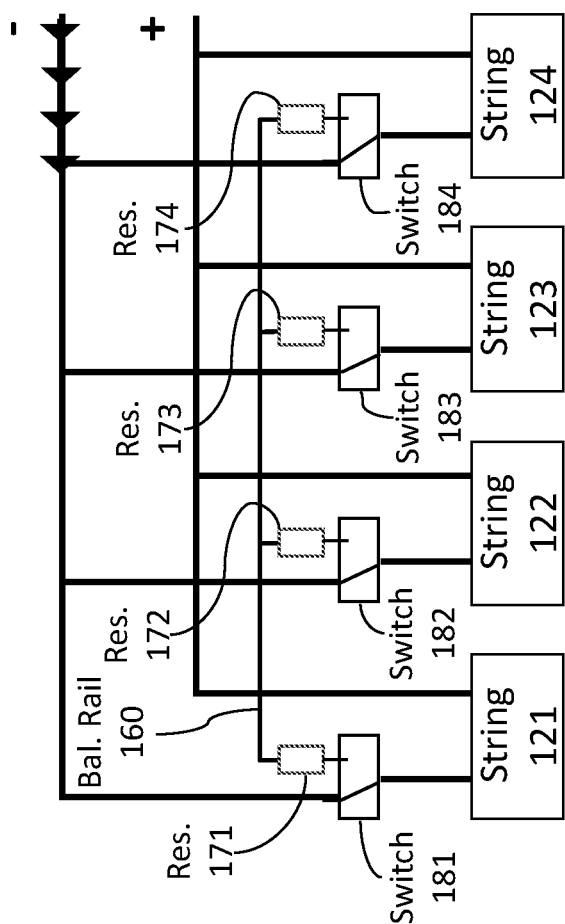
Figure 1E:
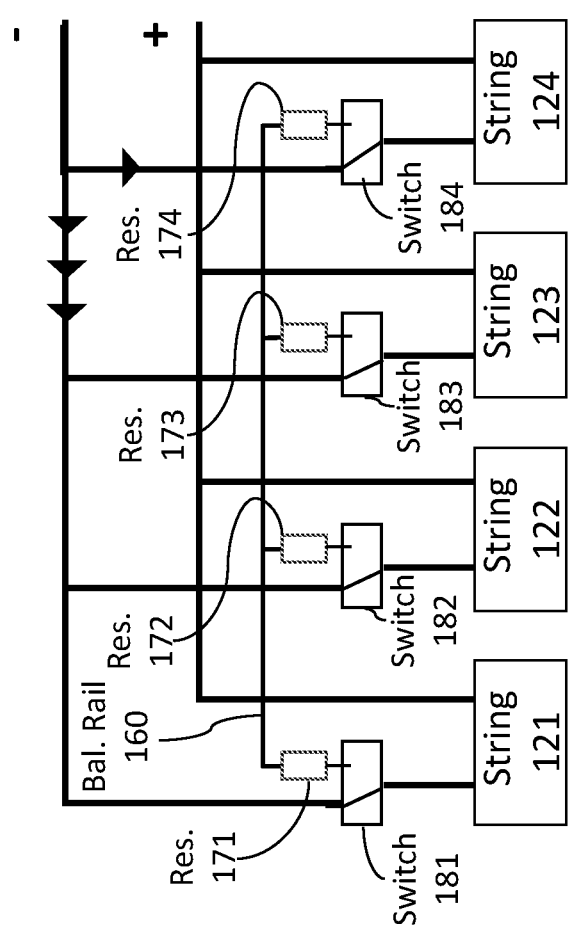
Figure 1F:
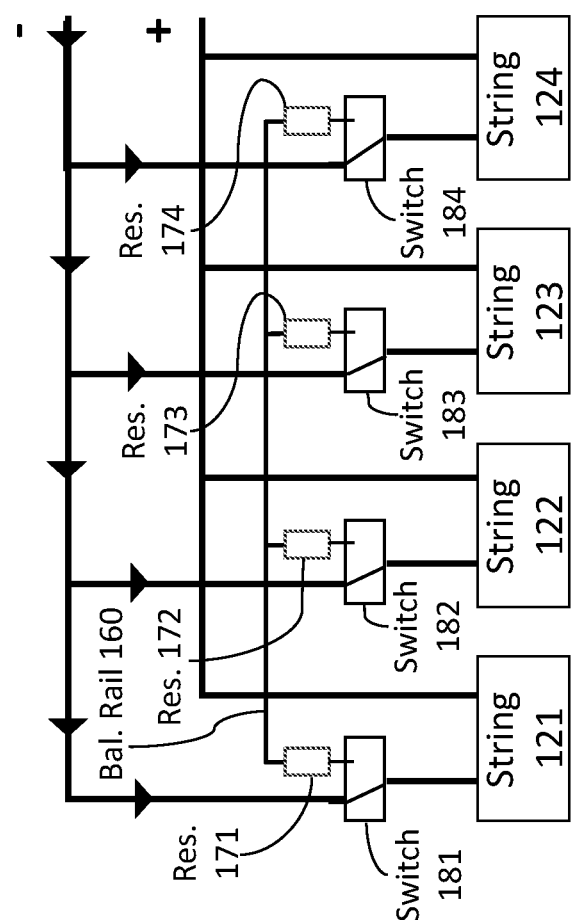
Figure 1G:
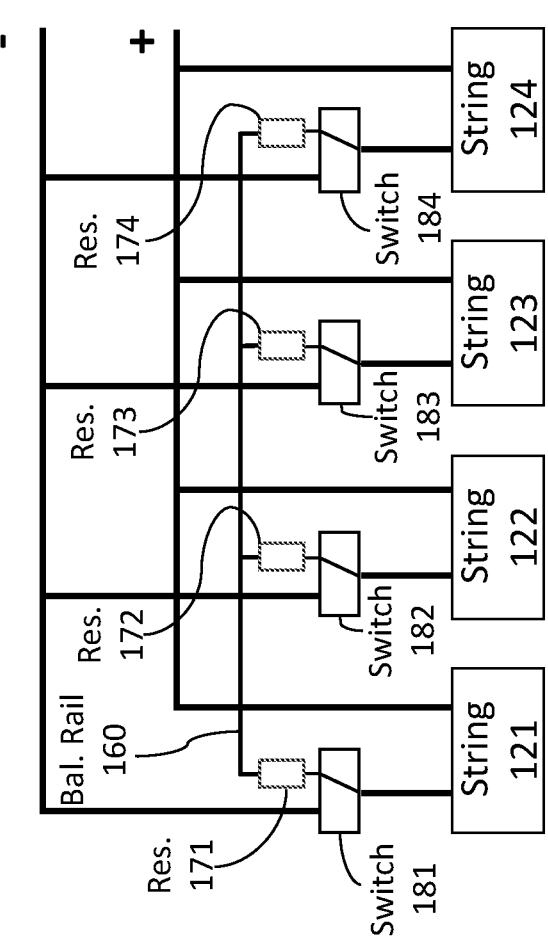

FIG. 1C depicts the battery management system starting in idle mode, with all switches (e.g., 181-184) connected to the balance rail (e.g., 160). FIG. 1D depicts the battery management system at start-of-charge, where the switches may move from balance rail to the negative bus in some embodiments. In some embodiments, energy for charging may enter negative circuitry, charging all cell sets or strings simultaneously. FIG. 1E depicts energy charging all cell sets or strings at once. FIG. 1F depicts energy charging all cell sets or strings at once, at a later stage such as when the cell sets or strings are charged to approximately 25% to 50% each. FIG. 1G depicts the battery management system at completion of charging (e.g., the cell sets or strings are charged to approximately 100%), when the switches may be connected to the balance rail in some embodiments (e.g., the switches may move from negative bus to balance rail).

Figure 1H:
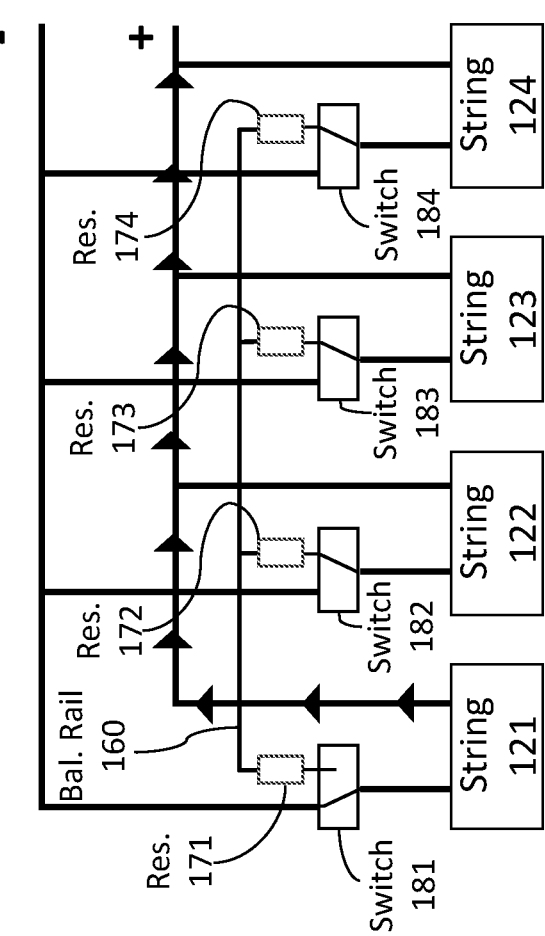
FIGS. 1H-1K are block diagrams illustrating a representative battery management system during a representative discharge sequence, according to some embodiments.
Figure 1I:
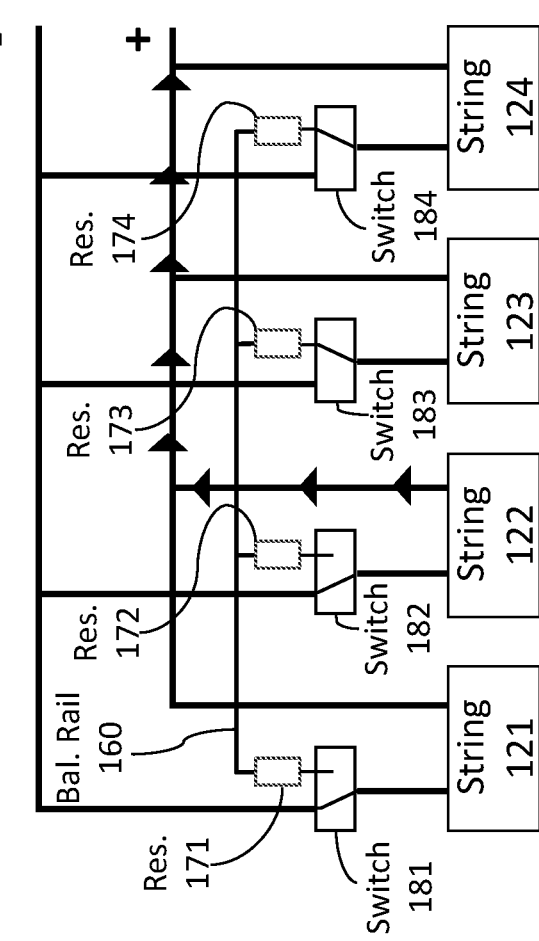
Figure 1J:
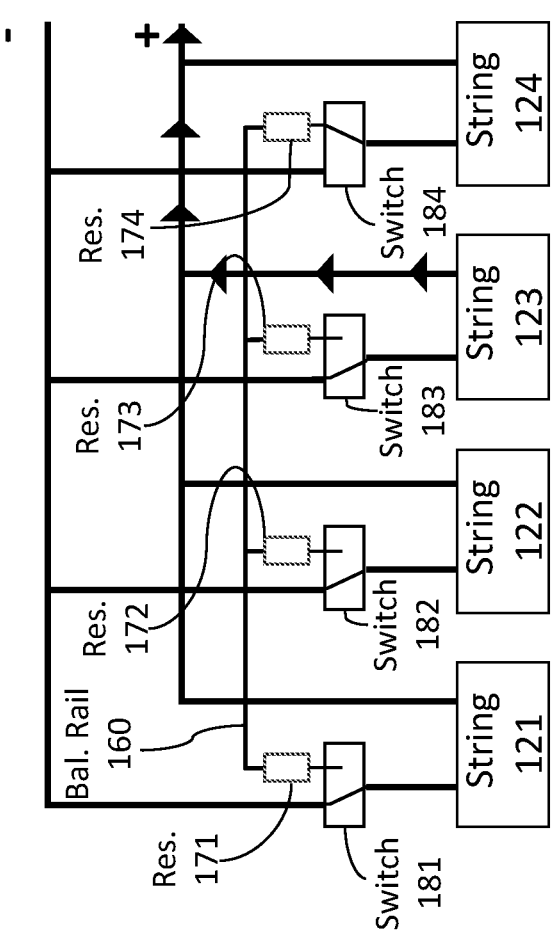
Figure 1K:
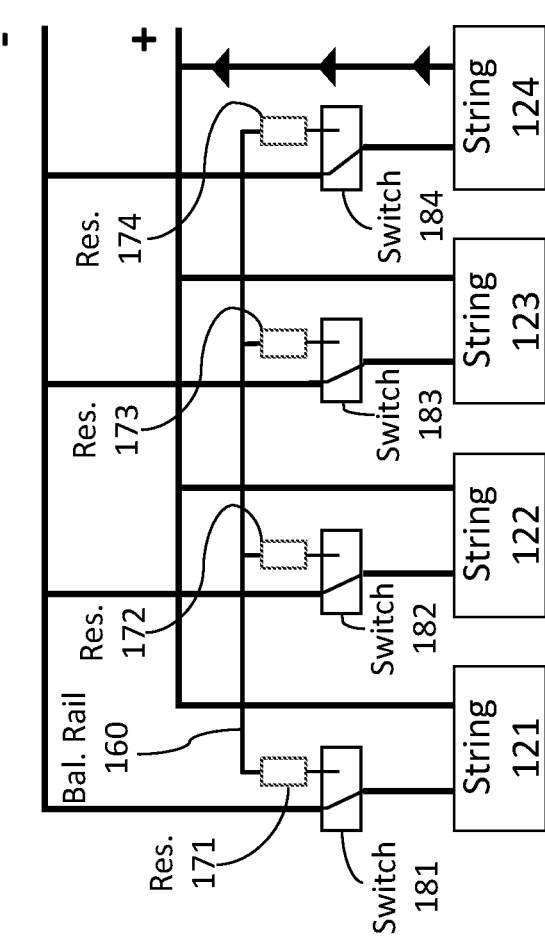

FIGS. 1H-1K depicts the representative battery management system during a representative discharge sequence. FIG. 1H depicts the representative battery management system when, for example, one cell set or string may be discharged (e.g., via pulse discharge) for 10 to 30 seconds while other cell sets or strings are idle. FIG. 1I depicts the representative battery management system after discharge on the first cell set or string, when a next cell set or string in series is discharged for 10 to 30 seconds while other cell sets or strings are idle. FIG. 1J depicts the representative battery management system when, for example, a next cell set or string may be discharged for 10 to 30 seconds while other cell sets or strings are idle. FIG. 1K depicts the representative battery management system when, for example, a final cell set or string may be discharged for 10 to 30 seconds while other cell sets or strings are idle. In some embodiments, discharge may continue until a charge sequence is needed, which may occur at various levels of charge.

Figure 2:
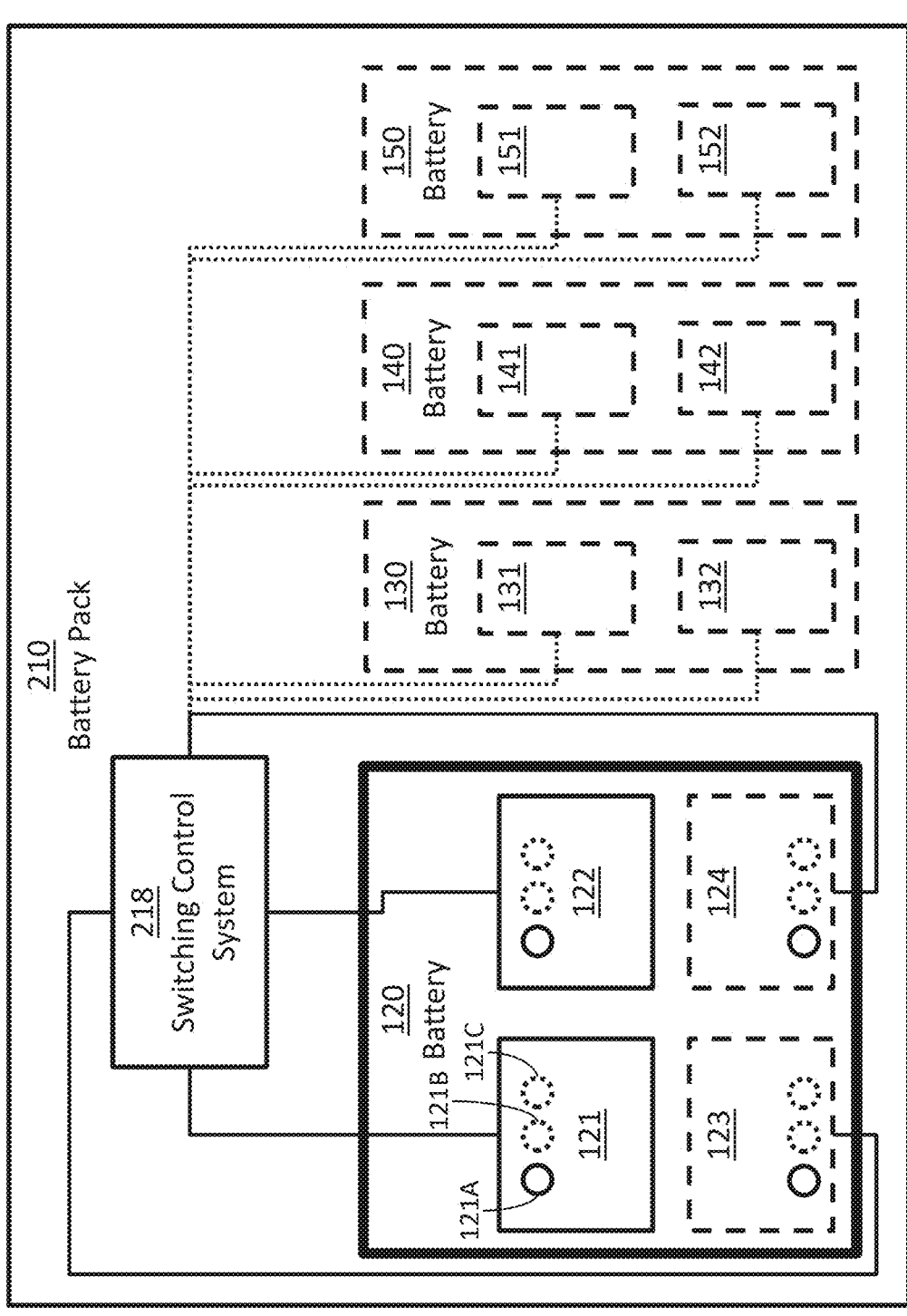
FIG. 2 is a block diagram illustrating a representative battery pack, according to some embodiments.

FIG. 2 depicts a representative battery pack 210. In some embodiments, representative battery pack 210 may include a switching control system (e.g., 218), and one or more batteries (e.g., 120, 130, 140, 150, and so on). It should be appreciated that although only a single switching control system 218 and only four batteries 120-150 are shown in FIG. 2, any suitable number of these components may be used. Any of numerous different modes of implementation may be employed. Furthermore, although a label in the singular is used herein to reference a switching control system, it should be appreciated that the components used for the control and switching described herein may be distributed across any suitable number of devices (e.g., switches, controller(s), etc.).

In some embodiments, a switching control system (e.g., 218) may include an array of switches, such as those further described in relation to FIGS. 3A and 3B below, and it may include a controller. Additionally, the switching control system may be connected to each set of cells and/or to each cell of the batteries individually, as discussed regarding FIG. 1A above. In some embodiments, the switching control system may be integrated into the battery pack. Additionally, the switching control system may control the switch(es) (such as in a switch array) to discharge the cells or sets of cells sequentially, such as in a predefined order associated with the cells or sets of cells. Alternatively or additionally, the switching control system may control the switch(es) to discharge the cells or sets of cells based on any one or more of the following: a duration of a connection between a load and a set of cells currently connected to the load (which may be at least 0.01 seconds in some embodiments), a delivered discharge capacity at the connection, and the value of a function. In certain embodiments, the basis for the control may not include a number of prior discharge cycles of the set of cells.

According to some embodiments, the switching control system may perform any number of other functions, such as those of the controller described in relation to FIG. 1A above.

It should be appreciated that any of the components of representative system 100 or representative battery pack 210 may be implemented using any suitable combination of hardware and/or software components. As such, various components may be considered a controller that may employ any suitable collection of hardware and/or software components to perform the described function.

Figure 3A:
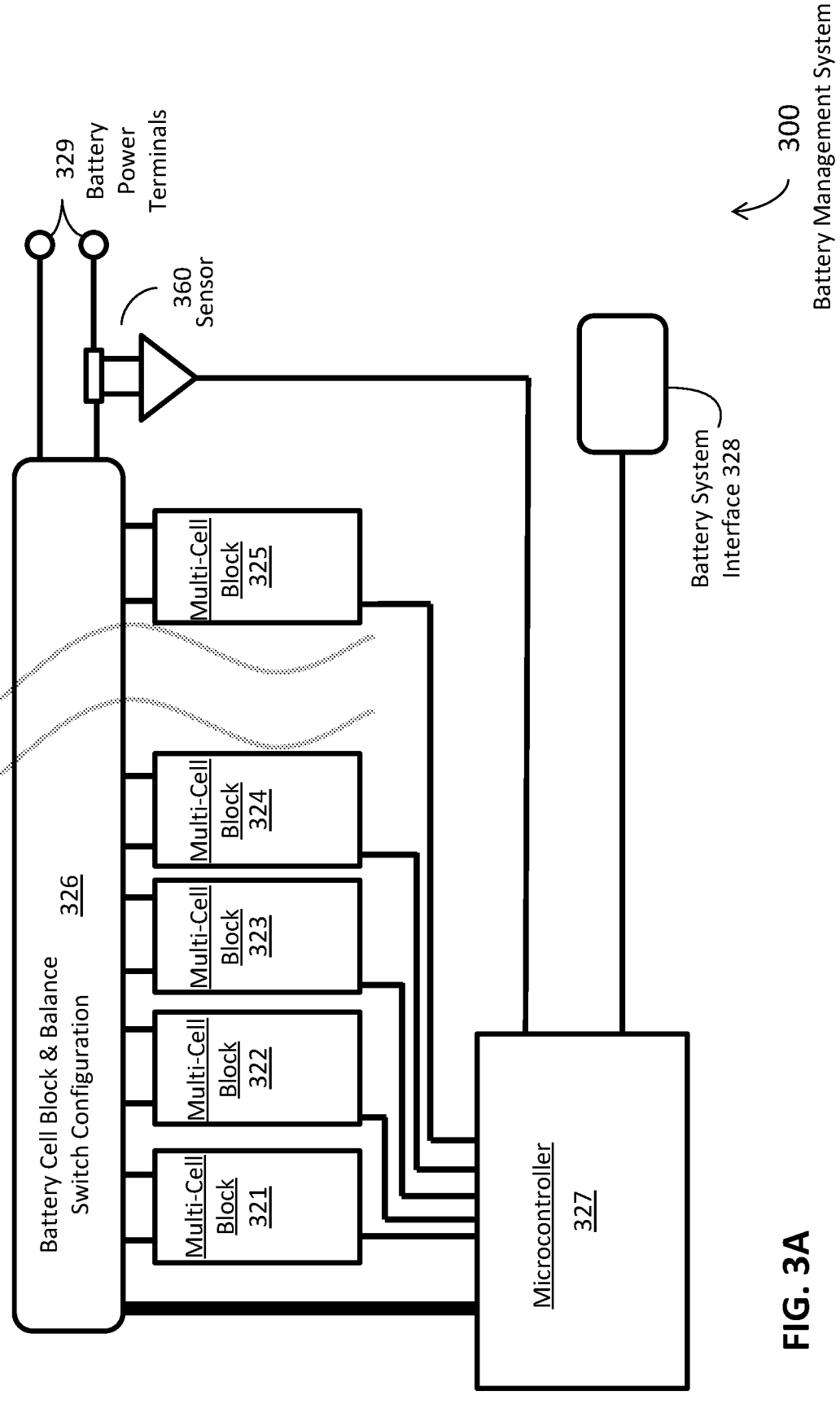
FIG. 3A is a block diagram illustrating a representative battery management system, according to some embodiments.

FIG. 3A depicts a representative battery management system 300. In some embodiments, representative system 300 may include any suitable number of multi-cell blocks (e.g., 321-325), which may be cell strings as described herein, a battery cell block arrangement and balance switch configuration (e.g., 326), which may be a string arrangement and balance switch configuration, a microcontroller (e.g., 327), which may be a cell string microcontroller, a battery system interface (e.g., 328), battery power terminals (e.g., 329), and a sensor (e.g., 360). The multi-cell blocks may be connected to the battery cell block arrangement and balance switch configuration. The multi-cell blocks may also be connected to the battery management microcontroller. In some embodiments, cell strings may be connected to the string arrangement and balance switch configuration and to individual battery management microcontrollers, which then may be connected to a string microcontroller, as described herein.

In some embodiments, the battery cell block arrangement and balance switch configuration may include switch multiplexing, which may connect the cell blocks (e.g., 321-325) in the series, parallel, serial/parallel, or any other suitable topology required to meet the voltage and current requirements of a given application or load.

According to some embodiments, the battery management microcontroller may monitor and control the charging and discharging of the battery management system to ensure the safe operation of the system and its components. Additionally, the battery management microcontroller may communicate with a user (e.g., a consumer using the system to power a load) as well as with any suitable internal production, calibration, and test equipment. For example, the battery management microcontroller may be connected to the battery system interface (e.g., 328), which may provide the interface required for the battery management microcontroller to communicate with the user as well as internal production, calibration, and test equipment, and any other suitable entity.

In some embodiments, the sensor may be connected to the battery cell block arrangement and balance switch configuration, the battery management microcontroller, and/or the battery power terminals, and it may the measure attributes of the multi-cell blocks and/or any other component of the system. For example, the sensor may measure attributes of the multi-cell blocks that form a criterion and/or any of the parameters of a function as described above. For example, the sensor may include a current sensor that measures the current in amperes of a given set of cells.

It should be appreciated that although battery cell block arrangement and balance switch configuration 326, microcontroller 327, battery system interface 328, and sensor 360 appear in singular form, and only five multi-cell blocks 321-325 are shown in FIG. 3A, any suitable number of these components may be used and they may represent multiple components. Any of numerous different modes of implementation may be employed. Indeed, although a label in the singular is used herein to reference a battery cell block arrangement and balance switch configuration, it should be appreciated that the components used for the arrangement and balance switching described herein may be distributed across any suitable number of devices (e.g., switches).

Figure 3B:
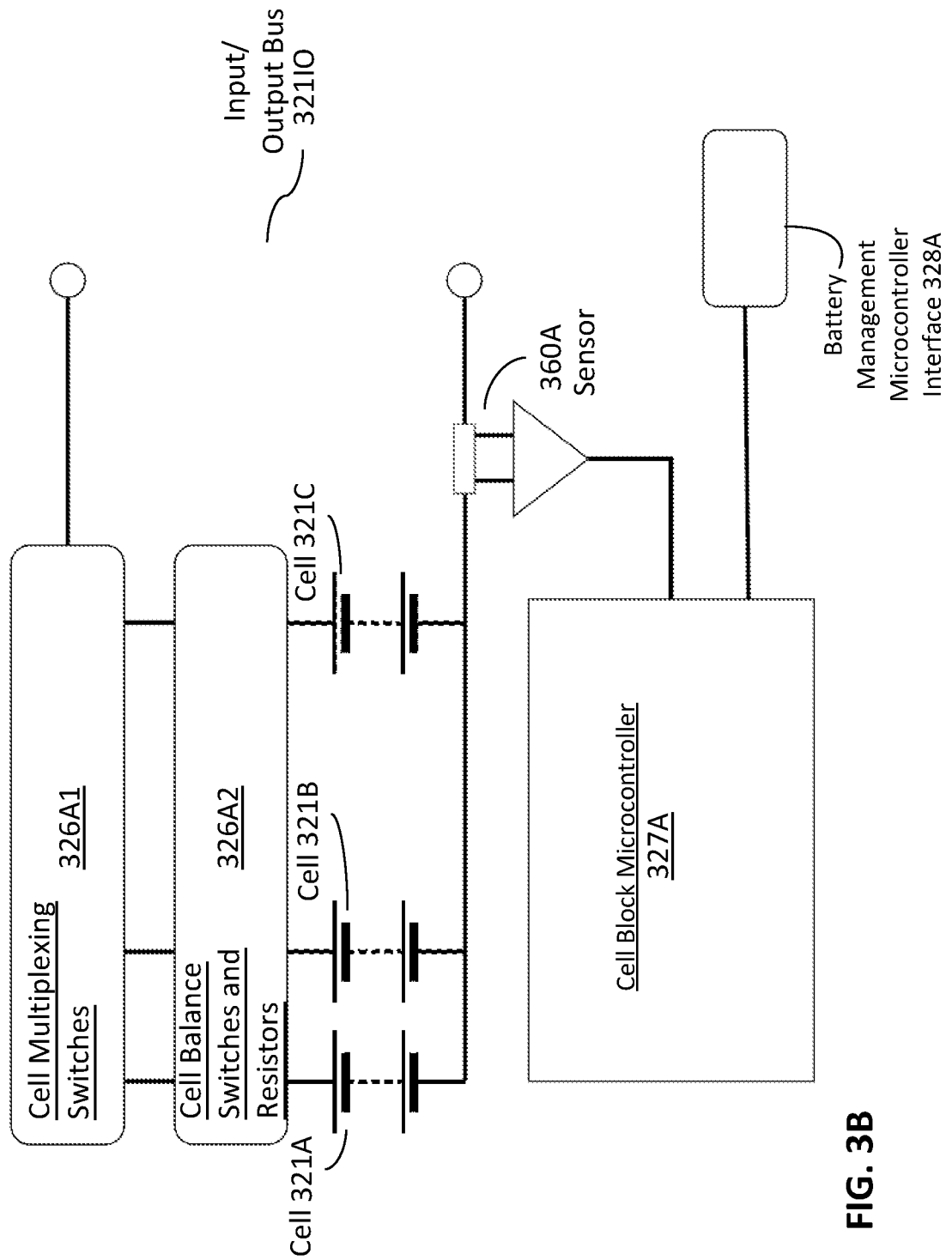
FIG. 3B is a block diagram illustrating a representative cell set and corresponding components, according to some embodiments.

FIG. 3B depicts a representative cell set and corresponding components. In some embodiments, the representative cell set may include any suitable number of cells (e.g., 321A-C) and may constitute a multi-cell block, such as is described above. Additionally, the representative cell set may include cell multiplexing switches (e.g., 326A1), cell balance switches and resistors (e.g., 326A2), a cell block microcontroller (e.g., 327A), a battery management microcontroller interface (e.g., 328A), a sensor (e.g., 360A), and an input/output bus for the cell set (e.g., 321IO). In some embodiments, the cells may be connected to the cell balance switches and resistors, which may be connected to the cell multiplexing switches.

In some embodiments, each cell (e.g., each of 321A-C) may be connected to an array of the cell multiplexing switches, which may connect or isolate the given cell(s) from the input/output bus (e.g., 321IO), and which may connect or disconnect the given cell(s) to a balance resistor (e.g., one of the resistors in 326A2) that shares the balance bus with the other cells. Additionally, in discharge mode one cell (e.g., 321A) may be connected to the input/output bus and disconnected from the balance resistor. The remaining cells (e.g., 321B-C) may be disconnected from the input/output bus and connected to the corresponding balance resistor(s). Additionally, in charge mode for some embodiments, all cells (e.g., 321A-C) may be connected to the input/output bus and disconnected from the balance resistors 326A2.

According to some embodiments, the cell block microcontroller (e.g., 327A) may generate switching waveforms to ensure that overlap and deadband requirements for the switching is appropriate for the application or load. Additionally, the cell block microcontroller may determine the state required by the application or load by monitoring the cell block's voltage and current, as well as by receiving communication from a battery management microcontroller (e.g., 327 in FIG. 3A), to which the cell block microcontroller may be connected via the battery management microcontroller interface.

Figure 3C:
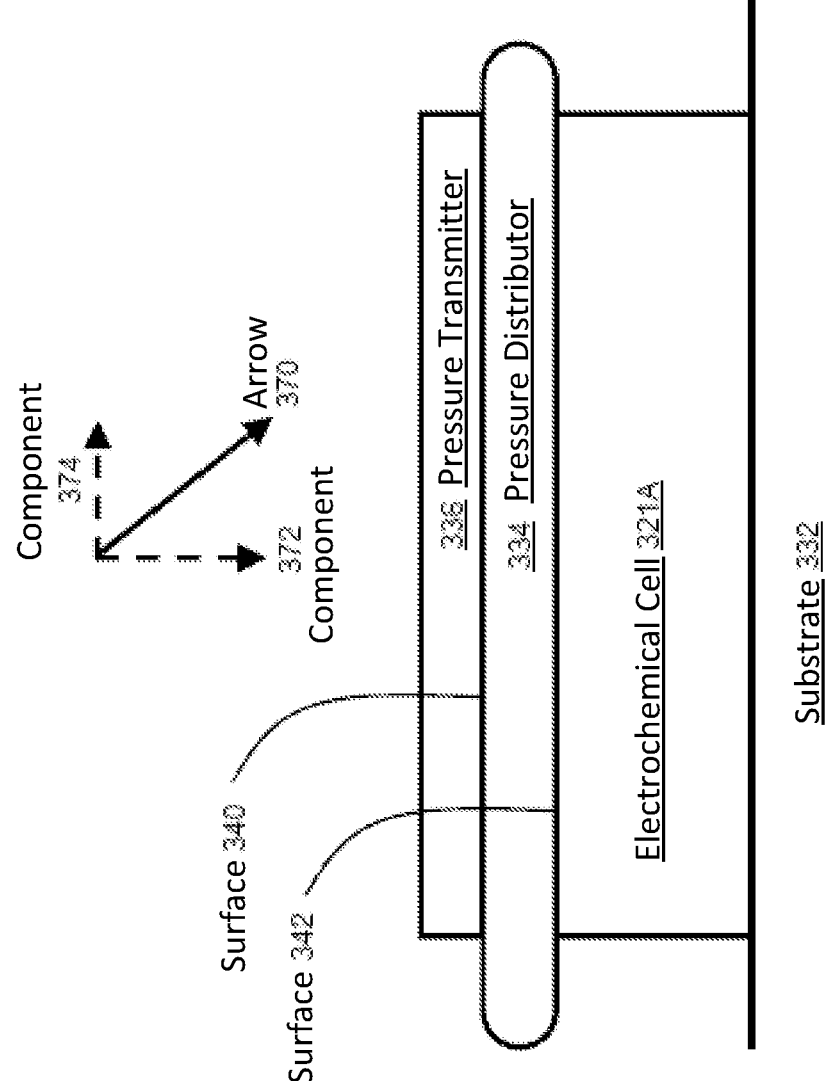
FIG. 3C is a cross-sectional schematic diagram illustrating the application of an anisotropic force to one or more electrochemical cells, according to some embodiments.

FIG. 3C is an exemplary cross-sectional schematic illustration of an electrochemical system in which an anisotropic force is applied to an electrochemical cell (e.g., 321A), according to one set of embodiments. The term "electrochemical cell" is used herein to generally refer to an anode, a cathode, and an electrolyte configured to participate in an electrochemical reaction to produce power. An electrochemical cell can be rechargeable or non-rechargeable.

In FIG. 3C, the system may include electrochemical cell 321A and, in some embodiments, a pressure distributor 334 containing a fluid associated with electrochemical cell 321A. Pressure distributor 334 can be configured such that an anisotropic force is applied to a component of electrochemical cell 321A through pressure distributor 334. For example, in the set of embodiments illustrated in FIG. 3C, pressure transmitter 336 can be configured to apply an anisotropic force to pressure distributor 334, which in turn causes an anisotropic force to be applied to at least one component (e.g., an electrode) of electrochemical cell 321A. The system can also include a substrate 332 on which the electrochemical cell is positioned. Substrate 332 can comprise, for example, a tabletop, a surface of a container in which electrochemical cell 321A is housed, or any other suitable surface.

Pressure distributor 334 can be associated with electrochemical cell 321A in a variety of suitable configurations to produce the inventive systems and methods described herein. As used herein, a pressure distributor is associated with an electrochemical cell when at least a portion of a force that is applied to and/or through the pressure distributor can be transmitted to a component of the electrochemical cell. For example, in certain embodiments, a pressure distributor is associated with an electrochemical cell when the pressure distributor is in direct contact with the electrochemical cell or a component thereof. Generally, a first article and a second article are in direct contact when the first article and the second article are directly touching. For example, in FIG. 3C, pressure distributor 334 and the electrochemical cell 321A are in direct contact.

In certain embodiments, a pressure distributor is associated with the electrochemical cell when the pressure distributor is in indirect contact with at least one component of the electrochemical cell. Generally, a first article and a second article are in indirect contact when a pathway can be traced between the first article and the second article that intersects only solid and/or liquid components. Such a pathway can be in the form of a substantially straight line, in certain embodiments. A pressure distributor can be in indirect contact with an electrochemical cell, in certain embodiments, when one or more solid and/or liquid materials are positioned between them, but a force can still be transmitted to the electrochemical cell through the pressure distributor.

In certain embodiments, a pressure distributor is associated with an electrochemical cell when it is located within the boundaries of a container at least partially (e.g., completely) enclosing the components of the electrochemical cell. For example, in certain embodiments, pressure distributor 334 could be positioned between an electrode and a container at least partially enclosing the electrochemical cell. In certain embodiments, pressure distributor 334 could be positioned between a current collector and a container at least partially enclosing the electrochemical cell. In some embodiments, pressure distributor 334 can be used as a current collector, for example, positioned next to an electrode of the electrochemical cell and within a container at least partially containing the electrodes and electrolyte of the electric cell. This could be achieved, for example, by fabricating pressure distributor 334 from a material (e.g., a metal such as a metal foil, a conductive polymer, and the like) that is sufficiently electrically conductive to transport electrons to and/or from an electrode of the electrochemical cell.

In some embodiments, a pressure distributor is associated with an electrochemical cell when it is located outside the boundaries of a container at least partially (e.g., completely) enclosing the components of the electrochemical cell. For example, in certain embodiments, pressure distributor 334 could be positioned in direct or indirect contact with an exterior surface of a container at least partially enclosing the electrodes and electrolyte of an electrochemical cell.

In certain embodiments, the pressure distributor can be located a relatively short distance from at least one electrode of an electrochemical cell. For example, in certain embodiments, the shortest distance between the pressure distributor and an electrode of the electrochemical cell is less than about 10 times, less than about 5 times, less than about 2 times, less than about 1 time, less than about 0.5 times, or less than about 0.25 times the maximum cross-sectional dimension of that electrode.

In some embodiments, a pressure distributor can be associated with a particular electrode (e.g., an anode) of an electrochemical cell. For example, a pressure distributor can be in direct or indirect contact with an electrode (e.g., an anode such as an anode comprising lithium) of an electrochemical cell. In certain embodiments, the pressure distributor can be positioned outside a container at least partially containing the electrode but still associated with the electrode, for example, when only liquid and/or solid components separate the electrode from the pressure distributor. For example, in certain embodiments in which the pressure distributor is positioned in direct or indirect contact with a container at least partially enclosing the electrode and a liquid electrolyte, the pressure distributor would be associated with the electrode.

In certain embodiments, a force can be applied to electrochemical cell 321A or a component of electrochemical cell 321A (e.g., an electrode of the electrochemical cell) through pressure distributor 334. As used herein, a force is applied to a first component (e.g., an electrochemical cell) through a second component (e.g., a pressure distributor) when the second component at least partially transmits a force from the source of the force to the first component.

A force can be applied to an electrochemical cell or a component thereof through a pressure distributor in a variety of ways. In certain embodiments, applying a force to a pressure distributor comprises applying a force to an external surface of the pressure distributor. This can be achieved, for example, via pressure transmitter 336. For example, in FIG. 3C, pressure transmitter 336 can be positioned to apply an anisotropic force to electrochemical cell 321A through pressure distributor 334 by applying a force to surface 340 of pressure distributor 334. As used herein, a first component is positioned to apply an anisotropic force to a second component when the first and second components are positioned such that at least a portion of a force that is applied to and/or through the first component can be transmitted to the second component. In certain embodiments, pressure transmitter and the pressure distributor are in direct contact. In some embodiments, one or more materials (e.g., one or more solid and/or liquid materials) are positioned between the pressure transmitter and the pressure distributor, but a force can still be applied to the pressure distributor by the pressure transmitter. In certain embodiments, the pressure transmitter and the pressure distributor can be in indirect contact such that a continuous pathway can be traced through solid and/or liquid materials from the pressure distributor to the electrochemical cell. Such a pathway can be substantially (e.g., completely) straight, in certain embodiments.

In the set of embodiments illustrated in FIG. 3C, pressure transmitter 336 and electrochemical cell 321A are positioned on opposite sides of pressure distributor 334. Accordingly, when an anisotropic force (e.g., an anisotropic force in the direction of arrow 150) is applied to and/or by pressure transmitter 336 to surface 340, the force can be transmitted through pressure distributor 334 onto surface 342 of electrochemical cell 321A, and to the components of electrochemical cell 321A.

In some embodiments, applying a force to a pressure distributor comprises applying a force to an internal surface of the pressure distributor. For example, in certain embodiments, a force can be applied through the pressure distributor to the electrochemical cell by maintaining and/or increasing the pressure of the fluid within the pressure distributor. In the set of embodiments illustrated in FIG. 3C, a force can be applied through pressure distributor 334 to electrochemical cell 321A by transporting additional fluid through an inlet (not shown) of pressure distributor 334 (e.g., by inflating pressure distributor 334). In some such embodiments, when the pressure within a pressure distributor is maintained and/or increased, the movement of pressure transmitter can be restricted such that a force is produced on an external surface of the electrochemical cell and/or on a component of the electrochemical cell (e.g., an active surface of an electrode within the electrochemical cell). For example, in FIG. 3C, as additional fluid is added to pressure distributor 334, pressure transmitter 336 can be configured to restrict the movement of the boundaries of pressure distributor 334 such that a force is applied to surface 342 of electrochemical cell 321A.

In certain embodiments, fluid can be added to pressure distributor 334 before it is positioned between electrochemical cell 321A and pressure transmitter 336. After the fluid has been added, pressure distributor 334 can be compressed and positioned between electrochemical cell 321A and pressure transmitter 336, after which, the compression of the fluid within pressure distributor 334 can produce a force that is applied to surface 342 of electrochemical cell 321A (and, accordingly, to a surface of one or more components of the electrochemical cell, such as an active surface of an electrode). One of ordinary skill in the art, given the present disclosure, would be capable of designing additional systems and methods by which a force can be applied to an electrochemical cell through a pressure distributor.

The fluid within pressure distributor 334 can allow the pressure that is transmitted through pressure distributor 334 to be applied relatively evenly across the surface 342 of electrochemical cell 321A (and, accordingly, relatively evenly across a surface of one or more components of the electrochemical cell, such as an active surface of an electrode). Not wishing to be bound by any particular theory, it is believed that a presence of a fluid within pressure distributor 334 reduces and/or eliminates points of relatively high pressure on surface 342 as fluid within relatively high pressure regions is transported to regions of relatively low pressure.

In some embodiments, the degree to which the pressure distributor evenly distributes the force applied to electrochemical cell can be enhanced if the external surface of the pressure transmitter is appropriately aligned with an external surface of the electrochemical cell or a container thereof. For example, in the set of embodiments illustrated in FIG. 3C, external surface 340 of pressure transmitter 336 faces external surface 342 of electrochemical cell 321A. In certain embodiments, the external surface of the pressure transmitter is substantially parallel to the external surface of the electrochemical cell to which a force is applied. For example, in the set of embodiments illustrated in FIG. 3C, external surface 340 of pressure transmitter 336 is substantially parallel to external surface 342 of electrochemical cell 321A. As used herein, two surfaces are substantially parallel to each other when the two surfaces form angles of no greater than about 10 degrees. In certain embodiments, two substantially parallel surfaces form angles of no greater than about 5 degrees, no greater than about 3 degrees, no greater than about 1 degree, or no greater than about 0.1 degree.

The pressure distributor can have a variety of suitable forms. In certain embodiments, the pressure distributor can comprise a bag or other suitable container in which a fluid is contained. In some embodiments, the pressure distributor can comprise a bellows that is configured to deform along the direction in which the force is applied to the pressure distributor.

The pressure distributor container can be made of a variety of materials. In certain embodiments, the pressure distributor container can comprise a flexible material. For example, in certain embodiments, the pressure distributor container can comprise a polymer such as polyethylene (e.g., linear low density and/or ultra-low density polyethylene), polypropylene, polyvinylchloride, polyvinyldichloride, polyvinylidene chloride, ethylene vinyl acetate, polycarbonate, polymethacrylate, polyvinyl alcohol, nylon, silicone rubber (e.g., polydimethylsiloxane), and/or other natural or synthetic rubbers or plastics. In certain embodiments (e.g., in embodiments in which a gas is used as the fluid within the pressure distributor), the pressure distributor container can include a metal layer (e.g., an aluminum metal layer), which can enhance the degree to which fluid (e.g., a gas) is retained within the pressure distributor. The use of flexible materials can be advantageous, in certain embodiments, as they may allow for redistribution of the contents of the pressure distributor relatively easily, enhancing the degree to which the force is uniformly applied.

In some embodiments, the pressure distributor can comprise an elastic material. In certain embodiments, the elasticity of the material from which the pressure distributor is fabricated can be selected such that the pressure distributor transmits a desirable amount of a force applied to the pressure distributor to an adjacent component. To illustrate, in certain cases, if the pressure distributor is made of a very flexible material, a relatively high percentage of the force applied to the pressure distributor might be used to elastically deform the pressure distributor material, rather than being transmitted to an adjacent electrochemical cell. In certain embodiments, the pressure distributor can be formed of a material having a Young's modulus of less than about 1 GPa. One of ordinary skill in the art would be capable of measuring the Young's modulus of a given material by performing, for example, a tensile test (also sometimes referred to a tension test). Exemplary elastic polymers (i.e., elastomers) that could be used include the general classes of silicone polymers, epoxy polymers, and acrylate polymers.

In certain embodiments, the pressure distributor comprises an enclosed container containing a fluid. The pressure distributor can comprise an open container containing a fluid, in certain embodiments. For example, in some embodiments, the pressure distributor comprises a container fluidically connected to a device constructed and arranged to transport the fluid through the pressure distributor, as described in more detail below.

A variety of fluids can be used in association with the pressure distributor. As used herein, a "fluid" generally refers to a substance that tends to flow and to conform to the outline of its container. Examples of fluids include liquids, gases, gels, viscoelastic fluids, solutions, suspensions, fluidized particulates, and the like. Typically, fluids are materials that are unable to withstand a static shear stress, and when a shear stress is applied, the fluid experiences a continuing and permanent distortion. The fluid may have any suitable viscosity that permits flow and redistribution of an applied force.

In certain embodiments, the fluid within the pressure distributor comprises a gas (e.g., air, nitrogen, a noble gas (e.g., helium, neon, argon, krypton, xenon), a gas refrigerant, or mixtures of these). In certain embodiments, the gas within the pressure distributor can comprise a relatively high molecular weight (e.g., at least about 100 g/mol), which can limit the degree to which gas permeates through the walls of the pressure distributor. In some embodiments, the fluid within the pressure distributor comprises a liquid including, but not limited to, water, an electrolyte (e.g., a liquid electrolyte similar or identical to that used in the electrochemical cell), greases (e.g., petroleum jelly, Teflon grease, silicone grease), oils (e.g., mineral oil), and the like. In certain embodiments, the fluid within the pressure distributor comprises a gel. Suitable gels for use within the pressure distributor include, but are not limited to, hydrogels (e.g., silicone gel), organogels, or xerogels. In certain embodiments, the fluid comprises a fluidized bed of solid particles (e.g., sand, powders, and the like). Fluidization can be achieved, for example, by passing a gas and/or a liquid through the particles and/or by vibrating a substrate on which the particles are positioned such that the particles move relative to each other.

The fluid used in association with the pressure distributor can have any suitable viscosity. In certain embodiments, a Newtonian fluid can be used within the pressure distributor, although some embodiments are not so limited, and non-Newtonian fluids (e.g., a shear thinning fluid, a shear thickening fluid, etc.) can also be used. In certain embodiments, the pressure distributor can contain a Newtonian fluid with a steady-state shear viscosity of less than about $1\times10^7$ centipoise (cP), less than about $1\times10^6$ cP, less than about $1\times10^5$ cP less than about 1000 cP, less than about 100 cP, less than about 10 cP, or less than about 1 cP (and, in some embodiments, greater than about 0.001 cP, greater than about 0.01 cP, or greater than about 0.1 cP) at room temperature.

In certain embodiments, the fluid within the pressure distributor can be selected such that it is suitable for being transported into and/or out of the pressure distributor. For example, in certain embodiments, fluid may be transported into the pressure distributor to apply an anisotropic force to the electrochemical cell (e.g., by compressing the fluid within the pressure distributor when it is positioned between the electrochemical cell and the pressure transmitter). As another example, a fluid may be transported into and/or out of a pressure distributor to transfer heat to and/or away from a component of the system.

Pressure transmitter 336 can also adopt a variety of configurations. In certain embodiments, pressure transmitter 336 is moveable relative to electrochemical cell 321A. In some such embodiments, a force can be applied to electrochemical cell 321A through pressure distributor 334 by moving pressure transmitter 336 closer to electrochemical cell 321A and/or maintaining the separation between electrochemical cell 321A and pressure transmitter 336. As one particular example, in some embodiments the pressure transmitter 336 includes a compression spring, a first applicator structure, and a second applicator structure. First applicator structure can correspond to, for example, a flat plate of rigid material, or any other suitable structure. Second applicator structure can correspond to, for example, a second plate of rigid material, a portion of a wall of a container in which the electrochemical cell is housed, or any other suitable structure. In some embodiments, a force can be applied to surface 342 of electrochemical cell 321A when a compression spring is compressed between applicator structure and applicator structure. In certain embodiments, Belleville washers, machine screws, pneumatic devices, weights, air cylinders, and/or hydraulic cylinders could be used in place of, or in addition to, the compression spring. In some embodiments, a force can be applied to an electrochemical cell using a constricting element (e.g., an elastic band, a turnbuckle band, etc.) arranged around one or more external surfaces of the electrochemical cell. A variety of suitable methods for applying a force to an electrochemical cell are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

In certain embodiments, pressure transmitter 336 is not substantially moveable relative to electrochemical cell 321A, and a force can be applied to the electrochemical cell, for example, by pressurizing the pressure distributor 334. In some such embodiments, pressurizing the pressure distributor can result in the application of a force to the electrochemical cell because the substantially immovable pressure transmitter 336 restricts the movement of one or more of the boundaries of pressure distributor 334, thereby applying an anisotropic force to electrochemical cell 321A.

In certain embodiments, pressure transmitter comprises all or part of a substantially rigid structure (e.g., a package enclosing an electrochemical cell), and the movement of the pressure transmitter can be restricted by the degree to which the substantially rigid structure is inflexible. In certain embodiments, the pressure transmitter can comprise a structure that is integrated with at least a portion of the other components of the system, which can restrict its movement. For example, in certain embodiments, the pressure transmitter can comprise at least a portion of one or more walls of a package within which electrochemical cell 321A and pressure distributor 334 are positioned. As one particular example, pressure transmitter 336 might form a first wall of a package containing electrochemical cell 321A while substrate 332 forms a second wall (e.g., opposite to the first wall) of the package. In certain embodiments, the movement of pressure transmitter 336 can be restricted by applying a force within and/or on the pressure transmitter such that its movement is restricted. In any of these cases, a force can be applied to the electrochemical cell, in certain embodiments, by adding fluid to and/or maintaining the amount of fluid within pressure distributor 334.

FIG. 3C illustrates a set of embodiments in which a single pressure transmitter and a single pressure distributor are used to apply a force to an electrochemical cell. In certain embodiments, however, more than one pressure distributor and/or more than one pressure transmitter can be employed. For example, in some embodiments, the system includes a second pressure distributor positioned under electrochemical cell 321A and a second pressure transmitter positioned under the second pressure distributor. In certain embodiments, a substantially evenly distributed force can be applied to an external surface of electrochemical cell 321A through the second pressure distributor, for example, by applying a force to and/or through the second pressure transmitter and onto a surface of the second pressure distributor.

In some embodiments, fluid can be transported into and/or out of the pressure distributor to transport heat to and/or away from electrochemical cell 321A. For example, pressure distributor 334 may include an inlet and an outlet configured to transport a fluid through pressure distributor 334. As fluid is transported through pressure distributor 334, it can absorb heat from electrochemical cell 321A and transport it away from the system via the outlet. Any suitable device can be used to transport the fluid through the pressure distributor such as, for example, a pump, a vacuum, or any other suitable device.

In certain embodiments, the fluid used in association with the pressure distributor can be selected such that it cools or heats the system to a desired degree. For example, in certain embodiments, the fluid within the pressure distributor can comprise a coolant such as water, ethylene glycol, diethylene glycol, propylene glycol, polyalkylene glycols (PAGs), oils (e.g., mineral oils, castor oil, silicone oils, fluorocarbon oils, and/or refrigerants (e.g., freons, chlorofluorocarbons, perfluorocarbons, and the like).

The embodiments described herein can be used with a variety of electrochemical cells. While primary (disposable) electrochemical cells and secondary (rechargeable) electrochemical cells can be used in association with the embodiments described herein, some embodiments advantageously make use of secondary electrochemical cells, for example, due to the benefits provided by uniform force application during the (re) charging process. In certain embodiments, the electrochemical cell comprises a lithium-based electrochemical cell such as a lithium-sulfur electrochemical cell (and assemblies of multiple cells, such as batteries thereof).

Figure 3D:
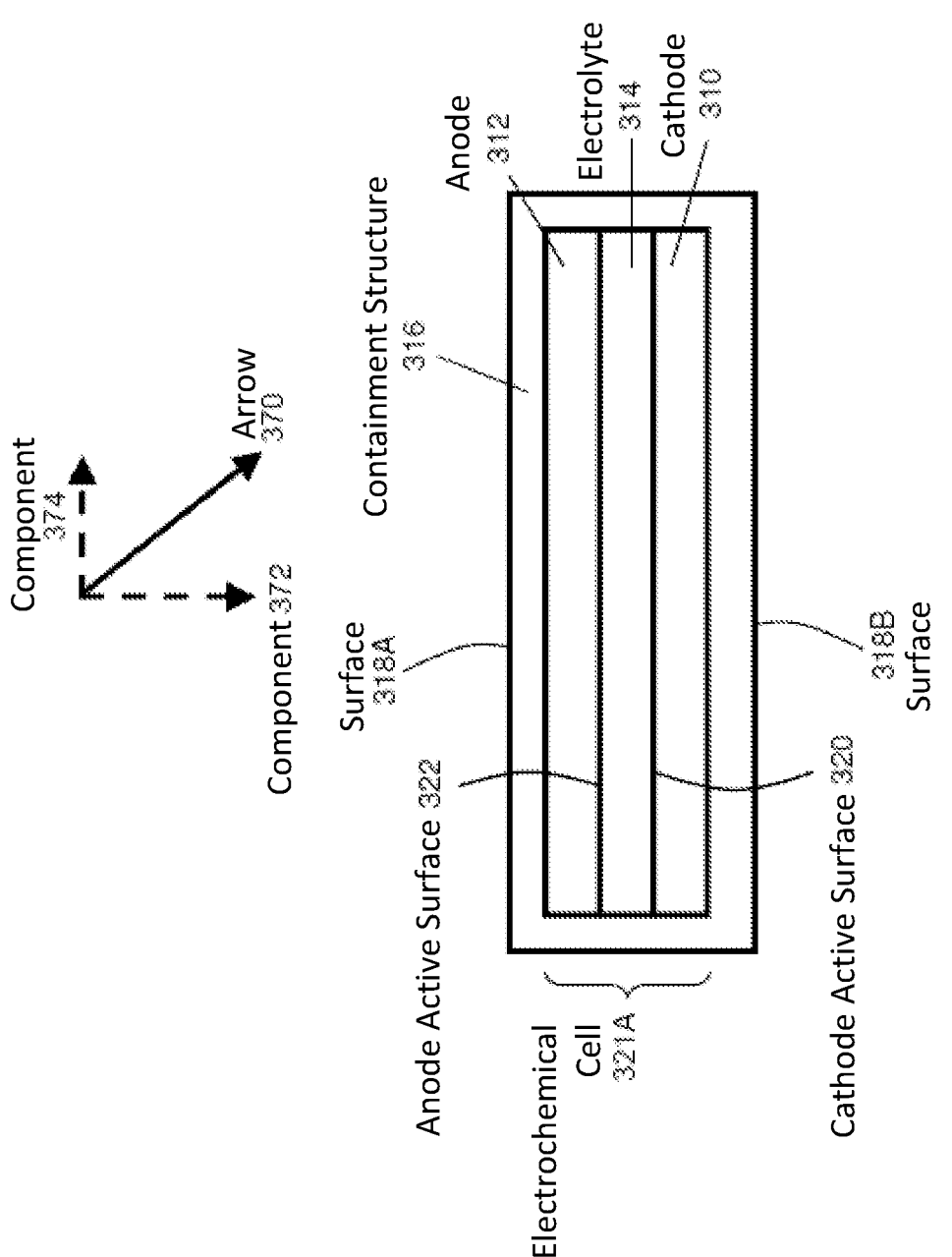
FIG. 3D is a cross-sectional schematic diagram of electrochemical cells, according to some embodiments.

Although some embodiments can find use in a wide variety of electrochemical devices, an example of one such device is provided in FIG. 3D for illustrative purposes only. In FIG. 3D, a general embodiment of electrochemical cell 321A includes cathode 310, anode 312, and electrolyte 314 in electrochemical communication with the cathode and the anode.

In some cases, electrochemical cell 321A may optionally be at least partially contained by containment structure 316. Containment structure 316 may comprise a variety of shapes including, but not limited to, cylinders, prisms (e.g., triangular prisms, rectangular prisms, etc.), cubes, or any other shape. In certain embodiments, a pressure distributor can be associated with electrochemical cell 321A by positioning the pressure distributor outside containment structure 316, in either direct or indirect contact with surface 318A and/or surface 318B. When positioned in this way, the pressure distributor can be configured to apply a force, directly or indirectly, to surfaces 318A and/or 318B of containment structure 316, as described above. In certain embodiments, a pressure distributor can be positioned between cathode 310 and containment structure 316, or between anode 312 and containment structure 316. In some such embodiments, containment structure can act as a pressure transmitter and/or a separate pressure transmitter can be configured to apply a force to the pressure distributor via the containment structure.

A typical electrochemical cell system also would include, of course, current collectors, external circuitry, and the like. Those of ordinary skill in the art are well aware of the many arrangements that can be utilized with the general schematic arrangement as shown in the figures and described herein.

The components of electrochemical cell 321A may be assembled, in some cases, such that the electrolyte is located between the cathode and the anode in a planar configuration. For example, in the embodiments illustrated in FIG. 3D, cathode 310 of electrochemical cell 321A is substantially planar. A substantially planar cathode can be formed, for example, by coating a cathode slurry on a planar substrate, such as a metal foil or other suitable substrate, which may be included in the assembly of electrochemical cell 321A (although not illustrated in FIG. 3D) or removed from cathode 310 prior to assembly of the electrochemical cell. In addition, in FIG. 3D, anode 312 is illustrated as being substantially planar. A substantially planar anode can be formed, for example, by forming a sheet of metallic lithium, by forming an anode slurry on a planar substrate, or by any other suitable method. Electrolyte 314 is also illustrated as being substantially planar in FIG. 3D.

In certain embodiments, electrochemical cell 321A can comprise an electrode that comprises a metal such as an elemental metal and/or a metal alloy. As one particular example, in certain embodiments, electrochemical cell 321A can comprise an anode comprising elemental lithium (e.g., elemental lithium metal and/or a lithium alloy). In certain embodiments, the anisotropic force applied to the electrochemical cell is sufficiently large such that the application of the force affects the surface morphology of the metal within an electrode of the electrochemical cell, as described in more detail below.

While FIG. 3D illustrates an electrochemical cell arranged in a planar configuration, it is to be understood that any electrochemical cell arrangement can be constructed, employing the principles of some embodiments, in any configuration. In addition to the shape illustrated in FIG. 3D, the electrochemical cells described herein may be of any other shape including, but not limited to, cylinders, a folded multi-layer structure, prisms (e.g., triangular prisms, rectangular prisms, etc.), "Swiss-rolls," non-planar multi-layered structures, etc. Additional configurations are described in U.S. patent application Ser. No. 11/400,025, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety.

In some embodiments, the cathode and/or the anode comprise at least one active surface. As used herein, the term "active surface" is used to describe a surface of an electrode that is in physical contact with the electrolyte and at which electrochemical reactions may take place. For example, in the set of embodiments illustrated in FIG. 3D, cathode 310 includes cathode active surface 320 and anode 312 includes anode active surface 322.

In certain embodiments, the anisotropic force applied to a pressure transmitter 336 and/or through pressure distributor 334 (and eventually in some cases to surface 342 of electrochemical cell 321A) comprises a component normal to the active surface of an electrode (e.g., an anode such as an anode containing lithium metal) within the electrochemical cell. Accordingly, applying an anisotropic force through pressure distributor 334 to the electrochemical cell can result in an anisotropic force being applied to an active surface of an electrode (e.g., an anode) within the electrochemical cell. In the case of a planar electrode surface, the applied force may comprise an anisotropic force with a component normal to the electrode active surface at the point at which the force is applied. For example, referring to the set of embodiments illustrated in FIG. 3C and FIG. 3D, an anisotropic force in the direction of arrow 370 may be applied to electrochemical cell 321A through pressure distributor 334. An anisotropic force applied in the direction of arrow 370 would include a component 372 that is normal to anode active surface 322 and normal to cathode active surface 320. In addition, an anisotropic force applied in the direction of arrow 370 would include a component 374 that is not normal (and is in fact parallel) to anode active surface 322 and cathode active surface 320.

In the case of a curved surface (e.g., a concave surface or a convex surface), the force applied to the electrochemical cell may comprise an anisotropic force with a component normal to a plane that is tangent to the curved surface at the point at which the force is applied.

In one set of embodiments, systems and methods are configured such that, during at least one period of time during charge and/or discharge of the cell, an anisotropic force with a component normal to the active surface of an electrode (e.g., the anode) is applied to the electrochemical cell. In some embodiments, the force may be applied continuously, over one period of time, or over multiple periods of time that may vary in duration and/or frequency.

The magnitude of the applied force is, in some embodiments, large enough to enhance the performance of the electrochemical cell. In certain embodiments, an electrode active surface (e.g., an anode active surface) and the anisotropic force may be together selected such that the anisotropic force affects surface morphology of the electrode active surface to inhibit an increase in electrode active surface area through charge and discharge and wherein, in the absence of the anisotropic force but under otherwise essentially identical conditions, the electrode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject electrochemical cell.

The electrode active surface and anisotropic force can be selected together, to achieve results described herein, easily by those of ordinary skill in the art. For example, where the electrode active surface is relatively soft, the component of the force normal to the electrode active surface may be selected to be lower. Where the electrode active surface is harder, the component of the force normal to the electrode active surface may be greater. Those of ordinary skill in the art, given the present disclosure, can easily select anode materials, alloys, mixtures, etc. with known or predictable properties, or readily test the hardness or softness of such surfaces, and readily select cell construction techniques and arrangements to provide appropriate forces to achieve what is described herein. Simple testing can be done, for example by arranging a series of active materials, each with a series of forces applied normal (or with a component normal) to the active surface, to determine the morphological effect of the force on the surface without cell cycling (for prediction of the selected combination during cell cycling) or with cell cycling with observation of a result relevant to the selection.

As noted above, in some embodiments, an anisotropic force with a component normal to an electrode active surface (e.g., of the anode) is applied, during at least one period of time during charge and/or discharge of the cell, to an extent effective to inhibit an increase in surface area of the electrode active surface relative to an increase in surface area absent the anisotropic force. The component of the anisotropic force normal to the electrode active surface may, for example, define a pressure of at least about 20, at least about 25, at least about 35, at least about 40, at least about 50, at least about 75, at least about 90, at least about 100, at least about 125, at least about 150, at least about 200, at least about 300, at least about 400, or at least about 500 Newtons per square centimeter. In certain embodiments, the component of the anisotropic force normal to the anode active surface may, for example, define a pressure of less than about 500, less than about 400, less than about 300, less than about 200, less than about 190, less than about 175, less than about 150, less than about 125, less than about 115, or less than about 110 Newtons per square centimeter. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force is equivalent to about 9.8 Newtons.

In certain embodiments, the component of the anisotropic force normal to the active surface of an electrode within the electrochemical cell defines a pressure that is at least about 50%, at least about 75%, at least about 100%, at least about 120% of the yield stress of that electrode (e.g., during charge and/or discharge of the electrochemical cell). In certain embodiments, the component of the anisotropic force normal to the active surface of an electrode within the electrochemical cell defines a pressure that is less than about 250% or less than about 200% of the yield stress of that electrode (e.g., during charge and/or discharge of the electrochemical cell). For example, in some embodiments, the electrochemical cell can comprise an anode (e.g., an anode comprising lithium metal and/or a lithium alloy), and the component of an applied anisotropic force that is normal to the anode active surface can define a pressure that is at least about 50%, at least about 75%, at least about 100%, or at least about 120% of the yield stress of the anode (and/or less than about 250% or less than about 200% of the yield stress of the anode). In some embodiments, the electrochemical cell can comprise a cathode, and the component of the anisotropic force normal to the cathode active surface can define a pressure that is at least about 50%, at least about 75%, at least about 100%, or at least about 120% of the yield stress of the cathode (and/or less than about 250% or less than about 200% of the yield stress of the cathode).

In some cases, the anisotropic force can define a pressure that is relatively uniform across one or more external surfaces of the electrochemical cell and/or across one or more active surfaces of electrode(s) within the electrochemical cell. In some embodiments, at least about 50%, at least about 75%, at least about 85%, at least about 90%, at least about 95%, or at least about 98% of the area of one or more external surfaces of an electrochemical cell and/or of the area of one or more active surfaces of an electrode (e.g., anode) defines a uniform area that includes a substantially uniform distribution of pressure defined by an anisotropic force. In this context, a "surface of an electrochemical cell" and a "surface of an electrode" refer to the geometric surfaces of the electrochemical cell and the electrode, which will be understood by those of ordinary skill in the art to refer to the surfaces defining the outer boundaries of the electrochemical cell and electrode, for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.).

In some embodiments, a pressure is substantially uniformly distributed across a surface when any continuous area that covers about 10%, about 5%, about 2%, or about 1% of the uniform area (described in the preceding paragraph) includes an average pressure that varies by less than about 25%, less than about 10%, less than about 5%, less than about 2%, or less than about 1% relative to the average pressure across the entirety of the uniform area.

Stated another way, in some embodiments, at least about 50% (or at least about 75%, at least about 85%, at least about 90%, at least about 95%, or at least about 98%) of the area of a surface of the electrochemical cell and/or of the active area of an electrode defines a first, continuous area of essentially uniform applied pressure, the first area having a first average applied pressure. In some cases, any continuous area that covers about 10% (or about 5%, about 2%, or about 1%) of the first, continuous area of the surface of the electrochemical cell and/or of the electrode includes a second average applied pressure that varies by less than about 25% (or less than about 10%, less than about 5%, less than about 2%, or less than about 1%) relative to the first average applied pressure across the first, continuous area.

One of ordinary skill in the art would be capable of determining an average applied pressure within a portion of a surface, for example, by determining the force level applied at a representative number of points within the surface portion, integrating a 3-dimensional plot of the applied pressure as a function of position on the surface portion, and dividing the integral by the surface area of the surface portion. One of ordinary skill in the art would be capable of producing a plot of the applied pressure across a surface portion by, for example, using a Tekscan I-Scan system for measuring the pressure field.

The anodes of the electrochemical cells described herein may comprise a variety of anode active materials. As used herein, the term "anode active material" refers to any electrochemically active species associated with the anode. For example, the anode may comprise a lithium-containing material, wherein lithium is the anode active material. Suitable electroactive materials for use as anode active materials in the anode of the electrochemical cells described herein include, but are not limited to, lithium metal such as lithium foil and lithium deposited onto a conductive substrate, and lithium alloys (e.g., lithium-aluminum alloys and lithium-tin alloys). Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art to form an anode.

In one embodiment, an electroactive lithium-containing material of an anode active layer comprises greater than 50% by weight of lithium. In another embodiment, the electroactive lithium-containing material of an anode active layer comprises greater than 75% by weight of lithium. In yet another embodiment, the electroactive lithium-containing material of an anode active layer comprises greater than 90% by weight of lithium. Additional materials and arrangements suitable for use in the anode are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

The cathodes in the electrochemical cells described herein may comprise a variety of cathode active materials. As used herein, the term "cathode active material" refers to any electrochemically active species associated with the cathode. Suitable electroactive materials for use as cathode active materials in the cathode of the electrochemical cells some embodiments include, but are not limited to, one or more metal oxides, one or more intercalation materials, electroactive transition metal chalcogenides, electroactive conductive polymers, sulfur, carbon and/or combinations thereof.

In some embodiments, the cathode active material comprises one or more metal oxides. In some embodiments, an intercalation cathode (e.g., a lithium-intercalation cathode) may be used. Non-limiting examples of suitable materials that may intercalate ions of an electroactive material (e.g., alkaline metal ions) include metal oxides, titanium sulfide, and iron sulfide. In some embodiments, the cathode is an intercalation cathode comprising a lithium transition metal oxide or a lithium transition metal phosphate. Additional examples include $Li_xCoO_2$ (e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, $LiCo_xNi_{(1-x)}O_2$, and $LiCo_xNi_yMn_{(1-x-y)}O_2$ (e.g., $LiNi_{1/3}Mn_{1/3}Co_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$). X may be greater than or equal to 0 and less than or equal to 2. X is typically greater than or equal to 1 and less than or equal to 2 when the electrochemical cell is fully discharged, and less than 1 when the electrochemical cell is fully charged. In some embodiments, a fully charged electrochemical cell may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where ($0<x\leq1$), $LiMn_xNi_yO_4$ where ($x+y=2$) (e.g., $LiMn_{1.5}Ni_{0.5}O_4$), $LiNi_xCo_yAl_2O_2$ where ($x+y+z=1$), $LiFePO_4$, and combinations thereof. In some embodiments, the electroactive material within the cathode comprises lithium transition metal phosphates (e.g., $LiFePO_4$), which can, in certain embodiments, be substituted with borates and/or silicates.

As noted above, in some embodiments, the cathode active material comprises one or more chalcogenides. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr. Ti, Fc, Co, Ni, Cu, Y, Zr, Nb, Mo, Ru, Rh, Pd, Ag, Hf, Ta, W, Rc, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of some embodiments may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments, an electroactive sulfur-containing material of a cathode active layer comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The cathode active layers of some embodiments may comprise from about 20 to 100% by weight of electroactive cathode materials (e.g., as measured after an appropriate amount of solvent has been removed from the cathode active layer and/or after the layer has been appropriately cured). In one embodiment, the amount of electroactive sulfur-containing material in the cathode active layer is in the range of 5-30% by weight of the cathode active layer. In another embodiment, the amount of electroactive sulfur-containing material in the cathode active layer is in the range of 20% to 90% by weight of the cathode active layer.

Additional materials suitable for use in the cathode, and suitable methods for making the cathodes, are described, for example, in U.S. Pat. No. 5,919,587, filed May 21, 1997, entitled "Novel Composite Cathodes, Electrochemical Cells Comprising Novel Composite Cathodes, and Processes for Fabricating Same." and U.S. Patent Publication No. 2010/0035128 to Scordilis-Kelley et al. filed on Aug. 4, 2009, entitled "Application of Force in Electrochemical Cells," each of which is incorporated herein by reference in its entirety for all purposes.

A variety of electrolytes can be used in association with the electrochemical cells described herein. In some embodiments, the electrolyte may comprise a non-solid electrolyte, which may or may not be incorporated with a porous separator. As used herein, the term "non-solid" is used to refer to materials that are unable to withstand a static shear stress, and when a shear stress is applied, the non-solid experiences a continuing and permanent distortion. Examples of non-solids include, for example, liquids, deformable gels, and the like.

The electrolytes used in electrochemical cells described herein can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. Exemplary materials suitable for use in the electrolyte are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

Figure 4A:
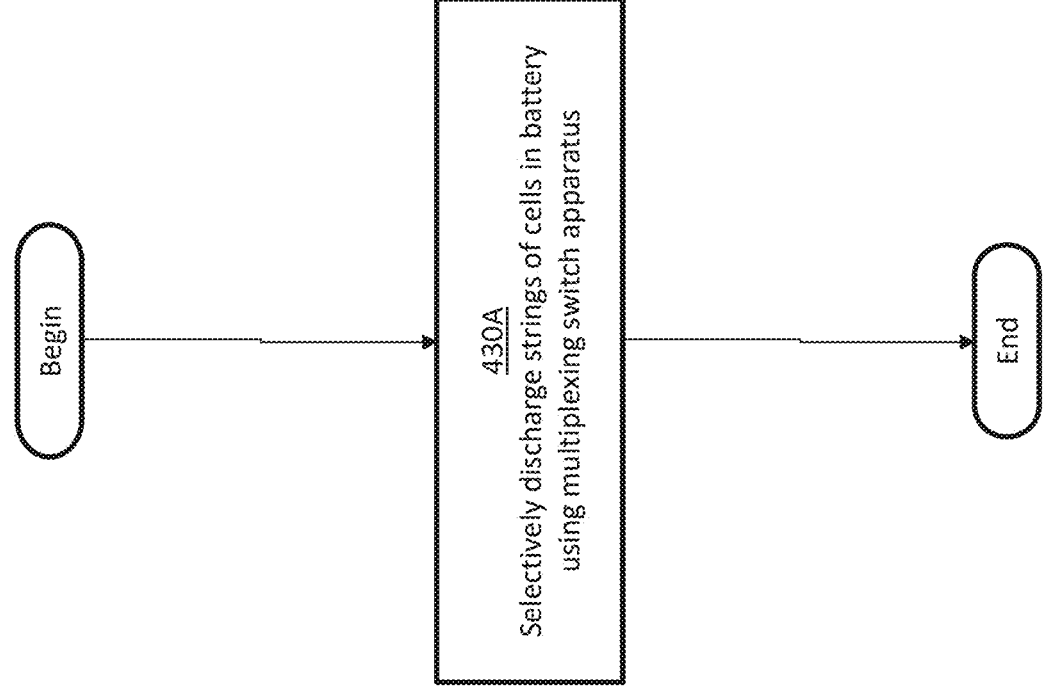
FIG. 4A is a flow chart depicting a representative process for discharging strings of cells of a battery, according to some embodiments.
Figure 4A:

FIG. 4A depicts a representative high-level process 400A for discharging strings of cells of a battery. The acts comprising representative process 400A are described in detail in the paragraphs that follow.

In some embodiments, representative process 400A may include act 430A, wherein strings of cells in a battery may be selectively discharged using a multiplexing switch apparatus (such as multiplexing switch apparatus 112 described above). Additionally, the multiplexing switch apparatus may be connected to two or more strings (e.g., 121, 122, 123, and/or 124) of cells or modules (e.g., 121A-C) of at least one battery (e.g., 120-150). Each set or module of cells may comprise one or more cells.

In some embodiments, process 400A may then end or repeat as necessary.

FIG. 4B depicts a representative high-level process 400B for discharging strings of cells of a battery. The acts comprising representative process 400B are described in detail in the paragraphs that follow.

In some embodiments, representative process 400B optionally may begin at act 415, wherein the multiplexing switch apparatus may be used to selectively connect or disconnect string(s) of cells to a balance rail (e.g., 160).

In some embodiments, act 415 may optionally include act 416, wherein the multiplexing switch apparatus may be used to connect one or more strings of cells to the balance for no discharging of those strings and to connect another string of cells to an input/output bus (e.g., 32110) for discharging of that string to the load (e.g., 229).

In some embodiments, act 415 may optionally include act 417, wherein the multiplexing switch apparatus may be used to maintain an equivalent state of charge between the strings of cells by adjusting switching times and/or switching states.

In some embodiments, act 415 may optionally include act 418, wherein the multiplexing switch apparatus may be used to keep at least one of the strings of cells connected to the balance rail during use of the battery.

Acts 416-418 may be performed in any order.

In some embodiments, if the criterion has been met, representative process 400B may then proceed to act 430B, wherein the next string of cells in the battery may be selectively discharged using the multiplexing switch apparatus. For example, if the currently discharging string of cells has met some appropriate criterion or criteria, that string of cells may be disconnected from the load and the next string of cells may be connected (where the next set may be determined by a criterion or criteria which may be the same or different from those discussed herein) as described herein. Alternatively, if the criterion has not been met, it may continue to be monitored. According to some embodiments, the connection between a single cell and the load may be at least 0.01 seconds in duration. The inventors have recognized and appreciated that a shorter connection duration than 0.01 seconds may surprisingly produce more noise than at 0.01 seconds and may not allow the electrochemistry of the cell to accomplish anything non-negligible.

In some embodiments, representative process 400B may then optionally proceed to any of acts 432 and/or 434. For example, if process 400B proceeds from act 430B to act 432, the multiplexing switch apparatus may be used to selectively discharge the sets of cells at a first rate at least 2 times higher than a second rate of charging the sets of cells.

Alternatively or additionally, process 400B may proceed from act 430B to act 434, wherein the multiplexing switch apparatus may be used to selectively discharge the sets of cells at a first rate at least 4 times higher than a second rate of charging the sets of cells.

It should be appreciated that any of acts 432 and/or 434 may actually be integral to act 430B, although they are represented as separate acts in FIG. 4B.

In some embodiments, process 400B may then end or repeat as necessary. For example, process 400B may repeat through any suitable number of cycles. According to some embodiments, for each cycle or some cycles, each string or individual cell may be discharged once before any string or cell is discharged twice.

Figure 4C:
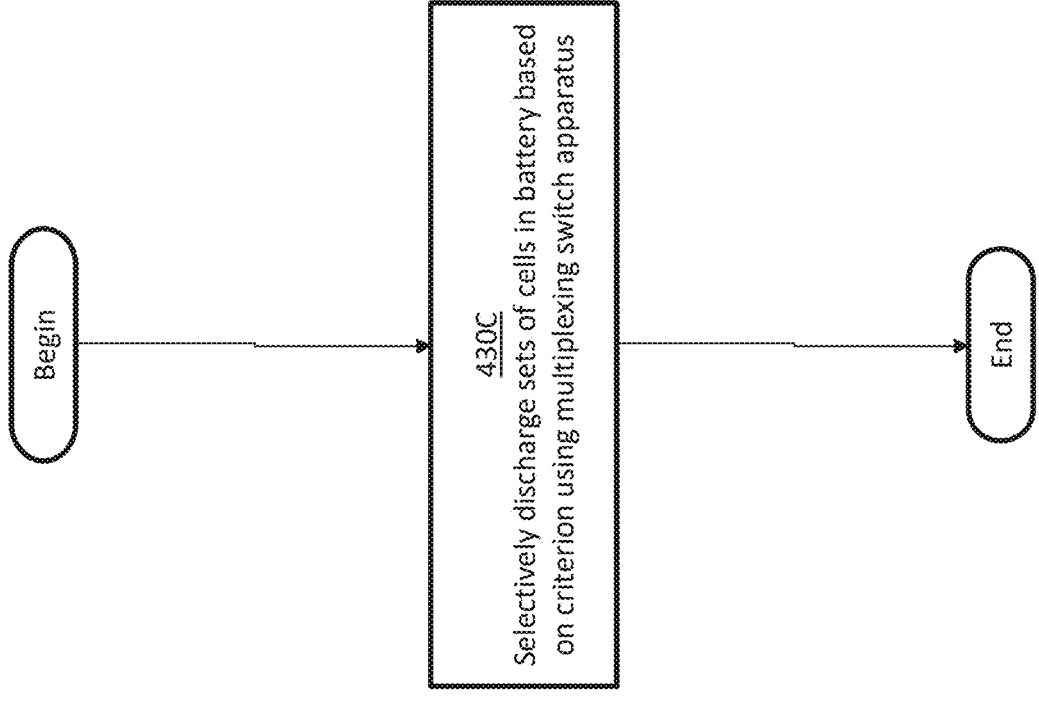
FIG. 4C is a flow chart depicting a representative process for discharging sets of cells of a battery, according to some embodiments.
Figure 4C:
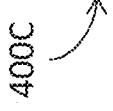

FIG. 4C depicts a representative high-level process 400C for discharging sets of cells of a battery. The acts comprising representative process 400C are described in detail in the paragraphs that follow.

In some embodiments, representative process 400C may include act 430, wherein sets of cells in a battery may be selectively discharged based on at least one criterion using a multiplexing switch apparatus (such as multiplexing switch apparatus 112 described above). Additionally, the multiplexing switch apparatus may be connected to two or more sets (e.g., 121, 122, 123, and/or 124) of cells or modules (e.g., 121A-C) of at least one battery (e.g., 120-150). Each set of cells may comprise one or more cells.

In some embodiments, process 400C may then end or repeat as necessary.

Figure 4D:
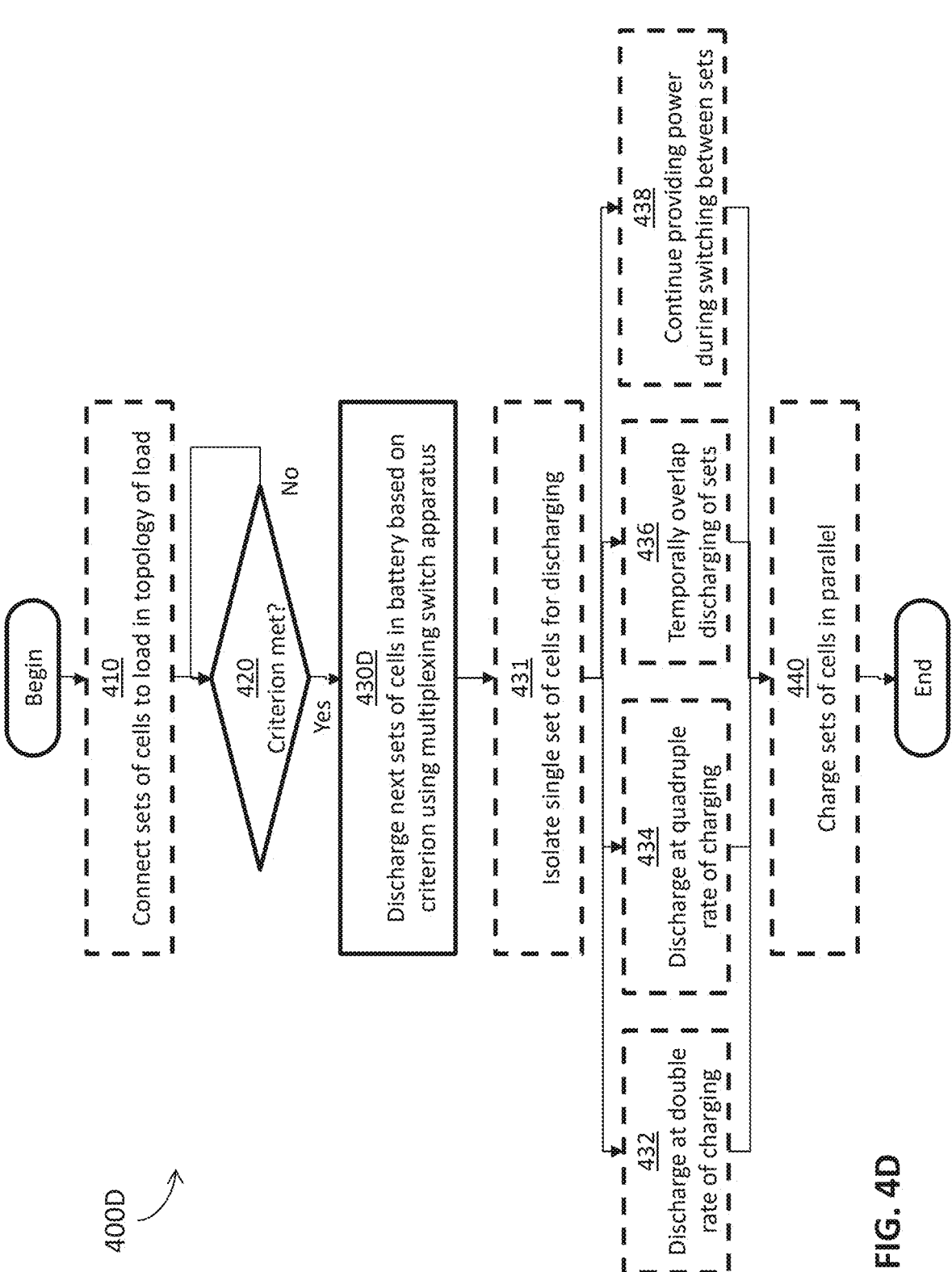
FIG. 4D is a flow chart depicting an additional representative process for discharging sets of cells of a battery, according to some embodiments.

FIG. 4D depicts a representative high-level process 400D for discharging sets of cells of a battery. The acts comprising representative process 400D are described in detail in the paragraphs that follow.

In some embodiments, representative process 400D optionally may begin at act 410, wherein the multiplexing switch apparatus may be used to connect the sets of cells to a load in a topology employed by the load. The batteries (e.g., 120-150) may include sets (e.g., 121, 122, 123, and/or 124) of the cells or modules (e.g., 121A-C), and each set of cells may comprise one or more cells. For example, the multiplexing switch apparatus may connect the cells to the load in series, parallel, serial/parallel, or any other suitable topology required to meet the voltage and current requirements of the load or the desires of the given application or user.

In some embodiments, representative process 400D may then optionally proceed to act 420, wherein at least one criterion, and/or some parameter of a criterion, may be measured or otherwise monitored in relation to the cells of the battery or batteries, which may already be discharging or have discharged at least one cell or set of cells, to determine whether the criterion has been met.

For example, a sensor (such as 116 in FIG. 1A) may measure the delivered discharge capacity at a connection between a load and a set of cells currently connected to the load, or it may measure the current of the set of cells. Alternatively or additionally, the sensor may measure any of the following: a duration of the connection (which may be at least 0.01 seconds in some embodiments), a capacity accumulated over several connections between the load and the set of cells, a voltage of the set of cells and/or of at least one other set of cells, a cutoff discharge voltage of the set of cells, a power of the set of cells, an energy of the set of cells, a number of charge or discharge cycles of the set of cells, an impedance of the set of cells, a rate of voltage fading of the set of cells during the connection, a temperature of the set of cells, and a pressure of the set of cells.

In some embodiments, the criterion may include a sequence in which to discharge the cells or sets of cells. Alternatively or additionally, the criterion may be the value of a function that has any of the above as parameters.

According to some embodiments, the criterion does not include a number of prior discharge cycles of the sets of cells.

In some embodiments, if the criterion has been met, representative process 400D may then proceed to act 430, wherein the next set of cells in the battery may be selectively discharged based on the criterion using a multiplexing switch apparatus (such as multiplexing switch apparatus 112 described above). For example, if the currently discharging set of cells has met whatever criterion or criteria is required, that set of cells may be disconnected and the next set of cells may be connected (where the next set may be determined by a criterion or criteria which may be the same or different from those discussed above) as described herein. Alternatively, if the criterion has not been met, it may continue to be monitored. According to some embodiments, the connection between a single cell and the load may be at least 0.01 seconds in duration. The inventors have recognized and appreciated that a shorter connection duration than 0.01 seconds may surprisingly produce more noise than at 0.01 seconds and may not allow the electrochemistry of the cell to accomplish anything non-negligible.

In some embodiments, representative process 400D may then optionally proceed to act 431, wherein the multiplexing switch apparatus may be used to isolate a single set of cells for discharging while other sets of cells are not discharging. For example, when a controller (e.g., 114 of FIG. 1A) determines that cell 121B should be discharged, it may cause the multiplexing switch apparatus to isolate cell 121B for discharging while cells 121A and 121C are not discharging.

In some embodiments, representative process 400D may then optionally proceed to any of acts 432, 434, 436, and/or 438. For example, if process 400D proceeds from act 431 to act 432, the multiplexing switch apparatus may be used to selectively discharge the sets of cells at a first rate at least 2 times higher than a second rate of charging the sets of cells.

Alternatively or additionally, process 400D may proceed from act 431 to act 434, wherein the multiplexing switch apparatus may be used to selectively discharge the sets of cells at a first rate at least 4 times higher than a second rate of charging the sets of cells.

Alternatively or additionally, process 400D may proceed from act 431 to act 436, wherein discharge of the sets of cells may be temporally overlapping, such as by using the multiplexing switch apparatus as discussed above.

Alternatively or additionally, process 400D may proceed from act 431 to act 438, wherein power may continue to be provided from the sets of cells during switching between different sets.

It should be appreciated that any of acts 431, 432, 434, 436, and/or 438 may actually be integral to act 430, although they are represented as separate acts in FIG. 4B.

In some embodiments, representative process 400D may then optionally proceed to act 440, wherein the multiplexing switch apparatus may be used to charge the sets of cells in parallel, such as is described above.

According to some embodiments, any number of sets of cells, including all the sets of cells in the battery, battery pack, or system, may be discharged simultaneously. For example, with a battery having 4 cells, all 4 cells (or only 2 or 3) could be discharged at the same time, producing whatever discharge current is desirable for the load or application and possible for the cells. Additionally, in some embodiments, the number of cells or sets discharged or charged is selected based on the at least one criterion, such as discharge current for discharging. In certain embodiments, the sequence in which the number of cells or sets of cells is discharged or charged is selected based on the at least one criterion, such as discharge current for discharging. In some embodiments, both the number of cells or sets discharged or charged and the sequence of doing so is selected based on the at least one criterion, such as discharge current for discharging.

In some embodiments, process 400D may then end or repeat as necessary. For example, process 400D may repeat through any suitable number of cycles. According to some embodiments, for each cycle or some cycles, each cell may be discharged once before any cell is discharged twice.

Figure 5:
FIG. 5 is a flow chart depicting a representative process for controlling a battery pack, according to some embodiments.
Figure 5:
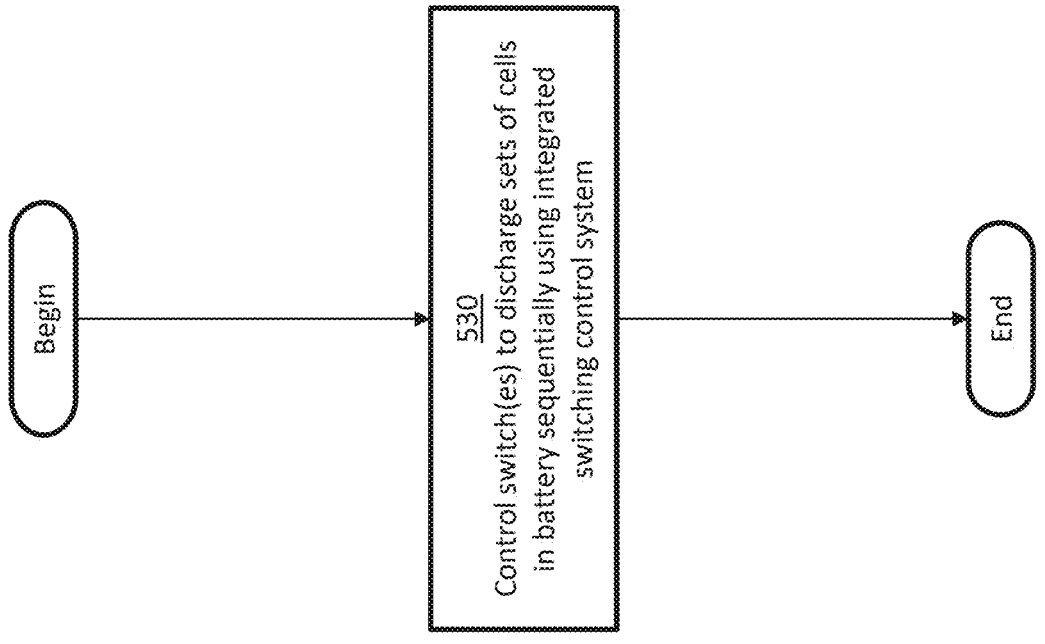

FIG. 5 depicts a representative high-level process 500 for controlling a battery pack. The acts comprising representative process 500 are described in detail in the paragraphs that follow.

In some embodiments, representative process 500 may include act 530, wherein switches may be controlled (e.g., by a controller such as 114 described above) to discharge sets (e.g., 121, 122, 123, and/or 124) of cells or modules (e.g., 121A-C) in the battery pack (e.g., 210) sequentially using an integrated switching control system. Additionally, the multiplexing switch apparatus may be connected to two or more sets of cells of the battery or batteries. Each set of cells may comprise one or more cells.

In some embodiments, process 500 may then end or repeat as necessary.

Figure 6A:
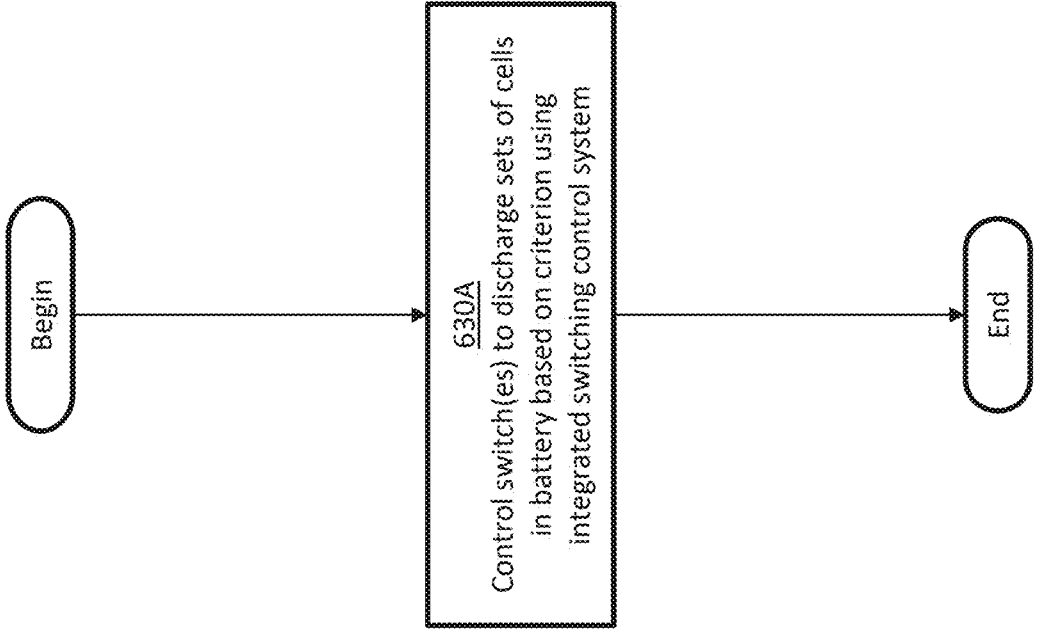
FIG. 6A is a flow chart depicting an additional representative process for controlling a battery pack, according to some embodiments.
Figure 6A:
Figure 6B:
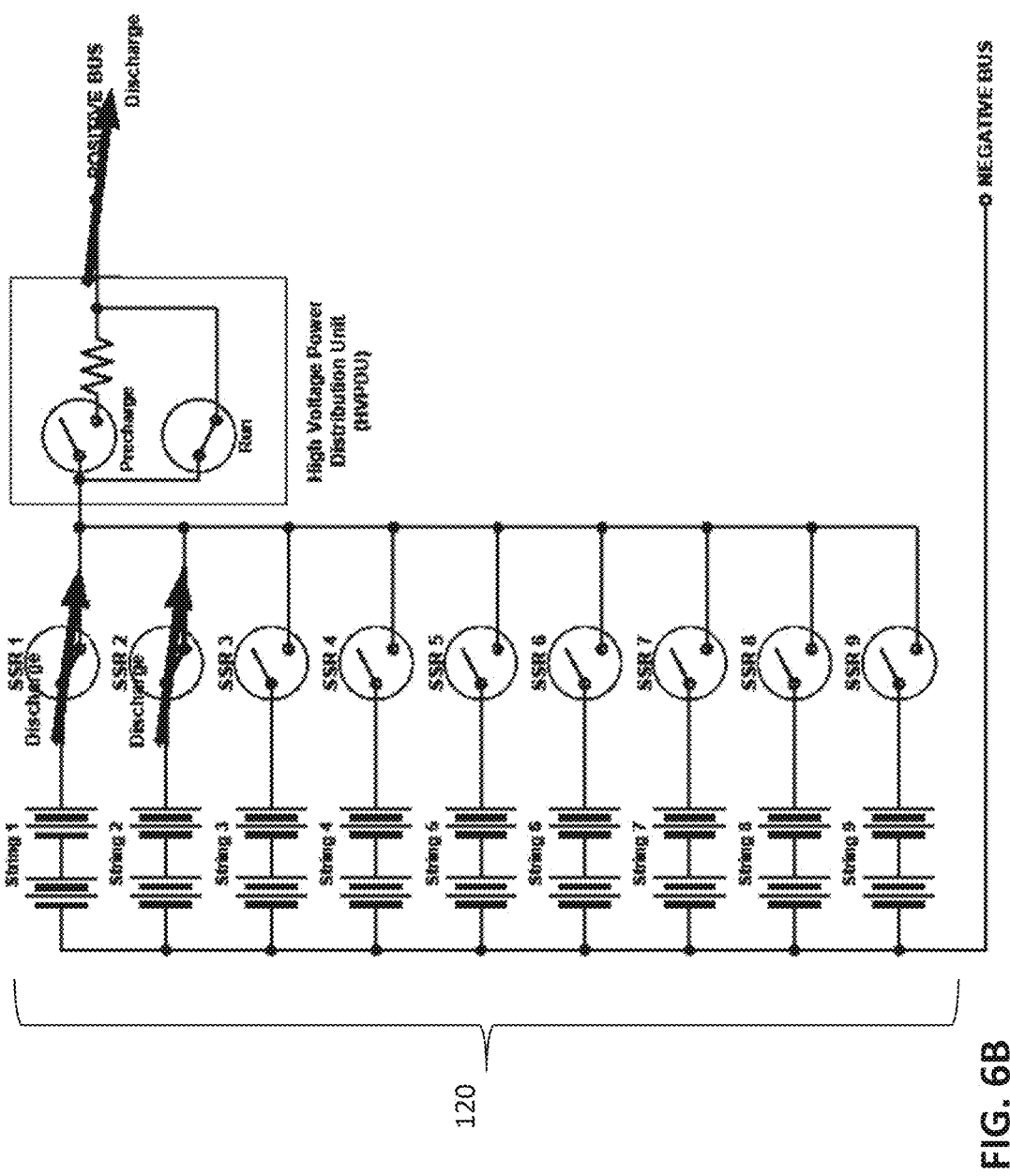
FIG. 6B is a schematic depicting a representative battery management system, according to some embodiments.

FIG. 6A depicts a representative high-level process 600A for controlling a battery pack. The acts comprising representative process 600A are described in detail in the paragraphs that follow.

In some embodiments, representative process 600A may include act 630A, wherein switches may be controlled (e.g., by a controller such as 114 described above) to discharge sets (e.g., 121, 122, 123, and/or 124) of cells or modules (e.g., 121A-C) in the battery pack (e.g., 210) based on a criterion using an integrated switching control system. Additionally, the multiplexing switch apparatus may be connected to two or more sets of cells of the battery or batteries. Each set of cells may comprise one or more cells. In some embodiments, the criterion may include any of the following: a duration of a connection between a load and a set of cells currently connected to the load, a delivered discharge capacity at the connection, and a value of a function having one or more parameters.

In some embodiments, process 600A may then end or repeat as necessary.

Figure 6C:
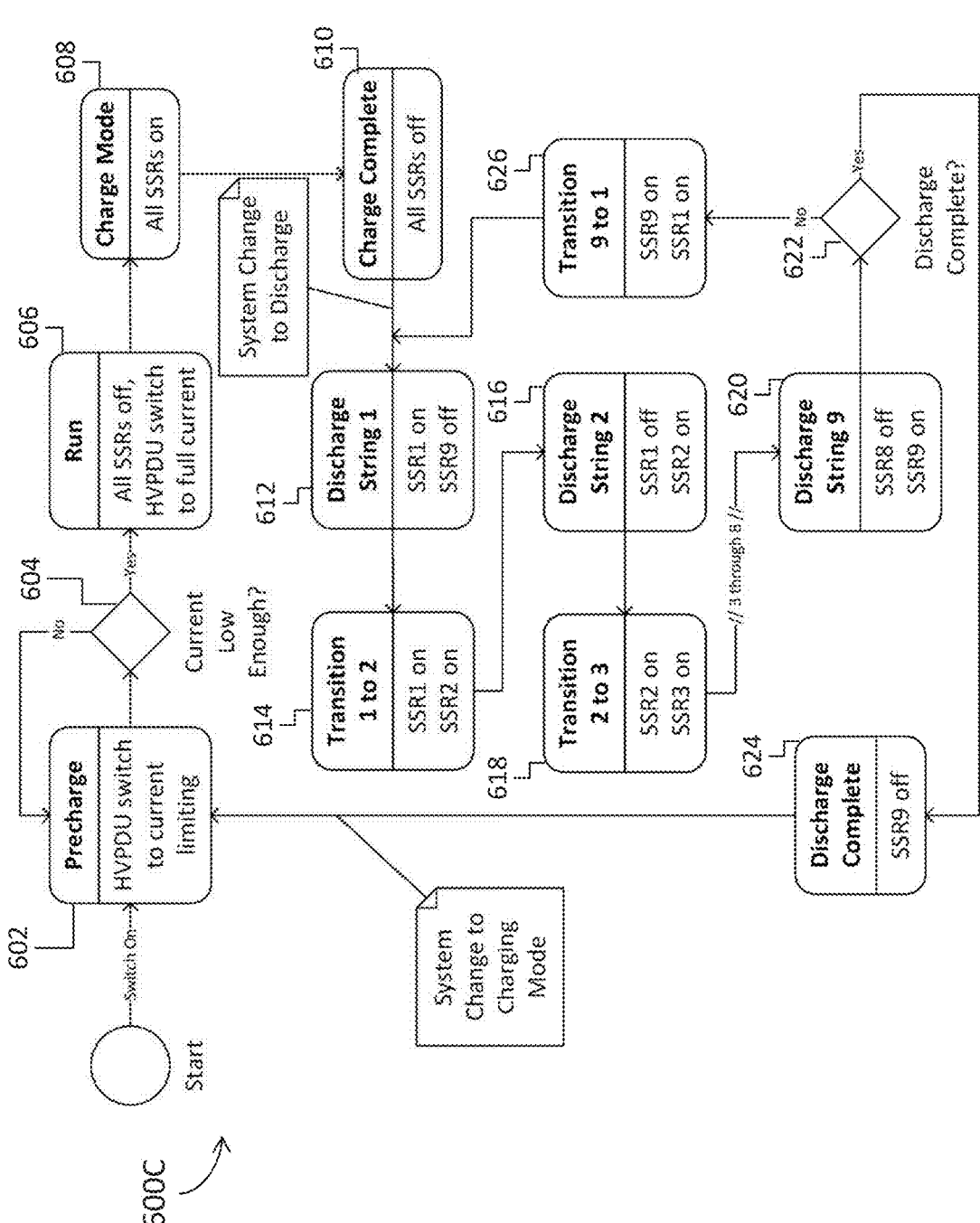
FIG. 6C is a flow chart depicting an additional representative process for discharging strings of cells of a battery, according to some embodiments.

FIG. 6C depicts a representative high-level process 600C for discharging strings of cells of a battery. The acts comprising representative process 600C are described in detail in the paragraphs that follow.

In some embodiments, representative process 600C may include act 602, wherein after the battery is activated, a high voltage power distribution unit (HVPDU) may switch to current limiting mode (e.g., during pre-charging mode). The HVPDU may distribute battery power throughout a load, such as a vehicle. In some embodiments, process 600C may then proceed to act 604, wherein the current is compared to a threshold (e.g., to determine if the current is at least as low as the threshold). If the current satisfies the threshold (e.g., the current is low enough), process 600C may proceed to act 606, wherein all solid state relays (SSR) may be off (e.g., in running mode), and the HVPDU may switch to full current. If the current does not satisfy the threshold (e.g., the current is too high), process 600C may return to act 602.

In some embodiments, process 600C may proceed from act 606 to act 608, wherein all solid state relays may be on (e.g., in charging mode). In some embodiments, process 600C may proceed to act 610, wherein all solid state relays may be off (e.g., in charging complete mode). In some embodiments, process 600C may proceed to act 612, wherein string 1 is discharged, with SSR1 on and SSR9 off, after the system changes to discharging mode. For example, string 1 may be discharged from 4.35 volts to 4 volts per cell. In some embodiments, string 1's voltage may go from 72 cells at 4.35 volts (313.2 volts combined) down to 72 cells at 4 volts (288 volts combined), while string 2 may still be at 313.2 volts combined. In some embodiments, when string 2 is connected to the common bus while string 1 is still connected, string 2 may discharge into string 1 at a current proportional to the voltage difference between the strings.

In some embodiments, process 600C may proceed to act 614, wherein the system may transition from string 1 to string 2, with both SSR1 and SSR2 on. In some embodiments, process 600C may proceed to act 616, wherein string 2 may be discharged, with SSR1 off and SSR2 on. In some embodiments, process 600C may proceed to act 618, wherein the system may transition from string 2 to string 3, with SSR2 and SSR3 both on. In some embodiments, process 600C may proceed to act 620, before which this pattern may be followed for discharging strings 3 through 8, wherein string 9 may be discharged, with SSR8 off and SSR9 on. In some embodiments, process 600C may proceed to act 622, wherein the system may check whether discharge is complete. If the discharge is complete, process 600C may proceed from act 622 to act 624, with SSR9 off and then to act 602, with the system changing to charging mode. If the discharge is not complete, process 600C may proceed to act 626, wherein the system may transition from string 9 to string 1, with SSR9 and SSR1 both on, and then return to act 612.

In some embodiments, process 600C may then end or repeat as necessary.

For example, nine parallel strings in a battery pack may be charged in parallel. At the end of charging, the parallel strings may be disconnected from a common high voltage bus. During discharging, one parallel string (e.g., string 1) may be connected to the bus and pulse discharged for about 30 seconds. Following the pulse discharging, the second parallel string (e.g., string 2) may be connected to the common high voltage bus, the first string may be disconnected, and the second string may complete its pulse discharge. This process may be repeated over and over through the discharging phase.

The inventors have recognized and appreciated that some embodiments described above may produce results showing various improvements over conventional techniques when implemented. For example, in one implementation, cells were made of NCMA622 cathode (BASF) with 50 μm Li foil and 25 μm Celgard 2325 separator filled with F9 (BASF) electrolyte containing 1% by weight of LiBOB, with an active electrode area of 99.41 cm². The cells were assembled into 13 batteries containing 4 cells each. The batteries were subjected to 13 electrical charge-discharge cycling tests performed using some embodiments at conditions summarized in Table 1 and Table 2 below. The cells in the batteries were kept at pressure of 12 kg/cm² and temperature of 18° C. during cycling tests.

TABLE 1

Battery test data for 4 cells simultaneously discharged with even current distribution.

| Test # | Battery Discharge Current mA | Battery Charge Current mA | Battery Cycle Life to 800 mAh Cutoff | Battery 5th Cycle Discharge Capacity mAh | Cell Discharge Current mA | Cell Charge Current mA |
|---|---|---|---|---|---|---|
| 1 | 800 | 800 | 29 | 1344 | 200 | 200 |
| 2 | 400 | 400 | 52 | 1380 | 100 | 100 |
| 3 | 300 | 300 | 53 | 1412 | 75 | 75 |

TABLE 2

Battery test data for 4 cells sequentially discharged at various discharge pulse durations.

| Test # | Battery Discharge Current mA | Battery Charge Current mA | Battery Cycle Life to 800 mAh Cutoff | Battery 5th Cycle Discharge Capacity mAh | Cell Discharge Pulse Current mA | Cell Discharge Pulse Duration s | Cell No Current Duration s | Cell Charge Current mA | Level of Cell Discharge at Single Pulse |
|---|---|---|---|---|---|---|---|---|---|
| 4 | 800 | 800 | 94 | 1064 | 800 | 1197 | 0 | 200 | Full |
| 5 | 800 | 800 | 131 | 1208 | 800 | 10 | 30 | 200 | Partial |
| 6 | 800 | 800 | 125 | 1252 | 800 | 1 | 3 | 200 | Partial |
| 7 | 800 | 800 | 46 | 1260 | 800 | 0.1 | 0.3 | 200 | Partial |
| 8 | 400 | 400 | 263 | 1260 | 400 | 2835 | 0 | 100 | Full |
| 9 | 400 | 400 | 283 | 1284 | 400 | 10 | 30 | 100 | Partial |
| 10 | 400 | 400 | 217 | 1352 | 400 | 1 | 3 | 100 | Partial |
| 11 | 400 | 400 | 59 | 1368 | 400 | 0.1 | 0.3 | 100 | Partial |
| 12 | 300 | 300 | 334 | 1304 | 300 | 3912 | 0 | 75 | Full |
| 13 | 300 | 300 | 298 | 1412 | 300 | 10 | 30 | 75 | Partial |

Table 1 (Tests #1-#3) represents comparative examples (as performed by conventional techniques) and summarizes test results when batteries were charged and discharged at constant currents with cells connected in parallel and with charge and discharge currents distributed evenly among 4 cells. Charge cutoff voltage was 4.35 V and discharge cutoff voltage was 3.2 V. Charge-discharge cycling stopped when battery capacity reached 800 mAh.

Table 2 (Tests #4-#13) summarizes test results when batteries were charged to 4.35 V at constant currents with cells connected in parallel and with charge discharge currents distributed evenly among 4 cells. Discharge of these batteries was performed in a way that the battery as a whole experienced constant discharge current. However, individual cells were connected to and disconnected from the load sequentially, providing discharge current pulse only for one of four cells at a time. At the end of this pulse, the next cell was connected and the previous one was disconnected. Cells experienced discharge pulses in sequences (e.g., Cell #1, 2, 3, 4, 1, 2, 3, 4, etc.) during a certain pulse time or until discharge voltage reached 3.2 V. Tests #4, #8, and #12 provided full cell discharge at single pulse. Other tests provided partial cell discharge at single pulse with durations of 0.1, 1, and 10 s. Charge-discharge cycling stopped when battery capacity reached 800 mAh.

Figure 7A:
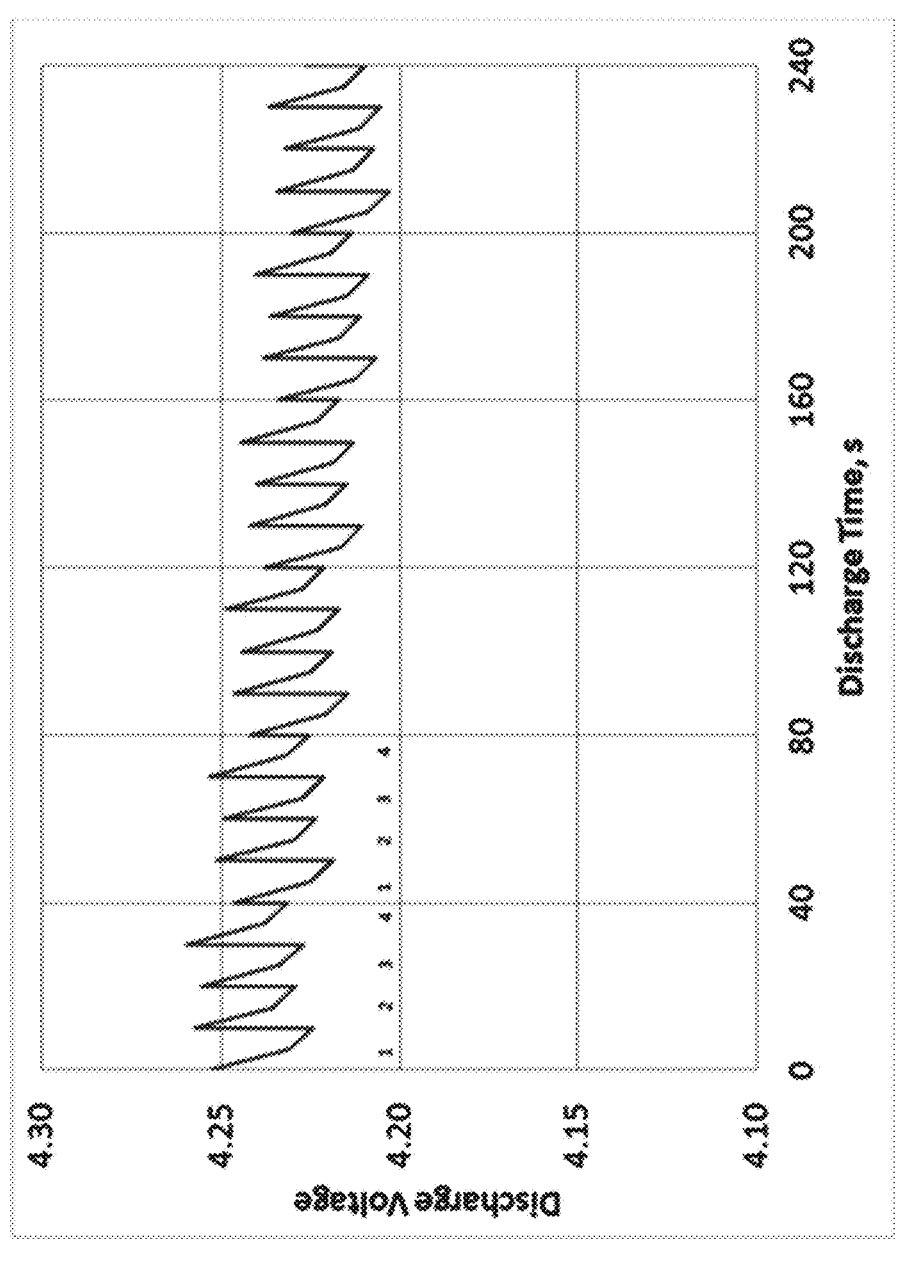
FIG. 7A is a chart depicting an exemplary discharge profile, according to some embodiments.
Figure 7B:
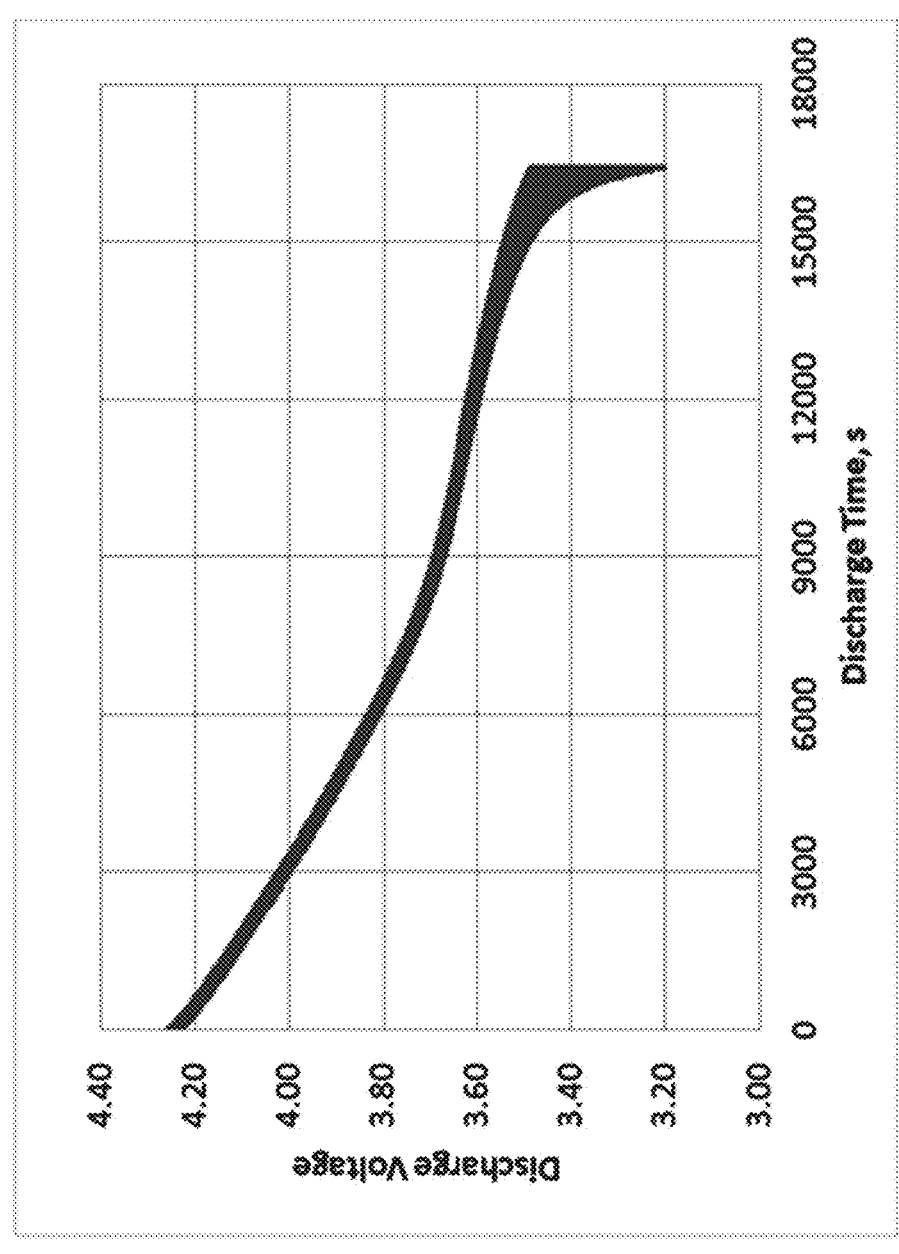
FIG. 7B is a chart depicting an exemplary full discharge profile, according to some embodiments.

FIG. 7A, corresponding to Test #13, shows the battery voltage profile at the beginning of the 10 second pulse discharge for the first 240 seconds, and FIG. 7B shows the full discharge profile to a voltage of 3.2 V. In FIG. 7A, the cell numbers affected by the 10 second 300 mA pulses at repeated sequences are shown for the first 80 seconds.

Figure 7C:
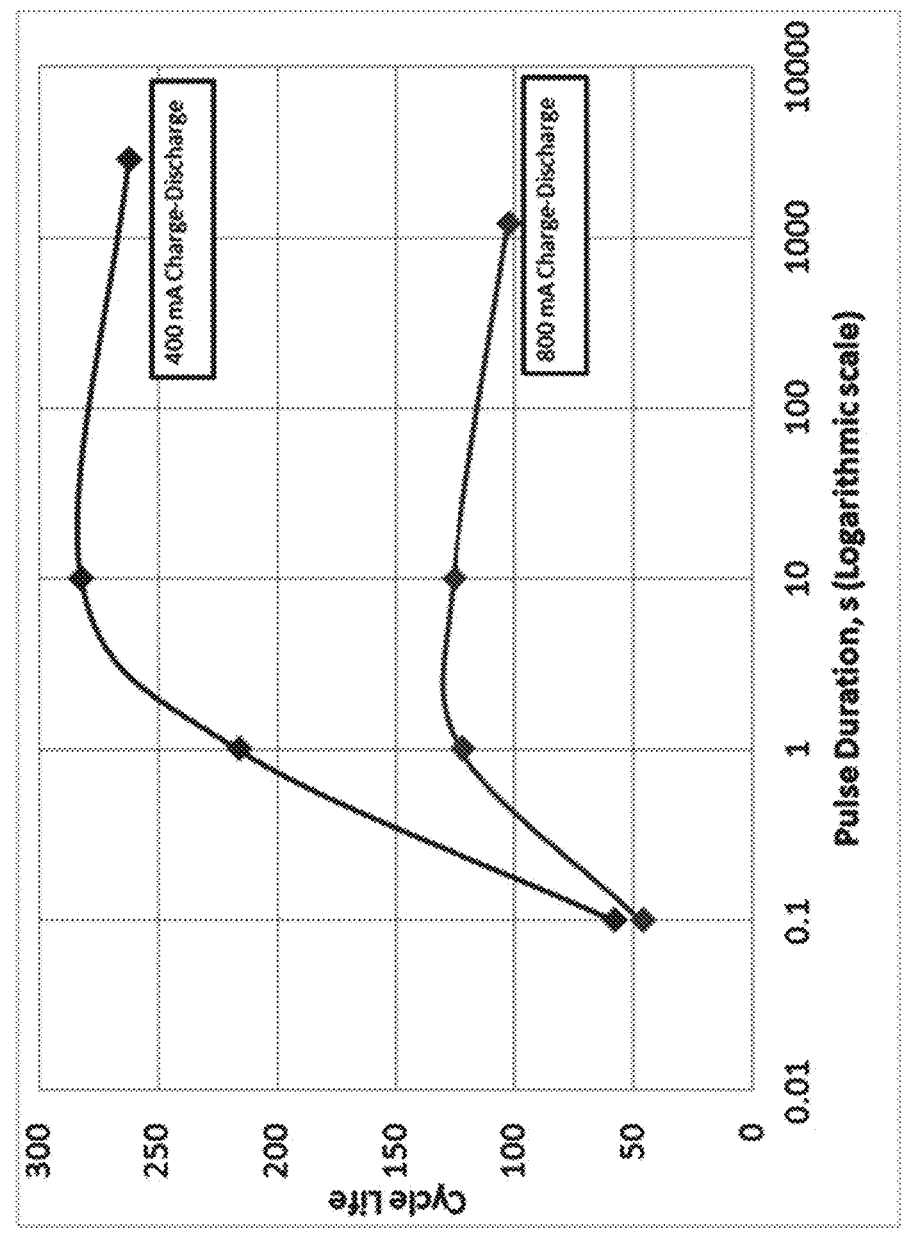
FIG. 7C is a chart depicting an exemplary battery cycle life, according to some embodiments.

Referring back to Table 1 and Table 2, the inventors have recognized and appreciated that applying whole battery discharge current to the portion of the battery cells in sequence (Table 2) has led to surprising and dramatic cycle life improvement compared with homogeneous current distribution among all battery cells (Table 1), as has been done in conventional techniques. This cycle life improvement may be up to six-fold, and the inventors recognized it may be a function of discharge pulse duration as well as charge-discharge rate. FIG. 7C, which illustrates battery cycle life as a function of pulse duration at two charge-discharge rates (corresponding to Tests #4-#11), shows that cycle life may be especially improved with pulse time longer than 0.1 seconds and pulse duration around 10 seconds. The inventors have recognized and appreciated that improvements to battery cycle life described herein are even available using some embodiments at partial discharge, as FIG. 7C shows and as would not have been expected based on experience with conventional techniques. Additionally, the full capacity of all cells, even when far from uniform, can be utilized with some embodiments.

It should be appreciated that, in some embodiments, the methods described above with reference to FIGS. 4A-6A may vary, in any of numerous ways. For example, in some embodiments, the steps of the methods described above may be performed in a different sequence than that which is described, a method may involve additional steps not described above, and/or a method may not involve all of the steps described above.

Figure 8:
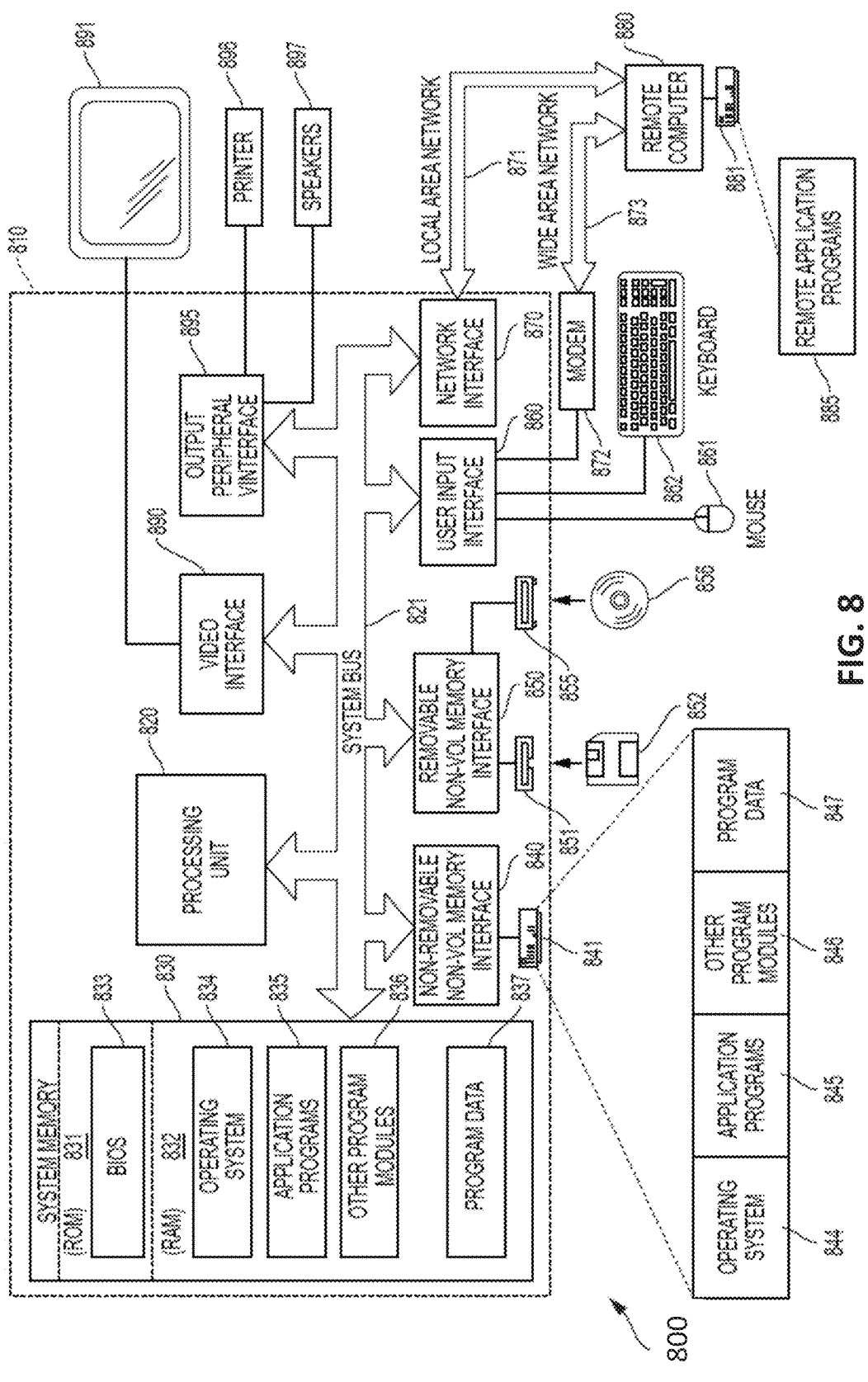
FIG. 8 is a block diagram depicting a representative computing system that may be used to implement certain aspects.

It should further be appreciated from the foregoing description that some aspects may be implemented using a computing device. FIG. 8 depicts a general purpose computing device in system 800, in the form of a computer 810, which may be used to implement certain aspects, such as any of the controllers described above (e.g., 114).

In computer 810, components include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media that may be used to store the desired information and may be accessed by computer 810. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 839 and program data 837.

The computer 810 may also include other removable/non-removable, volatile/nonvolatile computer storage media. By way of example only. FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 859 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 849, and program data 847. Note that these components can either be the same as or different from operating system 834, application programs 835, other program modules 539, and program data 837. Operating system 844, application programs 845, other program modules 849, and program data 847 are given different numbers here to illustrate that, at a minimum, they are different copies. A user may enter commands and information into the computer 810 through input devices such as a keyboard 892 and pointing device 891, commonly referred to as a mouse, trackball or touch pad. Other input devices (not shown) may include a microphone, joystick, game pad, satellite dish, scanner, or the like. These and other input devices are often connected to the processing unit 820 through a user input interface 590 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 899, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 890, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, some embodiments may be embodied as a computer readable medium other than a computer-readable storage medium. Examples of computer readable media that are not computer readable storage media include transitory media, like propagating signals.

U.S. patent application Ser. No. 16/527,903, filed Jul. 31, 2019, published as U.S. Pub. No. US2020-0044460, and entitled "Multiplexed Charge Discharge Battery Management System" is incorporated herein by reference in its entirety for all purposes.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U. S. Pub. No. 2007-0221265, and entitled "Rechargeable Lithium/Water, Lithium/Air Batteries"; International Patent Apl. Serial No. PCT/US2008/ 009158, filed Jul. 29, 2008, published as International Pub. No. WO/2009017726, and entitled "Swelling Inhibition in Lithium Batteries"; U.S. patent application Ser. No. 12/312, 764, filed May 26, 2009, published as U.S. Pub. No. 2010-0129699, and entitled "Separation of Electrolytes"; International Patent Apl. Serial No. PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821, 576, filed Jun. 22, 2007, published as U.S. Pub. No. 2008/ 0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008- 0187663, and entitled "Co-Flash Evaporation of Polymerizable Monomers and Non-Polymerizable Carrier Solvent/ Salt Mixtures/Solutions"; International Patent Apl. Serial No. PCT/US2008/010894, filed Sep. 19, 2008, published as International Pub. No. WO/2009042071, and entitled "Electrolyte Additives for Lithium Batteries and Related Methods"; International Patent Apl. Serial No. PCT/US2009/ 000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727, 862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. Provisional Patent Apl. Ser. No. 61/376,554, filed on Aug. 24, 2010, entitled "Electrically Non-Conductive Materials for Electrochemical Cells;" U.S. Provisional patent application Ser. No. 12/862,528, filed on Aug. 24, 2010, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur"; U.S. patent application Ser. No. 12/862,551, filed on Aug. 24, 2010, published as U.S. Pub. No. 2011/0070491, entitled "Electrochemical Cells Comprising Porous Structures Comprising Sulfur"; U.S. patent application Ser. No. 12/862,576, filed on Aug. 24, 2010, published as U.S. Pub. No. 2011/0059361, entitled "Electrochemical Cells Comprising Porous Structures Comprising Sulfur"; U.S. patent application Ser. No. 12/862,581, filed on Aug. 24, 2010, published as U.S. Pub. No. 2011/0076560, entitled "Electrochemical Cells Comprising Porous Structures Comprising Sulfur"; U.S. Patent Apl. Ser. No. 61/385,343, filed on Sep. 22, 2010, entitled "Low Electrolyte Electrochemical Cells"; U.S. patent application Ser. No. 13/033,419, filed Feb. 23, 2011, entitled "Porous Structures for Energy Storage Devices"; U.S. patent application Ser. No. 16/670,933, filed Oct. 31, 2019, entitled "System And Method For Operating A Rechargeable Electrochemical Cell Or Battery"; U.S. patent application Ser. No. 16/670,905, filed Oct. 31, 2019, entitled "System And Method For Operating A Rechargeable Electrochemical Cell Or Battery"; and International Patent Apl. Serial No. PCT/US2019/059142, filed Oct. 31, 2019, entitled "System And Method For Operating A Rechargeable Electrochemical Cell Or Battery". All other patents and patent applications disclosed herein are also incorporated by reference in their entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention may include each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery management system comprising:
at least one battery comprising two or more strings of cells, each string of cells comprising two or more cells;
a multiplexing switch apparatus connected to each string of cells; and
at least one controller configured to:
use the multiplexing switch apparatus to transition uninterruptedly between discharging of a first string of cells to a load and discharging of a second string of cells to the load while keeping a voltage difference between the first string of cells and the second string of cells below a threshold voltage difference at least during the transition;
transition uninterruptedly between the discharging of the first string of cells and the discharging of the second string of cells in response to a criterion that prompts disconnection of the first string of cells;
in response to the criterion, select the second string of cells for discharging based on the first string of cells and the second string of cells having below the threshold voltage difference;
discharge each of the two or more strings of cells individually and to charge each of the two or more strings of cells in parallel such that a discharging rate at which the two or more strings of cells are discharged individually are at least twice a charging rate at which the two or more strings of cells are charged in parallel;
transition uninterruptedly between the discharging of the first string of cells at least at the discharging rate and the discharging of the second string of cells at least at the discharging rate; and
select the second string of cells for discharging such that the first string of cells and the second string of cells are discharged at least at the discharging rate.

2. The battery management system of claim 1, wherein the threshold voltage difference is such that an in-rush current resulting from the transition is at most 15 amperes.

3. The battery management system of claim 1, wherein the threshold voltage difference is at most 8% of a maximum total voltage of the first string or the second string.

4. The battery management system of claim 1, wherein at least one controller is configured to transition to a string of cells having a lowest voltage difference of the two or more strings of cells from the first string at a time of measurement while discharging solely the first string.

5. The battery management system of claim 1, wherein the at least one controller is configured to transition to a string of cells having a highest voltage of the two or more strings of cells at a time of measurement while discharging solely the first string.

6. The battery management system of claim 1, wherein the at least one controller is configured to transition to a string of cells having a lowest voltage of the two or more strings of cells at a time of measurement while discharging solely the first string.

7. The battery management system of claim 1, wherein the at least one controller is configured to transition between discharging of the first string and discharging of the second string when a voltage of the first string decreases to a threshold voltage.

8. A battery management system comprising:
at least one battery comprising two or more strings of cells, each string of cells comprising two or more cells;
a multiplexing switch apparatus connected to each string of cells; and
at least one controller configured to:
use the multiplexing switch apparatus to perform a transition between discharging of a first string of cells and discharging of a second string of cells while keeping an overall output voltage of the at least one battery within a window, the transition comprising:
while discharging the first string of cells and not discharging the second string of cells, determining to disconnect the first string of cells from discharging;
in response to determining to disconnect the first string of cells from discharging, selecting and connecting the second string of cells such that the overall output voltage of the at least one battery is kept within the window; and
after selecting and connecting the second string of cells, disconnecting the first string of cells from discharging such that the second string of cells is discharging and the first string of cells is not discharging;
discharge each of the two or more strings of cells individually and to charge each of the two or more strings of cells in parallel such that a discharging rate at which the two or more strings of cells are discharged individually are at least twice a charging rate at which the two or more strings of cells are charged in parallel;
perform the transition between the discharging of the first string of cells at least at the discharging rate and the discharging of the second string of cells at least at the discharging rate while keeping the overall output voltage of the at least one battery within the window; and
select and connect the second string of cells for discharging such that the first string of cells and the second string of cells are discharged at least at the discharging rate.

9. A battery management system comprising:
at least one battery comprising two or more strings of cells, each string of cells comprising two or more cells;
a multiplexing switch apparatus connected to each string of cells; and
at least one controller configured to use the multiplexing switch apparatus to:
transition between discharging of a first string of cells to a load and discharging of a second string of cells to the load while keeping an in-rush current resulting from the transition below a threshold current at least during the transition;
discharge each of the two or more strings of cells individually and to charge each of the two or more strings of cells in parallel such that a discharging rate at which the two or more strings of cells are discharged individually is at least twice a charging rate at which the two or more strings of cells are charged in parallel; and transition between the discharging of the first string of cells to the load at least at the discharging rate and the discharging of the second string of cells to the load at least at the discharging rate while keeping the in-rush current resulting from the transition below a threshold current at least during the transition.

10. A battery management system comprising:

at least one battery comprising two or more strings of cells, each string of cells comprising two or more cells;

a multiplexing switch apparatus connected to each string of cells; and at least one controller configured to use the multiplexing switch apparatus to:

control a duration of pulse discharge of at least one string of the two or more strings of to decrease non-linearly with an increase in load demand;

discharge each of the two or more strings of cells individually and to charge each of the two or more strings of cells in parallel such that a discharging rate at which the two or more strings of cells are discharged individually is at least twice a charging rate at which the two or more strings of cells are charged in parallel; and control the duration of pulse discharge to decreases non-linearly with the increase in load demand such that pulse discharge of each of the two or more strings of cells is at least at the discharging rate.

11. A battery pack comprising:

at least one battery comprising three or more strings of cells, each string of cells comprising two or more cells; and an integrated switching control system comprising at least one switch connected to each of the three or more strings of cells, wherein the integrated switching control system is configured to:

control the at least one switch to:

discharge, to a load, a first string of the three or more strings of cells having a first voltage at a time of measurement while discharging the first string and not a second string of cells and not a third string of cells of the three or more strings of cells;

then transition uninterruptedly to discharge, to the load, the first string of cells and the second string of cells having a second voltage that is closest to the first voltage at the time of measurement and not the third string of cells; and then transition uninterruptedly to discharge, to the load, the second string of cells and not the first string of cells and not the third string of cells;

discharge each of the three or more strings of cells individually and to charge each of the three or more strings of cells in parallel such that a discharging rate at which the three or more strings of cells are discharged individually is at least twice a charging rate at which the three or more strings of cells are charged in parallel; and transition uninterruptedly from discharging the first string at least at the discharging rate and not the second string and not the third string to discharging the first string and the second string and not the third string, and transition uninterruptedly from discharging the first string and the second string and not the third string to discharging the second string at least at the discharging rate and not the first string and not the third string, such that the first string of cells and the second string of cells are discharged at least at the discharging rate.

12. A battery management method comprising:

using a multiplexing switch apparatus, which is connected to two or more strings of cells of at least one battery, to transition uninterruptedly between discharging of a first string of cells to a load and discharging of a second string of cells to the load while keeping a voltage difference between the first string and the second string below a threshold voltage difference at least during the transition, wherein transitioning uninterruptedly between the discharging of the first string of cells and the discharging of the second string of cells is in response to a criterion that prompts disconnection of the first string of cells, wherein the multiplexing switch apparatus is configured to:

in response to the criterion, select the second string of cells for discharging based on the first string of cells and the second string of cells having below the threshold voltage difference;

discharge each of the two or more strings of cells individually and to charge each of the two or more strings of cells in parallel such that a discharging rate at which the two or more strings of cells are discharged individually is at least twice a charging rate at which the two or more strings of cells are charged in parallel;

transition uninterruptedly between the discharging of the first string of cells at least at the discharging rate and the discharging of the second string of cells at least at the discharging rate; and select the second string of cells for discharging such that the first string of cells and the second string of cells are discharged at least at the discharging rate, and wherein each string of cells comprises two or more cells.

13. A battery management method comprising:

using a multiplexing switch apparatus, which is connected to two or more strings of cells of at least one battery, to:

perform a transition between discharging of a first string of cells and discharging of a second string of cells while keeping an overall output voltage of the at least one battery within a window, the transition comprising:

while discharging the first string of cells and not discharging the second string of cells, determining to disconnect the first string of cells from discharging;

in response to determining to disconnect the first string of cells from discharging, selecting and connecting the second string of cells such that the overall output voltage of the at least one battery is kept within the window; and after selecting and connecting the second string of cells, disconnecting the first string of cells from discharging such that the second string of cells is discharging and the first string of cells is not discharging;

discharge each of the two or more strings of cells individually and to charge each of the two or more strings of cells in parallel such that a discharging rate at which the two or more strings of cells are discharged individually is at least twice a charging rate at which the two or more strings of cells are charged in parallel, perform the transition between the discharging of the first string of cells at least at the discharging rate and the discharging of the second string of cells at least at the discharging rate while keeping the overall output voltage of the at least one battery within the window, and select and connect the second string of cells for discharging such that the first string of cells and the second string of cells are discharged at least at the discharging rate, wherein each string of cells comprises two or more cells.

14. A battery management method comprising:

using a multiplexing switch apparatus, which is connected to two or more strings of cells of at least one battery, to:

transition between discharging of a first string of cells to a load and discharging of a second string of cells to the load while keeping an in-rush current resulting from the transition below a threshold current at least during the transition;

discharge each of the two or more strings of cells individually and to charge each of the two or more strings of cells in parallel such that a discharging rate at which the two or more strings of cells are discharged individually is at least twice a charging rate at which the two or more strings of cells are charged in parallel, and transition between the discharging of the first string of cells to the load at least at the discharging rate and the discharging of the second string of cells to the load at least at the discharging rate while keeping the in-rush current resulting from the transition below a threshold current at least during the transition, wherein each string of cells comprises two or more cells.

15. A battery management system comprising:

at least one battery comprising two or more strings of cells, each string of cells comprising two or more cells;

a multiplexing switch apparatus connected to each string of cells; and at least one controller configured to use the multiplexing switch apparatus to;

selectively discharge the two or more strings of cells and to transition between discharging of a first string of cells to discharging of a second string of cells while keeping an in-rush current resulting from the transition below a threshold current at least during the transition;

discharge each of the two or more strings of cells individually and to charge each of the two or more strings of cells in parallel such that a discharging rate at which the two or more strings of cells are discharged individually is at least twice a charging rate at which the two or more strings of cells are charged in parallel, and transition between the discharging of the first string of cells at least at the discharging rate and the discharging of the second string of cells at least at the discharging rate while keeping the in-rush current resulting from the transition below a threshold current at least during the transition, wherein the multiplexing switch apparatus does not comprise a balance rail.

16. A battery pack comprising:

at least one battery comprising two or more strings of cells, each string of cells comprising two or more cells; and an integrated switching control system comprising at least one switch connected to each string of cells without including a balance rail, wherein the integrated switching control system is configured to:

control the at least one switch to discharge the two or more strings of cells and to transition between discharging of a first string of cells to discharging of a second string of cells while keeping an in-rush current resulting from the transition below a threshold current at least during the transition;

discharge each of the two or more strings of cells individually and to charge each of the two or more strings of cells in parallel such that a discharging rate at which the two or more strings of cells are discharged individually is at least twice a charging rate at which the two or more strings of cells are charged in parallel, and transition between the discharging of the first string of cells at least at the discharging rate and the discharging of the second string of cells at least at the discharging rate while keeping the in-rush current resulting from the transition below a threshold current at least during the transition.

17. A battery management method comprising:

using a multiplexing switch apparatus, which is connected to two or more strings of cells of at least one battery, to:

selectively discharge each string of cells and to transition between discharging of a first string of cells to discharging of a second string of cells while keeping an in-rush current resulting from the transition below a threshold current at least during the transition;

discharge each of the two or more strings of cells individually and to charge each of the two or more strings of cells in parallel such that a discharging rate at which the two or more strings of cells are discharged individually is at least twice a charging rate at which the two or more strings of cells are charged in parallel, and transition between the discharging of the first string of cells at least at the discharging rate and the discharging of the second string of cells at least at the discharging rate while keeping the in-rush current resulting from the transition below a threshold current at least during the transition, wherein each string of cells comprises two or more cells, and wherein the multiplexing switch apparatus does not comprise a balance rail.

* * * * *